(12) United States Patent
Zahid et al.

(10) Patent No.: US 12,462,194 B2
(45) Date of Patent: Nov. 4, 2025

(54) VEHICLE OCCUPANT BEHAVIOR MONITORING APPLICATION

(71) Applicant: TOYOTA MOTOR NORTH AMERICA, INC., Plano, TX (US)

(72) Inventors: Imad Zahid, Carrollton, TX (US); Sumit K. Jha, Frisco, TX (US); Anil Nagpal, Plano, TX (US); Joshua C. Batie, Frisco, TX (US); Nikhil Rajendra, Dallas, TX (US)

(73) Assignees: TOYOTA MOTOR NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 35 days.

(21) Appl. No.: 18/377,273

(22) Filed: Oct. 5, 2023

(65) Prior Publication Data

US 2025/0026294 A1    Jan. 23, 2025

Related U.S. Application Data

(60) Provisional application No. 63/514,512, filed on Jul. 19, 2023.

(51) Int. Cl.
*G01C 21/28*    (2006.01)
*B60R 11/04*    (2006.01)
(Continued)

(52) U.S. Cl.
CPC ............. *G06N 20/00* (2019.01); *B60R 11/04* (2013.01); *B60R 21/01532* (2014.10);
(Continued)

(58) Field of Classification Search
CPC ............. B60R 11/04; B60R 21/01532; B60R 21/01538; B60R 21/01542;
(Continued)

(56) References Cited

U.S. PATENT DOCUMENTS

| 5,082,333 A | 1/1992 | Fukushima et al. |
| 7,183,932 B2 | 2/2007 | Bauer |

(Continued)

FOREIGN PATENT DOCUMENTS

| CA | 3026666 A1 | 12/2018 |
| CN | 104778056 A | 7/2015 |

(Continued)

OTHER PUBLICATIONS

US 2023/0031452 A1, 02/2023, Myers, Jr. et al. (withdrawn)
(Continued)

*Primary Examiner* — Nathnael Aynalem

(57) ABSTRACT

An example operation includes one or more of monitoring, via a vehicle, a behavior of an occupant of the vehicle, responsive to the behavior being above a threshold, generating via an application of the vehicle, a first suggested action intended for the occupant based on the behavior and an amount the behavior is above the threshold, monitoring, by the vehicle, whether the first suggested action is being performed by the occupant, determining an alternate action is being performed by the occupant, generating a second suggested action based on the alternate action and the first suggested action, and providing a value to an occupant device associated with the occupant responsive to the second action being detected by the transport.

20 Claims, 44 Drawing Sheets

(51) Int. Cl.

| | | |
|---|---|---|
| *B60R 21/015* | (2006.01) | |
| *B60W 40/08* | (2012.01) | |
| *B60W 50/00* | (2006.01) | |
| *B60W 50/14* | (2020.01) | |
| *B60W 60/00* | (2020.01) | |
| *G01C 21/00* | (2006.01) | |
| *G06N 20/00* | (2019.01) | |
| *G06V 20/59* | (2022.01) | |
| *G08G 1/01* | (2006.01) | |
| *G08G 1/0962* | (2006.01) | |
| *G08G 1/0967* | (2006.01) | |
| *H04L 1/1809* | (2023.01) | |
| *H04W 64/00* | (2009.01) | |
| *H04W 76/15* | (2018.01) | |

(52) U.S. Cl.
CPC ........ *B60W 40/08* (2013.01); *B60W 50/0097* (2013.01); *B60W 50/14* (2013.01); *B60W 60/0015* (2020.02); *G01C 21/28* (2013.01); *G01C 21/3841* (2020.08); *G01C 21/3874* (2020.08); *G01C 21/3896* (2020.08); *G06V 20/597* (2022.01); *G08G 1/0112* (2013.01); *G08G 1/0116* (2013.01); *G08G 1/0125* (2013.01); *G08G 1/09626* (2013.01); *G08G 1/096716* (2013.01); *G08G 1/096783* (2013.01); *H04L 1/1809* (2013.01); *H04W 64/003* (2013.01); *H04W 76/15* (2018.02); *B60W 2050/009* (2013.01); *B60W 2050/143* (2013.01); *B60W 2050/146* (2013.01); *B60W 2540/043* (2020.02); *B60W 2540/215* (2020.02); *B60W 2540/221* (2020.02)

(58) Field of Classification Search
CPC ...... B60R 21/0153; B60W 2040/0872; B60W 2040/0827; B60W 2040/0836; B60W 2040/0845; B60W 2040/0854; B60W 2040/0863; B60W 2050/009; B60W 2050/0091; B60W 2050/0093; B60W 2050/0094; B60W 50/0097; B60W 2050/143; B60W 2050/146; B60W 50/16; B60W 40/09; B60W 40/08; B60W 2540/221; B60W 2540/18; B60W 2540/20; B60W 2540/21; B60W 2540/215; B60W 2540/22; B60W 2540/223; B60W 2540/043; B60W 2540/225; B60W 2540/227; B60W 2540/229; B60W 2540/24; B60W 2540/26; B60W 2540/30; B60W 50/14; B60W 60/0015; B60W 60/00; B60W 50/00; G06V 20/597; B60T 8/171; B60T 8/172; B60T 7/12; G01C 21/3617; G01C 21/28; G08G 1/01; G08G 1/0962
USPC ........................................ 348/148
See application file for complete search history.

(56) References Cited

U.S. PATENT DOCUMENTS

| | | |
|---|---|---|
| 7,254,482 B2 | 8/2007 | Kawasaki et al. |
| 7,292,152 B2 | 11/2007 | Torkkola et al. |
| 7,450,603 B2 | 11/2008 | Nix et al. |
| 7,707,576 B2 | 4/2010 | Sun |
| 8,301,108 B2 | 10/2012 | Naboulsi |
| 8,326,258 B2 | 12/2012 | Chmielewski et al. |
| 8,495,239 B2 | 7/2013 | Cohen et al. |
| 8,725,311 B1 | 5/2014 | Breed |
| 8,972,090 B2 | 3/2015 | Weslati et al. |
| 9,075,702 B2 | 7/2015 | Park et al. |
| 9,211,891 B2 | 12/2015 | Scofield et al. |
| 9,240,079 B2 | 1/2016 | Lambert et al. |
| 9,460,601 B2 | 10/2016 | Mimar |
| 9,531,737 B2 | 12/2016 | Stählin |
| 9,792,740 B2 | 10/2017 | Lambert et al. |
| 9,821,657 B2 | 11/2017 | Gan |
| 9,849,802 B2 | 12/2017 | Chow et al. |
| 9,905,057 B2 | 2/2018 | Stacy |
| 9,915,950 B2 | 3/2018 | Hartung et al. |
| 10,036,646 B2 | 7/2018 | Schumann et al. |
| 10,081,317 B2 | 9/2018 | Naboulsi |
| 10,091,299 B2 | 10/2018 | Mian et al. |
| 10,104,525 B1 | 10/2018 | Kaiser et al. |
| 10,163,340 B2 | 12/2018 | Vandikas et al. |
| 10,196,071 B1 | 2/2019 | Rowson et al. |
| 10,225,348 B2 | 3/2019 | Wang et al. |
| 10,235,859 B1 | 3/2019 | Hiles |
| 10,429,195 B2 | 10/2019 | Hashisho |
| 10,474,794 B2 | 11/2019 | Patton et al. |
| 10,490,075 B2 | 11/2019 | Bai et al. |
| 10,532,658 B2 | 1/2020 | Kim et al. |
| 10,672,200 B2 | 6/2020 | Wang et al. |
| 10,696,299 B2 | 6/2020 | Weldemariam et al. |
| 10,741,178 B2 | 8/2020 | Jo et al. |
| 10,816,978 B1 | 10/2020 | Schwalb |
| 10,829,110 B2 | 11/2020 | Nienhueser et al. |
| 10,850,616 B2 | 12/2020 | Koebler et al. |
| 10,912,509 B2 | 2/2021 | Alsbou |
| 10,976,170 B2 | 4/2021 | Morgan-Brown |
| 11,037,443 B1 | 6/2021 | Cui et al. |
| 11,047,704 B2 | 6/2021 | Yamamoto |
| 11,084,494 B2 | 8/2021 | Hu et al. |
| 11,124,153 B2 | 9/2021 | Narumi |
| 11,163,270 B2 | 11/2021 | Migneco et al. |
| 11,206,453 B2 | 12/2021 | Ramos et al. |
| 11,221,621 B2 | 1/2022 | Wengreen et al. |
| 11,221,622 B2 | 1/2022 | Schwie et al. |
| 11,287,270 B2 | 3/2022 | Xiang et al. |
| 11,310,626 B2 | 4/2022 | Mian et al. |
| 11,323,168 B2 | 5/2022 | Legg et al. |
| 11,388,241 B1 | 7/2022 | Myers, Jr. et al. |
| 11,400,944 B2 | 8/2022 | Soltanian et al. |
| 11,513,523 B1 | 11/2022 | Schwalb |
| 11,526,721 B1 | 12/2022 | O'Malley |
| 11,539,818 B2 | 12/2022 | Sabella et al. |
| 11,620,473 B1 | 4/2023 | Zhang |
| 11,625,745 B1 | 4/2023 | Warden et al. |
| 11,667,299 B2 | 6/2023 | Memani et al. |
| 11,673,570 B2 | 6/2023 | Chambers et al. |
| 11,685,409 B2 | 6/2023 | Kim et al. |
| 11,694,543 B2 | 7/2023 | Biala et al. |
| 11,697,420 B2 | 7/2023 | Bade et al. |
| 11,780,458 B1 | 10/2023 | Hussain et al. |
| 11,794,676 B1 | 10/2023 | Benqassmi et al. |
| 11,866,036 B2 | 1/2024 | Klingemann et al. |
| 2006/0069473 A1 | 3/2006 | Sumcad et al. |
| 2006/0261933 A1 | 11/2006 | Deniau et al. |
| 2007/0054685 A1 | 3/2007 | Kellum |
| 2008/0133120 A1 | 6/2008 | Romanick |
| 2008/0243558 A1 | 10/2008 | Gupte |
| 2009/0319341 A1 | 12/2009 | Berkobin et al. |
| 2010/0023201 A1 | 1/2010 | Kinney et al. |
| 2010/0070128 A1 | 3/2010 | Johnson |
| 2011/0131666 A1 | 6/2011 | Tanaka |
| 2012/0101713 A1* | 4/2012 | Moshchuk .......... B60W 40/064 701/301 |
| 2013/0167037 A1 | 6/2013 | Xaio |
| 2013/0342364 A1 | 12/2013 | Grimm et al. |
| 2014/0277896 A1 | 9/2014 | Lathrop et al. |
| 2014/0303806 A1 | 10/2014 | Bai et al. |
| 2014/0309886 A1 | 10/2014 | Ricci |
| 2015/0120135 A1 | 4/2015 | Lawrenson |
| 2015/0294547 A1 | 10/2015 | Ito et al. |
| 2016/0001781 A1* | 1/2016 | Fung ................ G07C 9/37 701/36 |
| 2017/0129496 A1 | 5/2017 | Li et al. |
| 2017/0132923 A1 | 5/2017 | Li et al. |
| 2017/0262453 A1 | 9/2017 | Raichelgauz et al. |

(56) References Cited

U.S. PATENT DOCUMENTS

| | | |
|---|---|---|
| 2017/0334374 A1 | 11/2017 | Naboulsi |
| 2017/0355377 A1 | 12/2017 | Vijaya Kumar et al. |
| 2018/0012424 A1 | 1/2018 | Ricci |
| 2018/0029612 A1 | 2/2018 | Tsuyunashi et al. |
| 2018/0128628 A1 | 5/2018 | Cheaz et al. |
| 2018/0146323 A1 | 5/2018 | Tseng et al. |
| 2018/0240335 A1 | 8/2018 | Dong et al. |
| 2018/0244288 A1 | 8/2018 | Glaser et al. |
| 2018/0365998 A1 | 12/2018 | Shibata et al. |
| 2019/0028904 A1 | 1/2019 | Carpenter et al. |
| 2019/0050718 A1 | 2/2019 | Tickoo et al. |
| 2019/0116476 A1 | 4/2019 | Qiu et al. |
| 2019/0302766 A1 | 10/2019 | Mondello et al. |
| 2019/0377362 A1 | 12/2019 | Lee |
| 2019/0392707 A1 | 12/2019 | McEnroe et al. |
| 2020/0031371 A1 | 1/2020 | Soliman |
| 2020/0117187 A1 | 4/2020 | Kothari |
| 2020/0130711 A1 | 4/2020 | Turek et al. |
| 2020/0166363 A1 | 5/2020 | Mcgavran et al. |
| 2020/0290630 A1 | 9/2020 | Elwart et al. |
| 2020/0346663 A1 | 11/2020 | Park et al. |
| 2020/0388154 A1 | 12/2020 | Kim et al. |
| 2021/0035125 A1 | 2/2021 | Casey et al. |
| 2021/0149397 A1 | 5/2021 | Shin et al. |
| 2021/0150828 A1 | 5/2021 | Mezaael et al. |
| 2021/0297472 A1 | 9/2021 | Calvert et al. |
| 2021/0309217 A1 | 10/2021 | Kim et al. |
| 2021/0309255 A1 | 10/2021 | Roesner |
| 2021/0312725 A1 | 10/2021 | Milton |
| 2021/0319691 A1 | 10/2021 | Merwaday et al. |
| 2021/0407292 A1 | 12/2021 | Cui et al. |
| 2022/0074756 A1 | 3/2022 | Gewickey et al. |
| 2022/0129948 A1 | 4/2022 | Cho et al. |
| 2022/0163969 A1 | 5/2022 | Li |
| 2022/0194433 A1 | 6/2022 | Nagata et al. |
| 2022/0234615 A1 | 7/2022 | Nishino et al. |
| 2022/0242448 A1 | 8/2022 | Chen et al. |
| 2022/0266842 A1 | 8/2022 | Li et al. |
| 2022/0289250 A1 | 9/2022 | Oba |
| 2022/0297726 A1 | 9/2022 | Zhang et al. |
| 2022/0308579 A1 | 9/2022 | Flores et al. |
| 2022/0381564 A1 | 12/2022 | Kitchen et al. |
| 2022/0408340 A1 | 12/2022 | Paczkowski et al. |
| 2023/0020772 A1 | 1/2023 | Aluvila et al. |
| 2023/0031709 A1 | 2/2023 | Yu et al. |
| 2023/0055974 A1 | 2/2023 | Arnold et al. |
| 2023/0058508 A1 | 2/2023 | Bush et al. |
| 2023/0063370 A1 | 3/2023 | Li |
| 2023/0096556 A1 | 3/2023 | Lerner et al. |
| 2023/0140079 A1 | 5/2023 | Zhu et al. |
| 2023/0147000 A1 | 5/2023 | Heiden et al. |
| 2023/0156055 A1 | 5/2023 | Apanovitch et al. |
| 2023/0343223 A1 | 10/2023 | Obraczka et al. |
| 2023/0375351 A1 | 11/2023 | Palanisamy et al. |
| 2024/0198938 A1 | 6/2024 | Carlos et al. |
| 2024/0211797 A1 | 6/2024 | Pronovost |
| 2024/0400077 A1 | 12/2024 | Kondasani et al. |

FOREIGN PATENT DOCUMENTS

| | | |
|---|---|---|
| CN | 105976609 A | 9/2016 |
| CN | 105989712 A | 10/2016 |
| CN | 108650656 A | 10/2018 |
| CN | 112801351 A | 5/2021 |
| CN | 112950939 A | 6/2021 |
| CN | 112970285 A | 6/2021 |
| CN | 113891823 A | 1/2022 |
| CN | 114358240 A | 4/2022 |
| CN | 114802059 A | 7/2022 |
| EP | 2288521 A1 | 3/2011 |
| EP | 2992418 A1 | 3/2016 |
| EP | 3269203 A1 | 1/2018 |
| EP | 3272613 A1 | 1/2018 |
| EP | 3299766 A1 | 3/2018 |
| EP | 3374902 A1 | 9/2018 |
| EP | 3401786 A2 | 11/2018 |
| EP | 3543906 A1 | 9/2019 |
| EP | 3629105 A1 | 4/2020 |
| EP | 4011740 A2 | 6/2022 |
| WO | 2016020151 A1 | 2/2016 |

OTHER PUBLICATIONS

International Search Report and Written Opinion issued in the International PCT Application No. PCT/US2024/038905, mailed on Oct. 18, 2024.
Bellan, GM aims to build Netflix-sized subscription business by 2030, Oct. 6, 2021, https://techcrunch.com/2021/10/06/gm-aims-to-build-netflix-sized-subscription-business-by-2030/.
Bhardwaj, Audi GLOSA (Green Light Optimised Speed Advisory), Jul. 8, 2022, https://gomechanic.in/blog/audi-glosa-green-light-optimised-speed-advisory/.
McEachern, Just 25 Percent Of Car Buyers Willing To Pay For Subscription Services, Apr. 21, 2022, https://gmauthority.com/blog/2022/04/just-25-percent-of-car-buyers-willing-to-pay-for-subscription-services/.
Palkar, How Uber Uses Machine Learning to Reinvent Transportation?, Nov. 10, 2020, https://palkardurvesh.medium.com/how-uber-uses-machine-learning-to-reinvent-transportation-9412e4a3e4e9.
Rechtin, Goodbye MBUX, hello MB.OS. New Mercedes infotainment coming soon 'Hey Mercedes' gets smarter, navigation gets more realistic, audio goes full 3D, Mar. 21, 2022, https://www.autoblog.com/2022/03/21/mercedes-mb-os/.
Smith, Hallucinations Could Blunt ChatGPT's Success OpenAl says the problem's solvable, Yann LeCun says we'll see, Mar. 13, 2023, https://spectrum.ieee.org/ai-hallucination.
Smith, The Future of Intelligent Transportation Systems (ITS): Applying Lessons Learned From 30 Years of Innovation, Spring 2022, Issue No. vol. 86 No. 1Publication No. FHWA-HRT-22-003, https://highways.dot.gov/public-roads/spring-2022/03.
SOMANYM3s, You can now Watch videos in the browsers [Update: only while in Park], Oct. 26, 2019, https://teslamotorsclub.com/tmc/threads/you-can-now-watch-videos-in-the-browsers-update-only-while-in-park.171461/.
Stocksdale, Audi testing bus, school zone vehicle-to-infrastructure system, May 23, 2021, https://www.autoblog.com/2021/05/23/audi-v2x-vehicle-infrastructure-school-bus-zone-warning-system/.
Tan, GPT-4 Inherits "Hallucinating" Facts and Reasoning Errors From Earlier GPT Models, Mar. 16, 2023, https://mpost.io/gpt-4-inherits-hallucinating-facts-and-reasoning-errors-from-earlier-gpt-models/.
Unknown, Artificial Intelligence (AI) in Automotive Market Size by Component (Software, Hardware, Service), by technology (computer vision, context Awareness, Deep Learning, Machine Learning, Natural Language Processing (NLP)), Process Application, 2018-2032, Published Dec. 2022, https://www.gminsights.com/industry-analysis/artificial-intelligence-ai-in-automotive-market.
Unknown, Automotive Artificial Intelligence (AI) Market Size (By Offering: Software and Hardware; By Process: Signal Recognition, Image Recognition, Voice Recognition, and Data Mining; By Technology: Deep Learning, Machine Learning, Context Awareness, Computer Vision, and Natural Language Processing; and By Application: Human-Machine Interface, Semi-Autonomous Driving, Autonomous Driving)—Global Industry Analysis, Market Size, Opportunities and Forecast 2022-2030, published May 2022, https://www.acumenresearchandconsulting.com/.
Unknown, Cadillac unveils electric Escalade IQ; 200kWh, 450 miles, pricing starting around 130K, Aug. 10, 2023, https://www.greencarcongress.com/2023/08/20230910-escaladeiq.html.
Unknown, Comfort and Infotainment Subscriptions: A Scalable Growth Vector for OEMs, intellias, published Mar. 31, 2023, updated Aug. 21, 2023, https://intellias.com/comfort-infotainment-subscriptions/.
Unknown, MHI Group to Participate in Vehicle-to-Infrastructure (V2I) Demonstration Test Program to Support Autonomous High-

(56) References Cited

OTHER PUBLICATIONS way Driving—Groupwide Technologies to Help Achieve Autonomous Driving Society—, Oct. 5, 2022, https://www.mhl.com/news/22100502.html.

Unknown, Personal development market size to grow by USD 755.16 million between 2022 and 2027; Growth driven by the rise in cost-effective content development—Technavio, Technavio, Apr. 3, 2023, https://www.prnewswire.com/news-releases/personal-development-market-size-to-grow-by-usd-755-16-million-between-2022-and-2027-growth-driven-by-the-rise-in-cost-effective-content-development---technavio-301785709.html.

Unknown, Personal Development Market Size, Share & Trends Analysis Report By Instrument (Books, e-Platforms), By Focus Area (Mental Health, Physical Health), By Region, And Segment Forecasts, 2023-2030, Report ID: GVR-4-68038-804-6,.

Unknown, Research Blog, top 10 Automotive Industry Trends & Innovations in 2024, last downloaded on , https://www.startus-insights.com/innovators-guide/automotive-industry-trends-10-innovations-that-will-impact-automotive-companies-in-2020-beyond/.

Unknown, The subscription Economy Index, Zuora, Mar. 2023.

Weise et al., When A.I. Chatbots Hallucinate, The New York Times, May 1, 2023.

\* cited by examiner

180

185

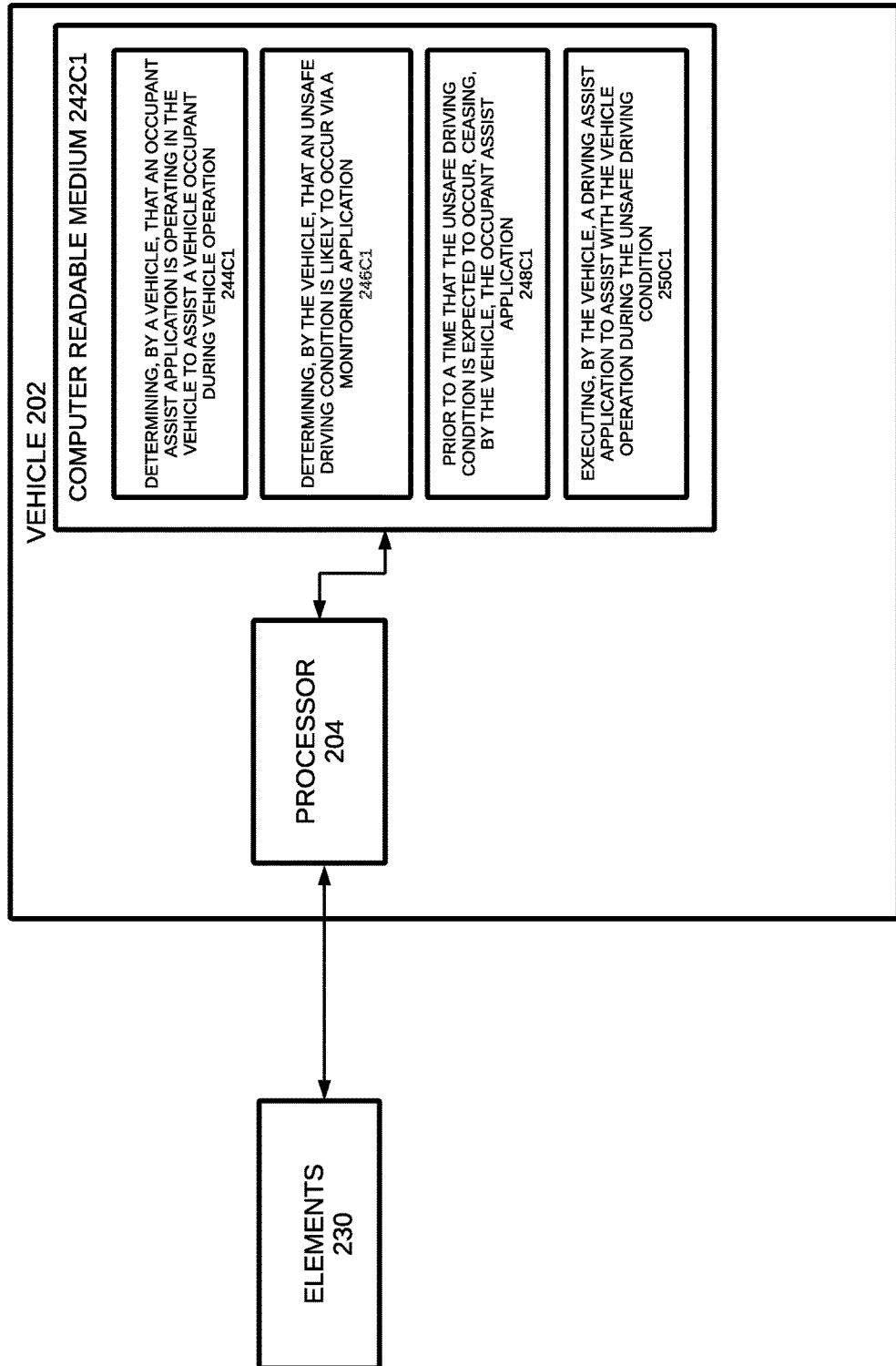

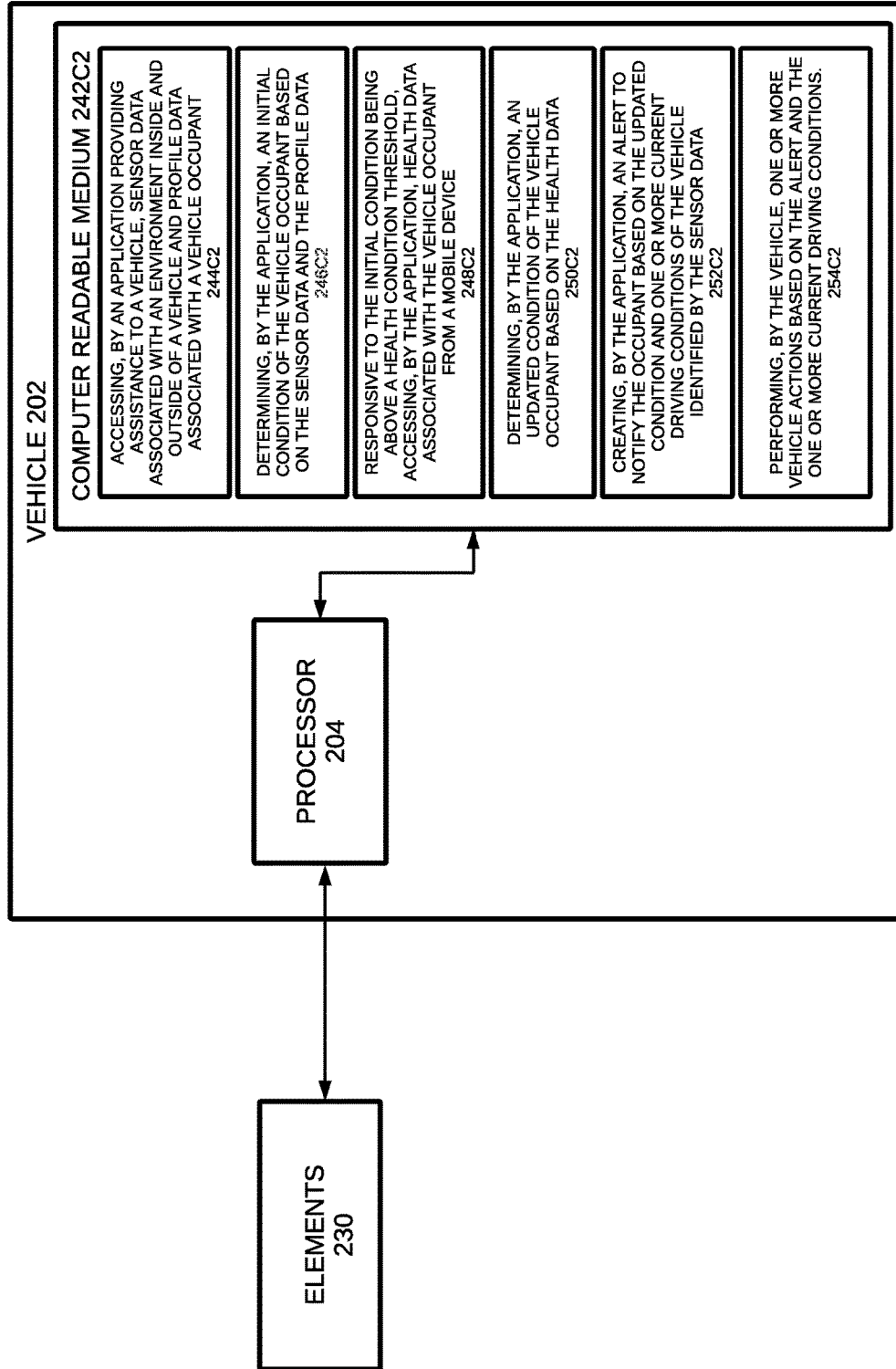
FIG. 2C2

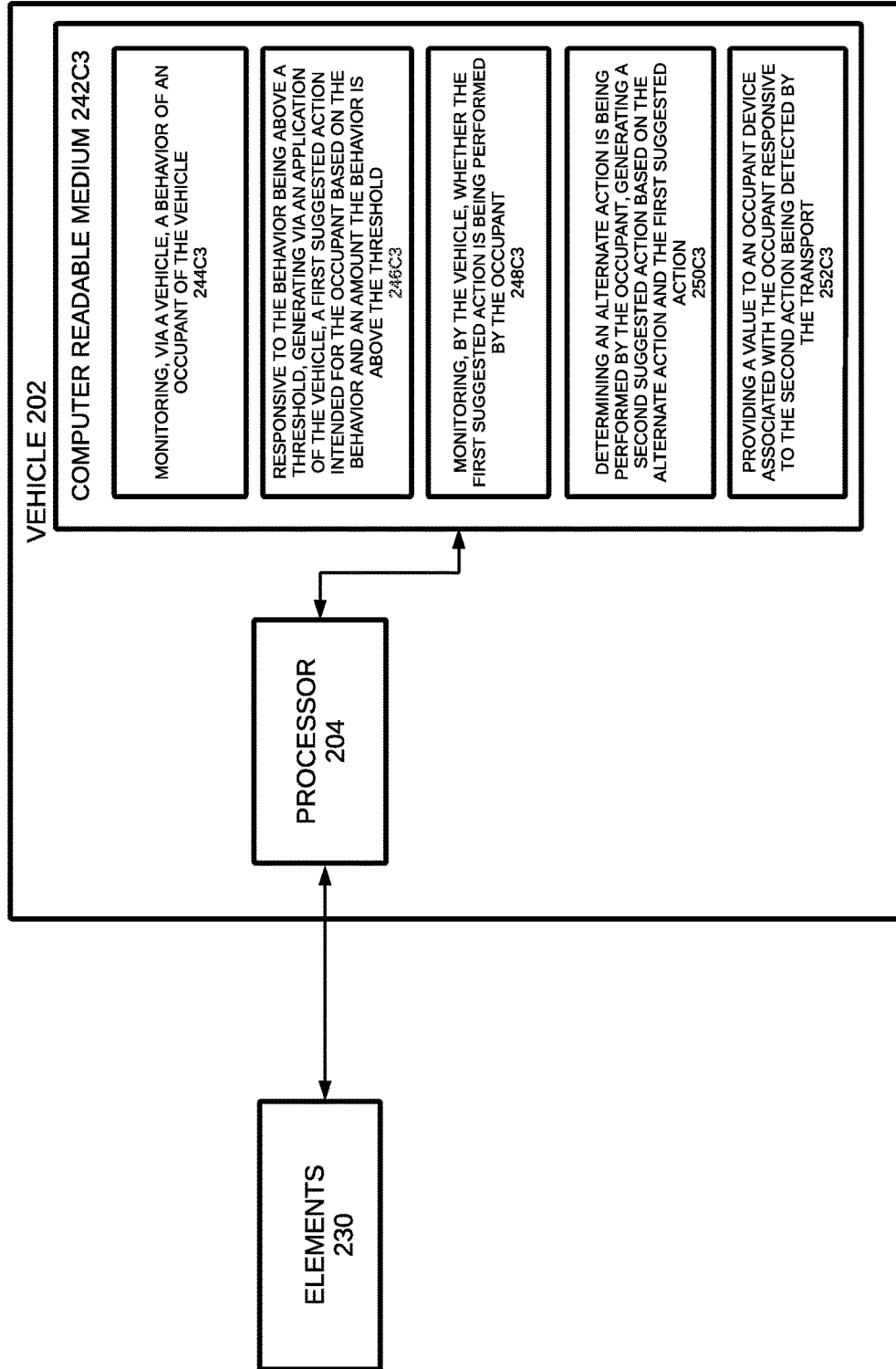
FIG. 2C3

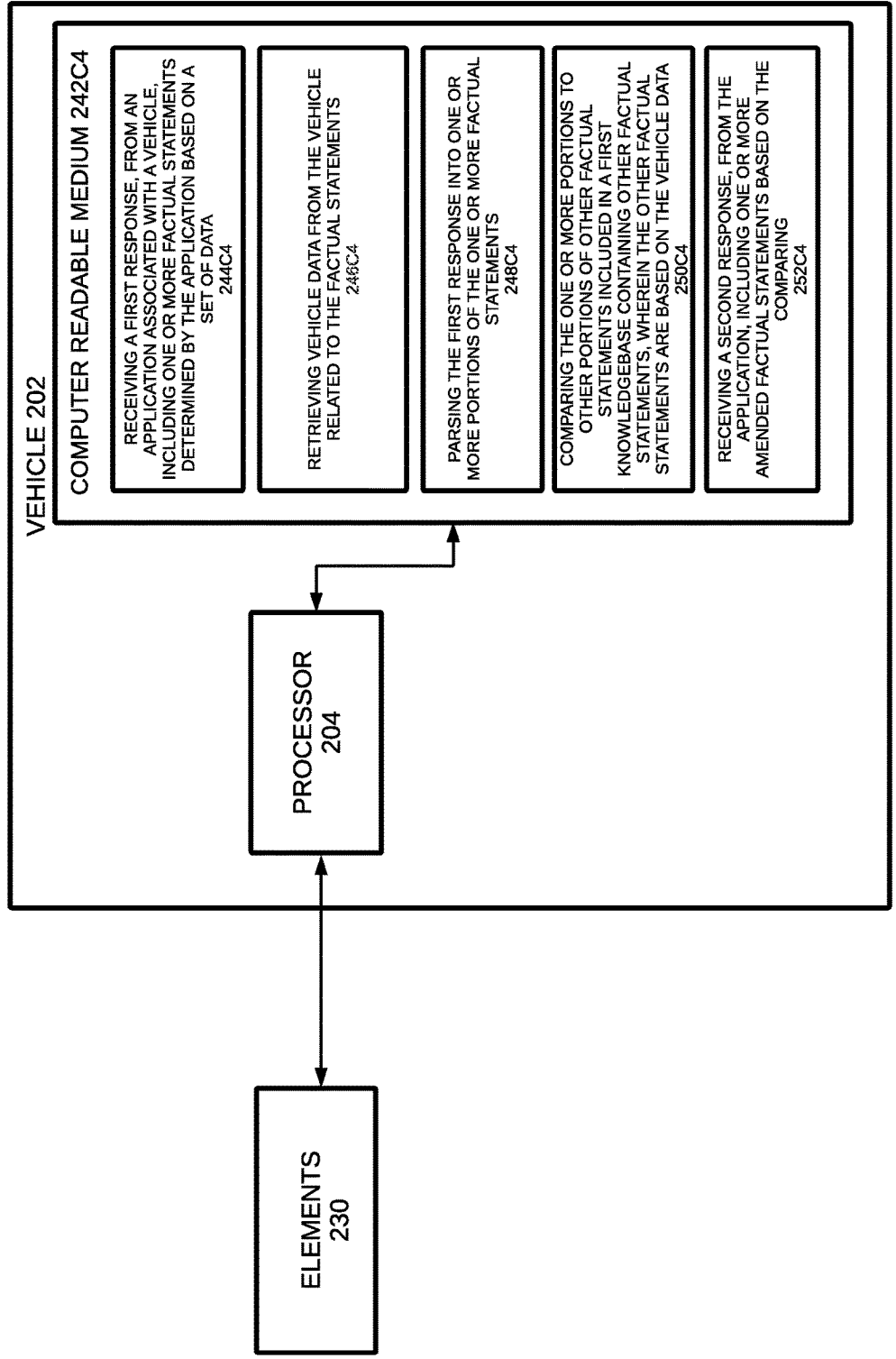

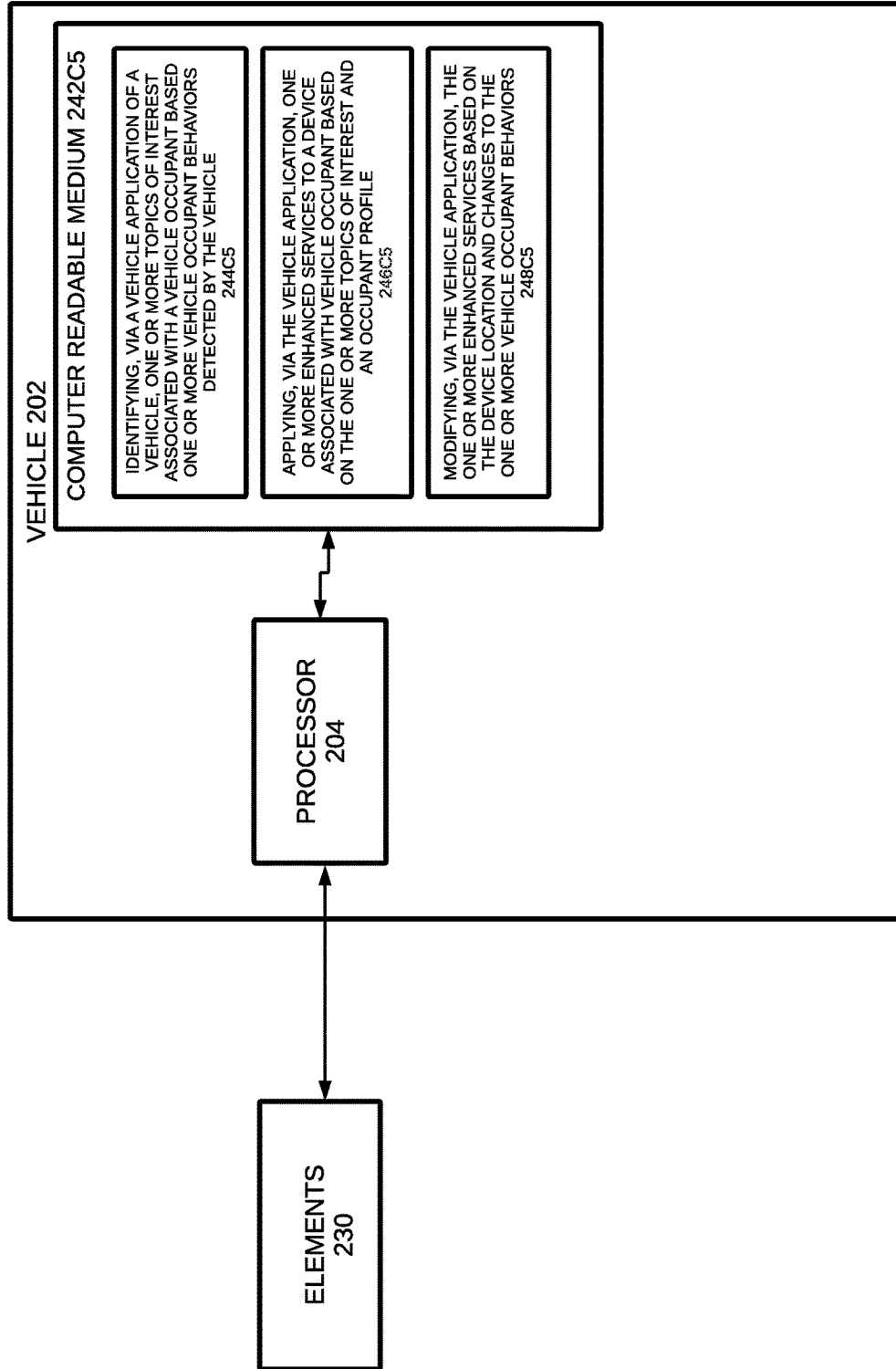
FIG. 2C5

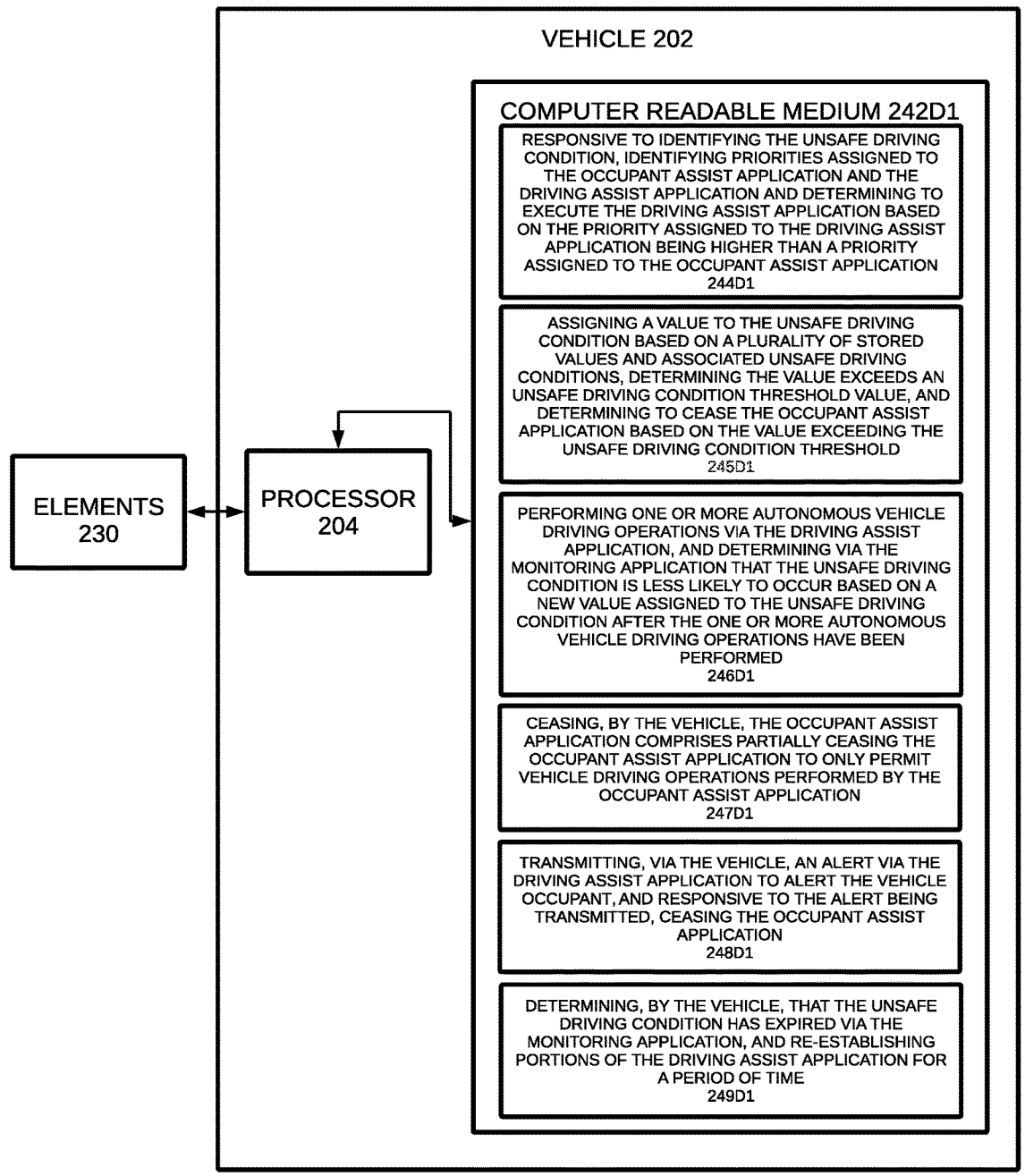
FIG. 2D1

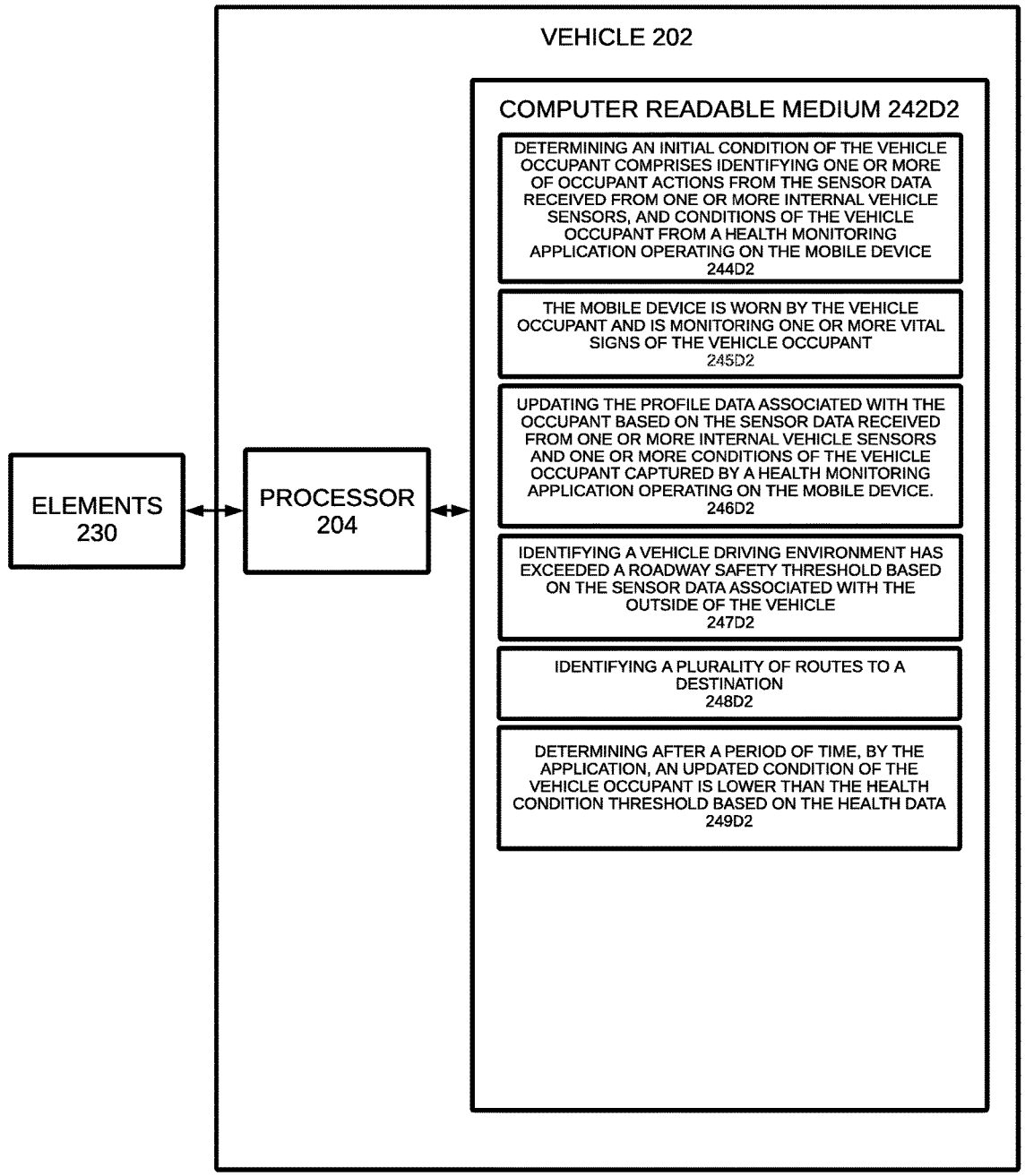
FIG. 2D2

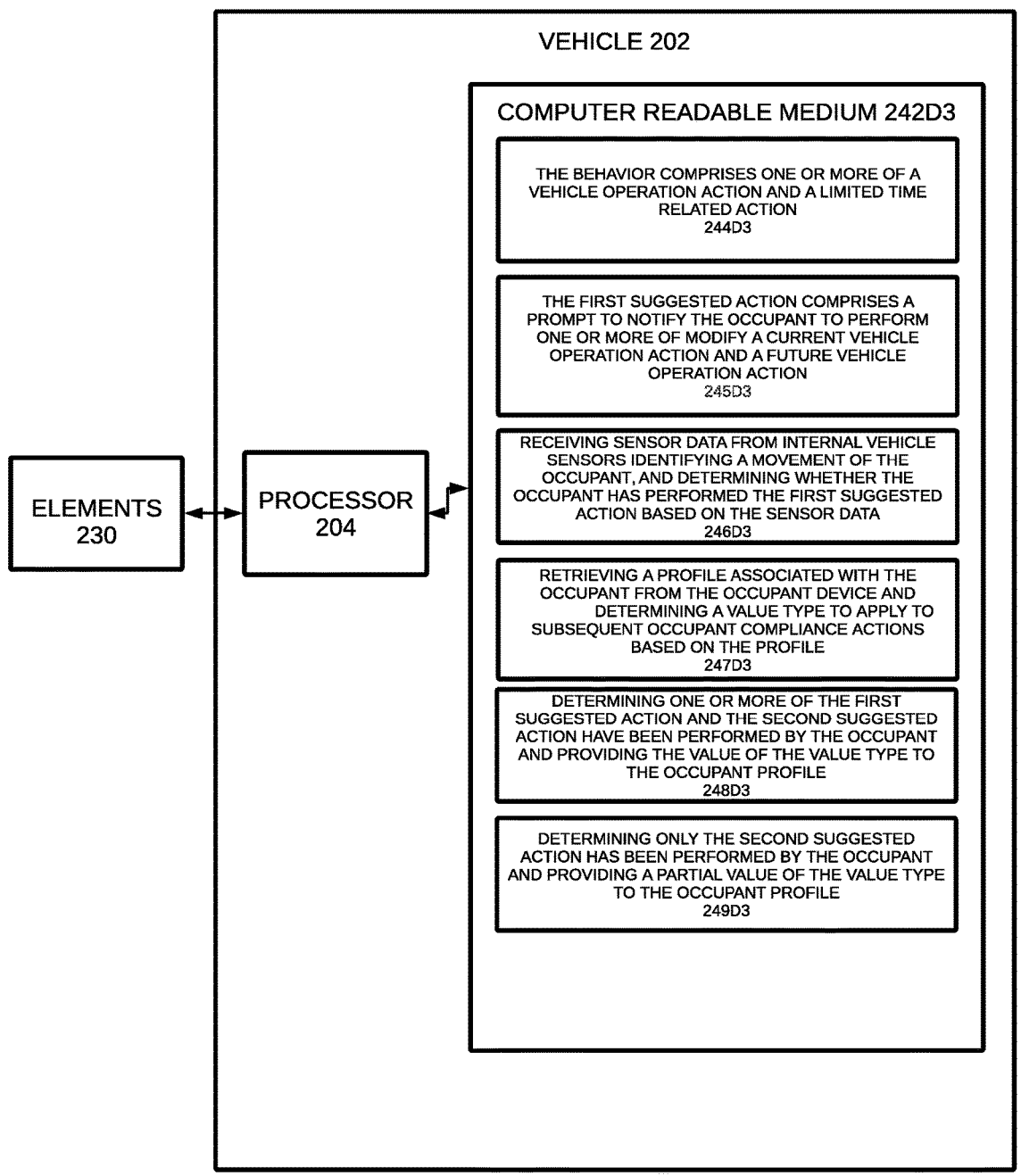
FIG. 2D3

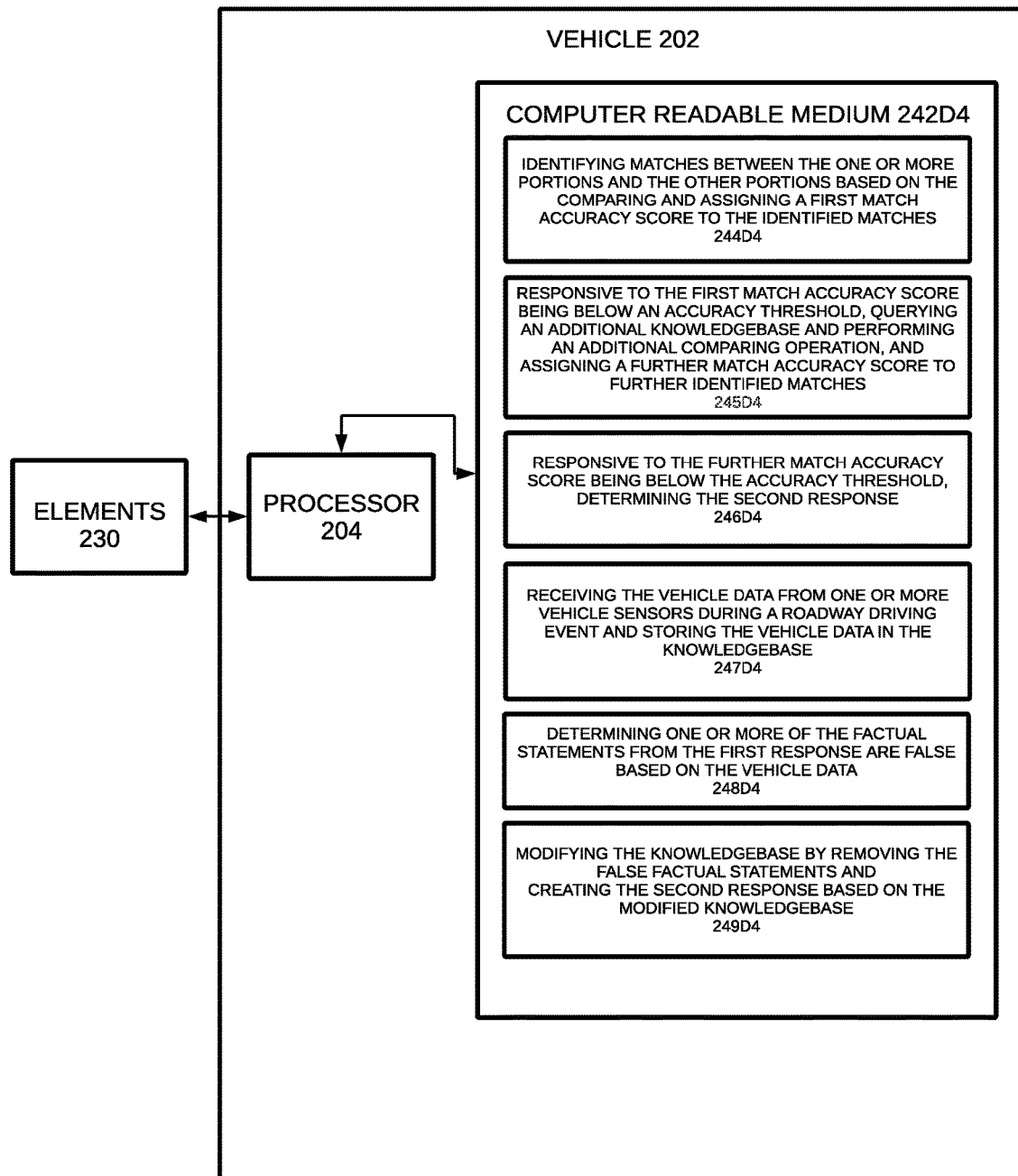
FIG. 2D4

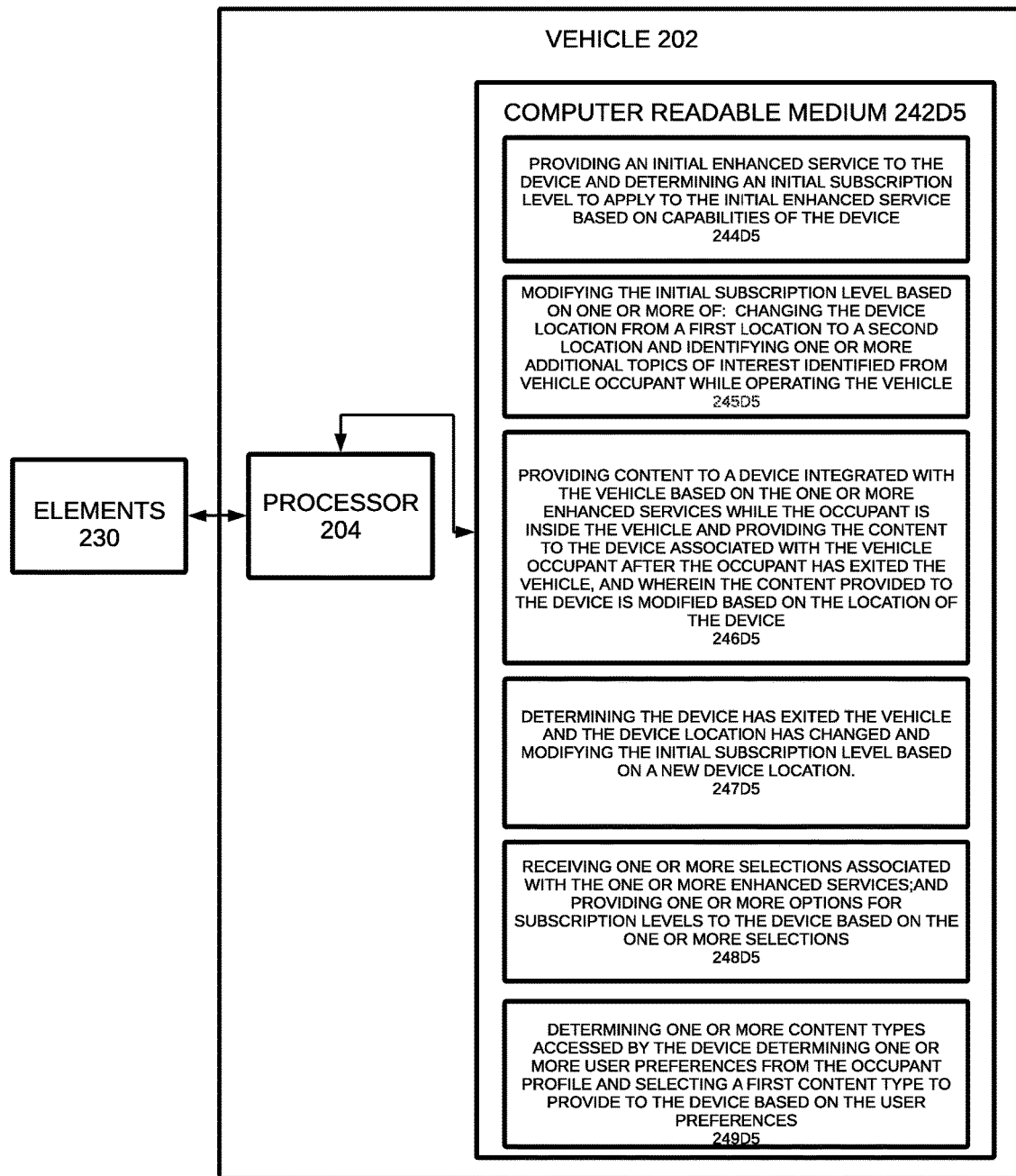
FIG. 2D5

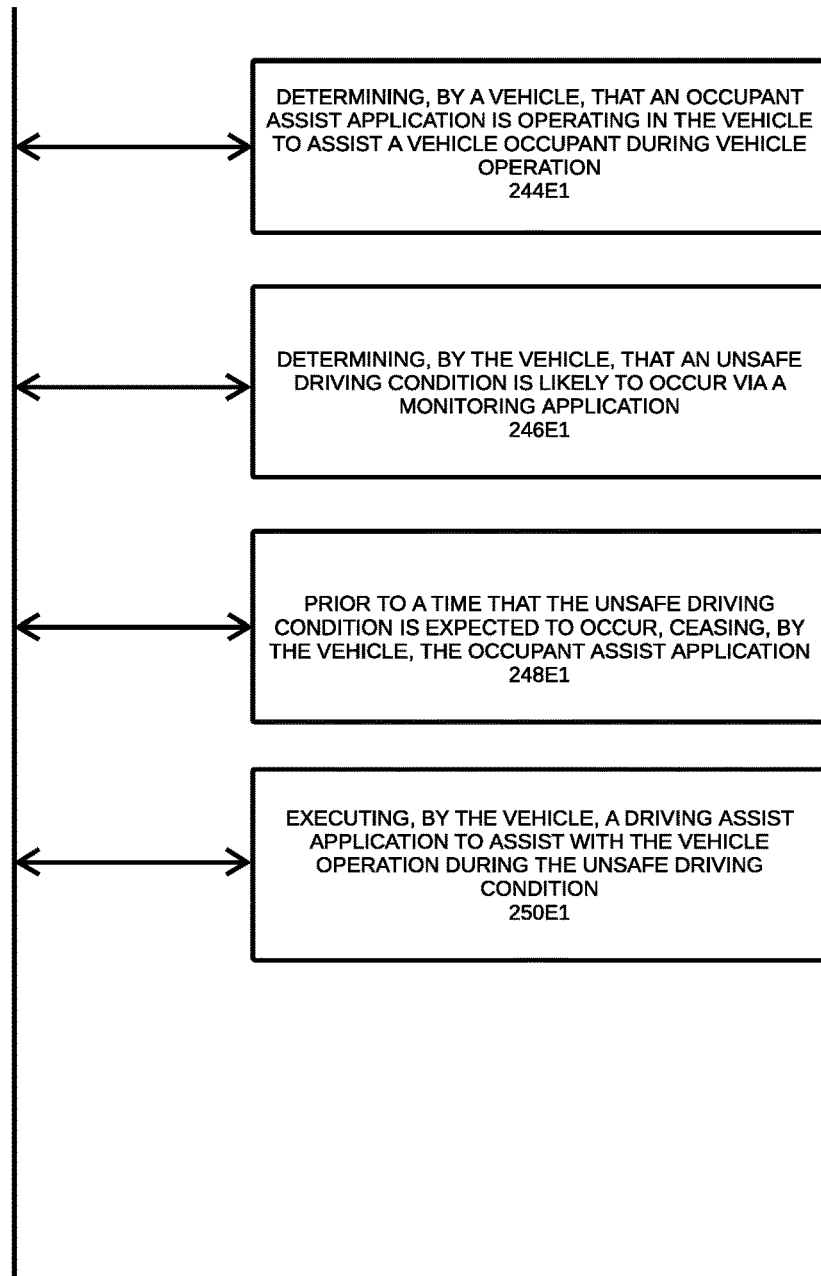
FIG. 2E1

260E2
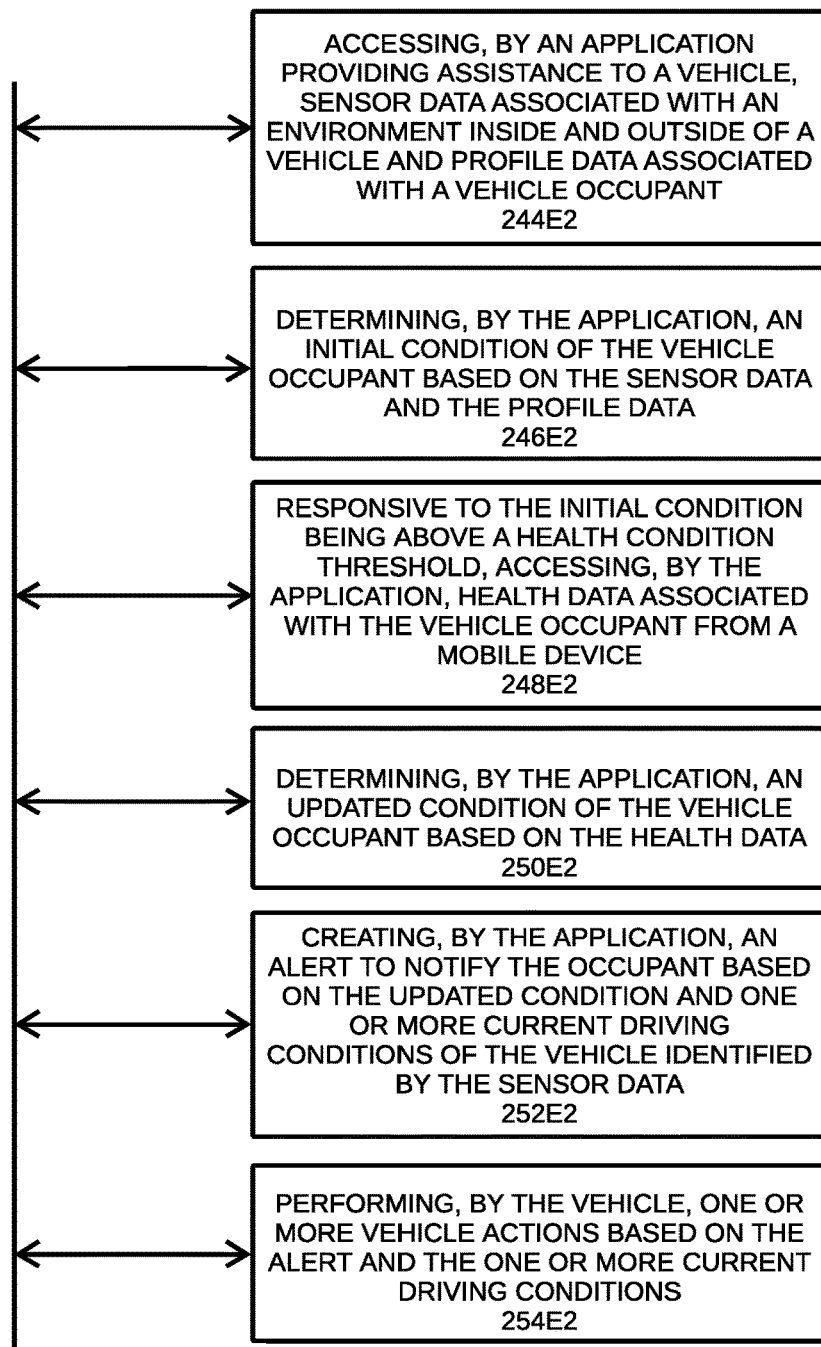
FIG. 2E2

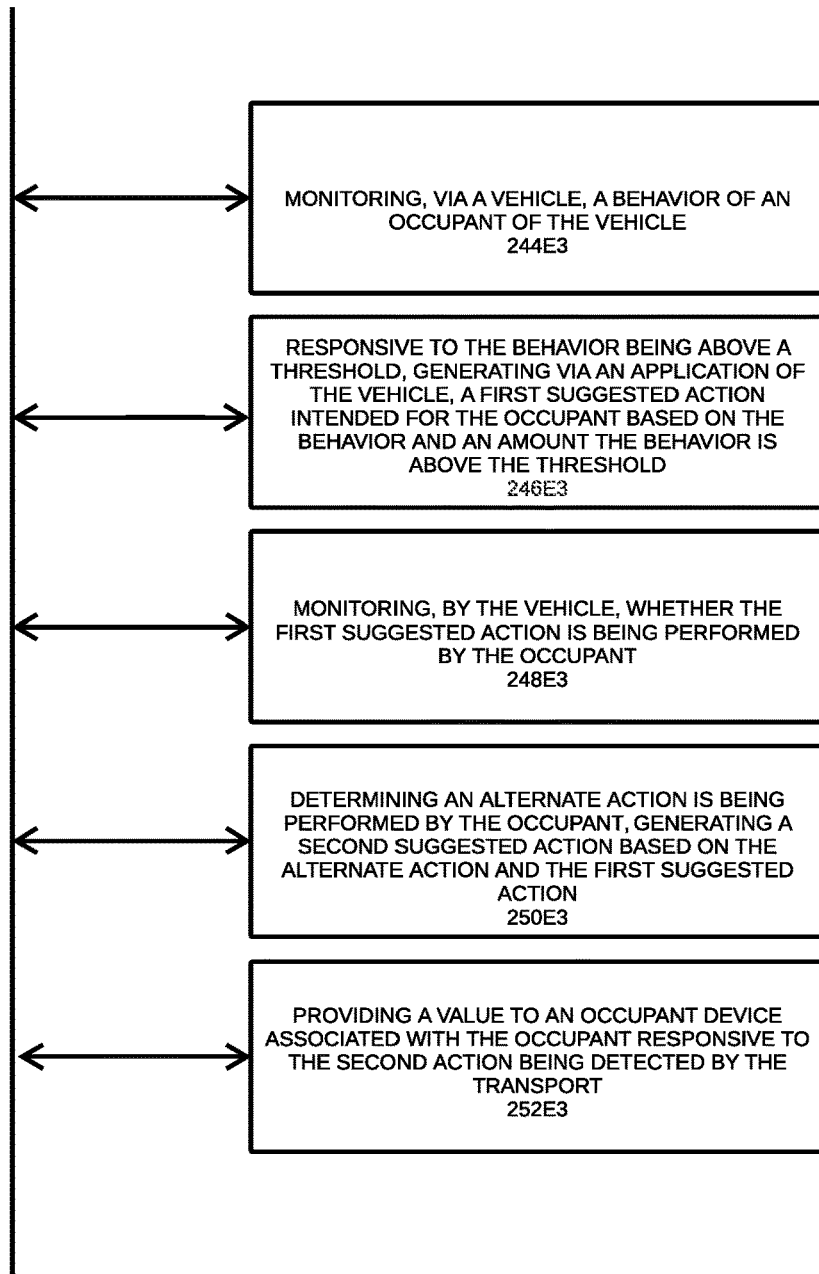
FIG. 2E3

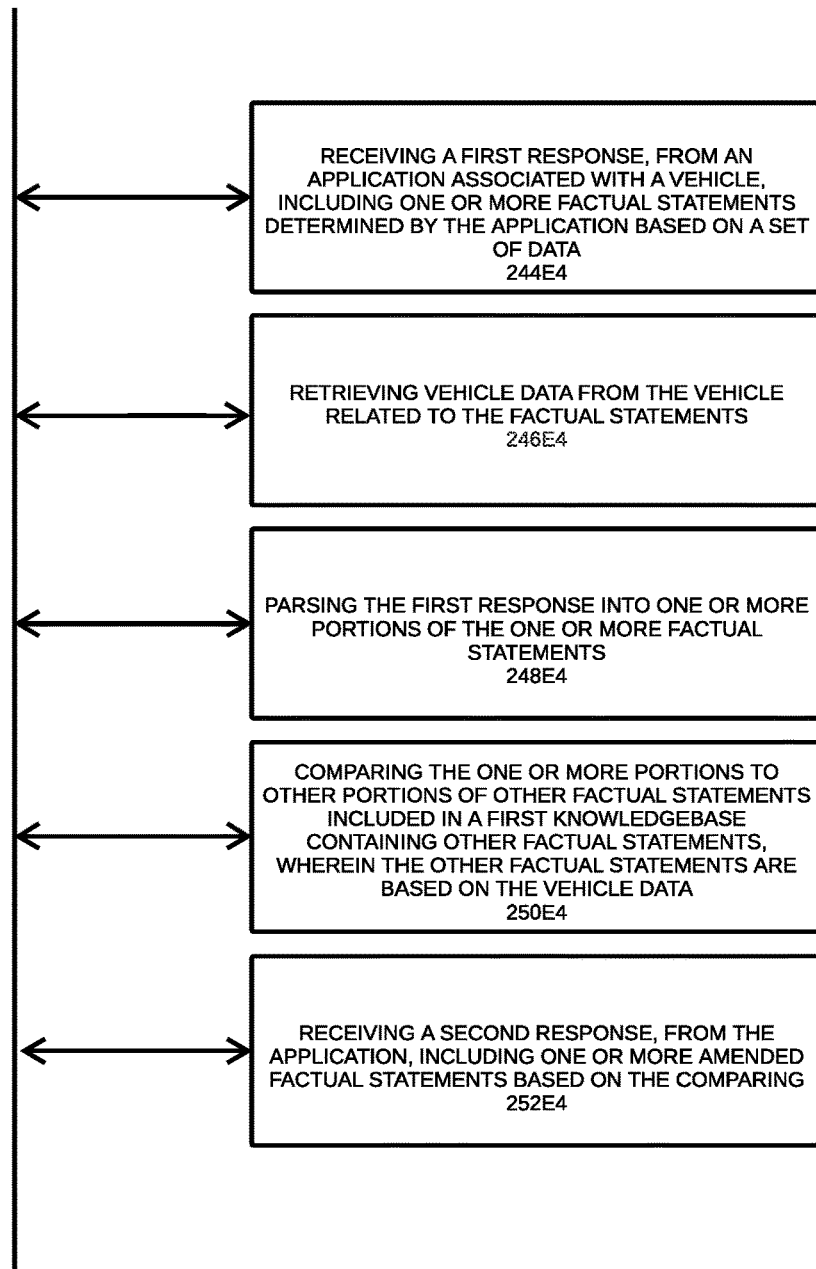
FIG. 2E4

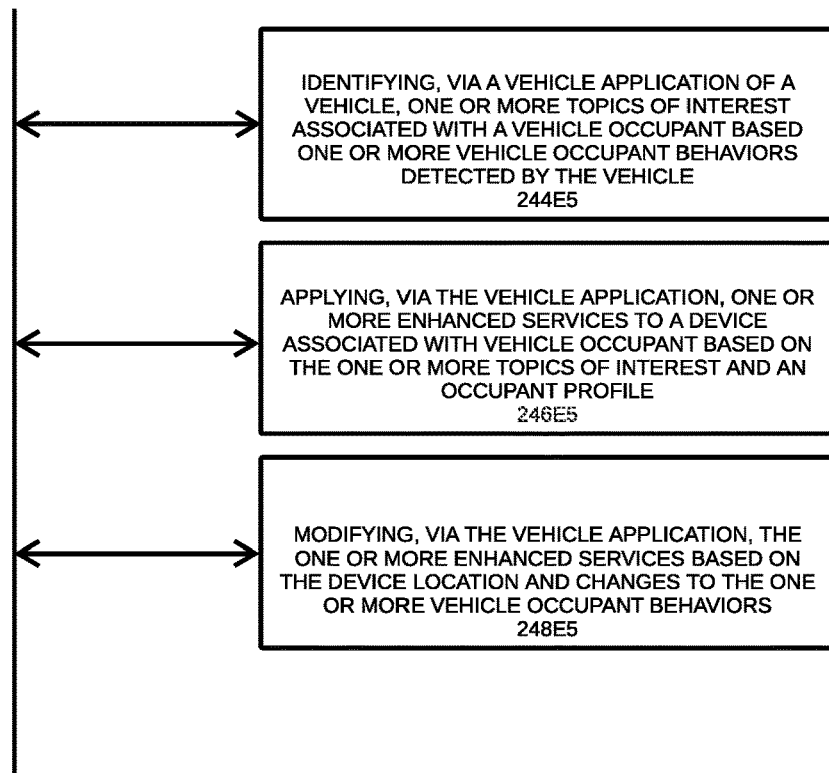
FIG. 2E5

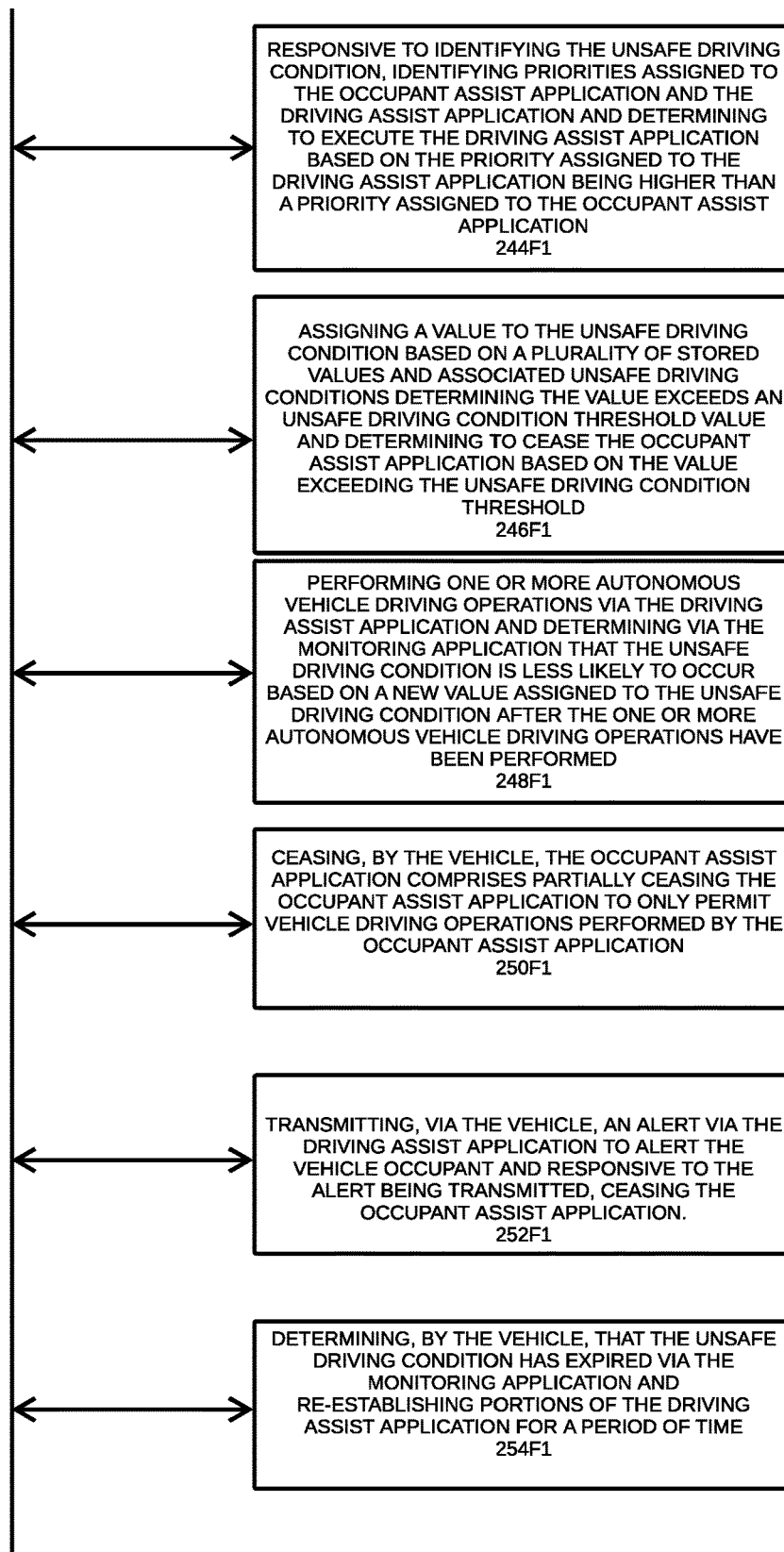
FIG. 2F1

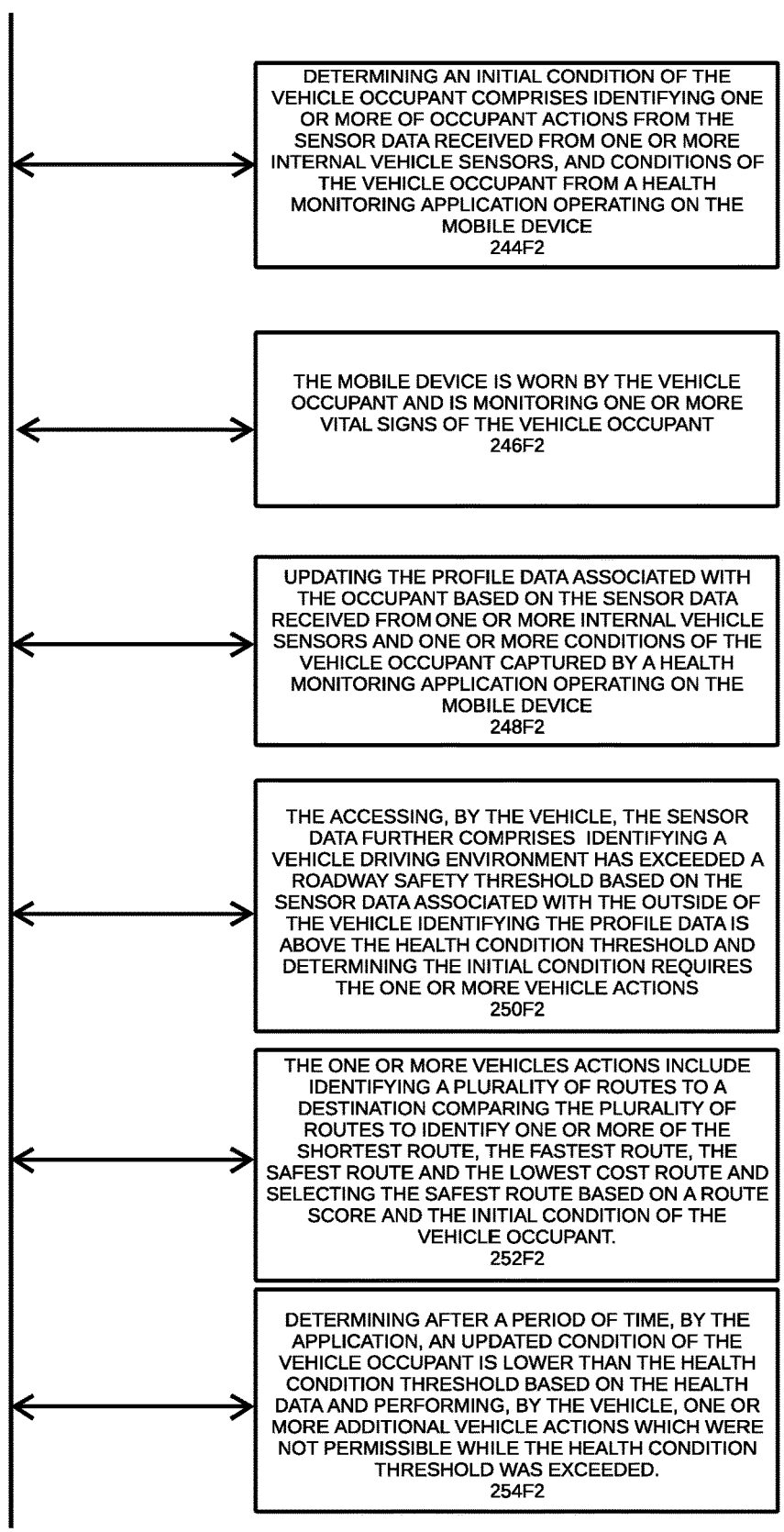
FIG. 2F2

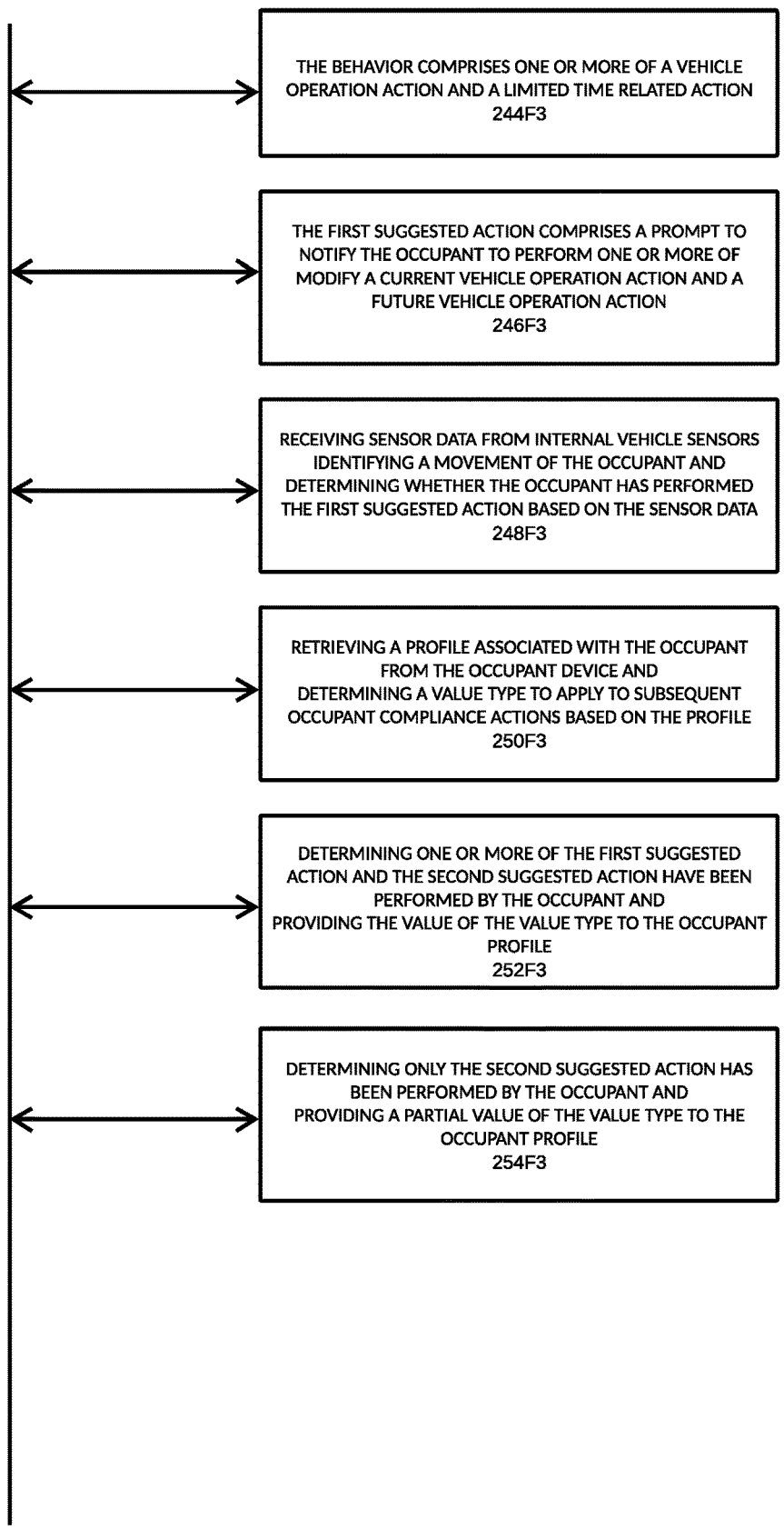
FIG. 2F3

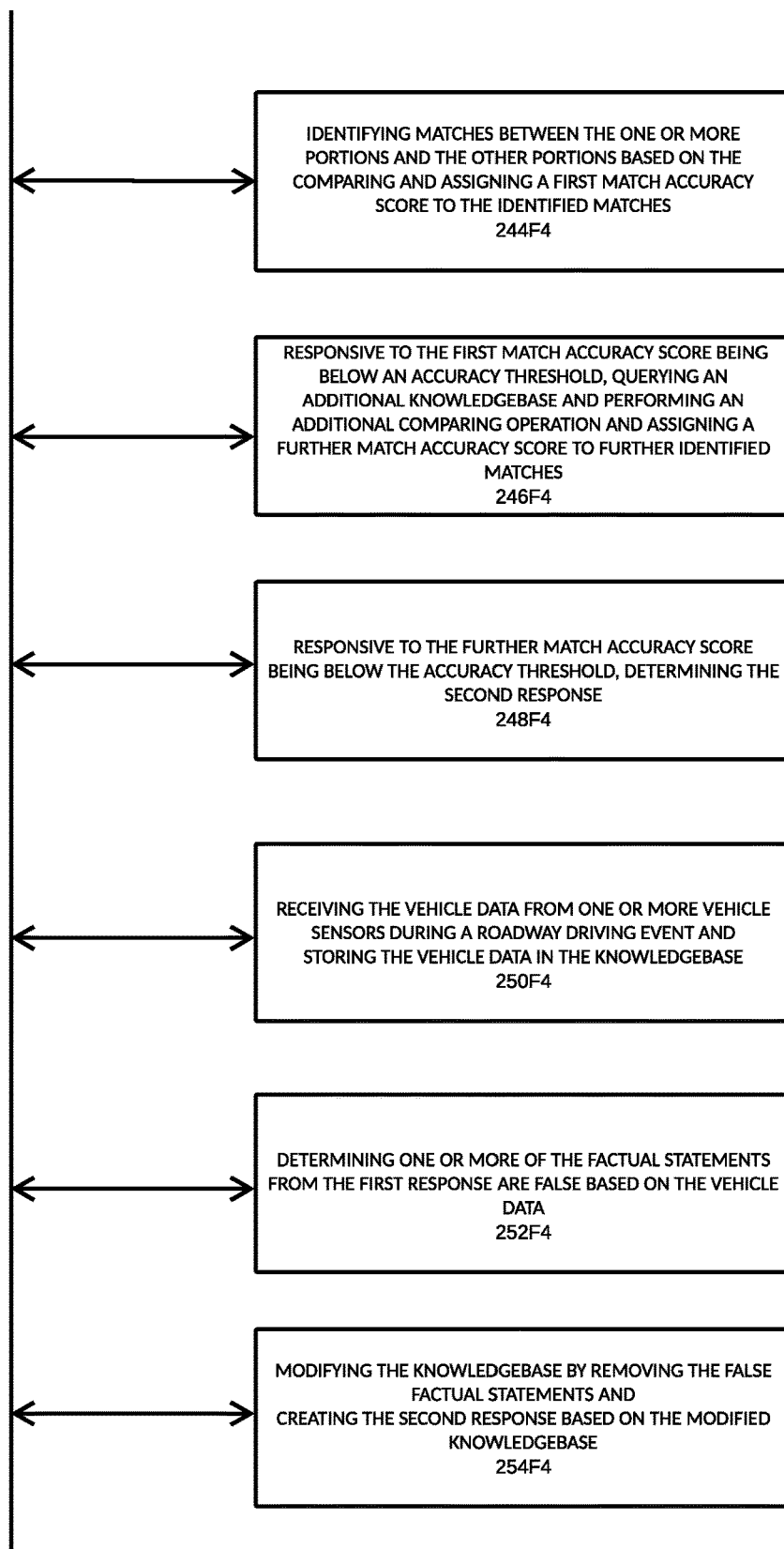
FIG. 2F4

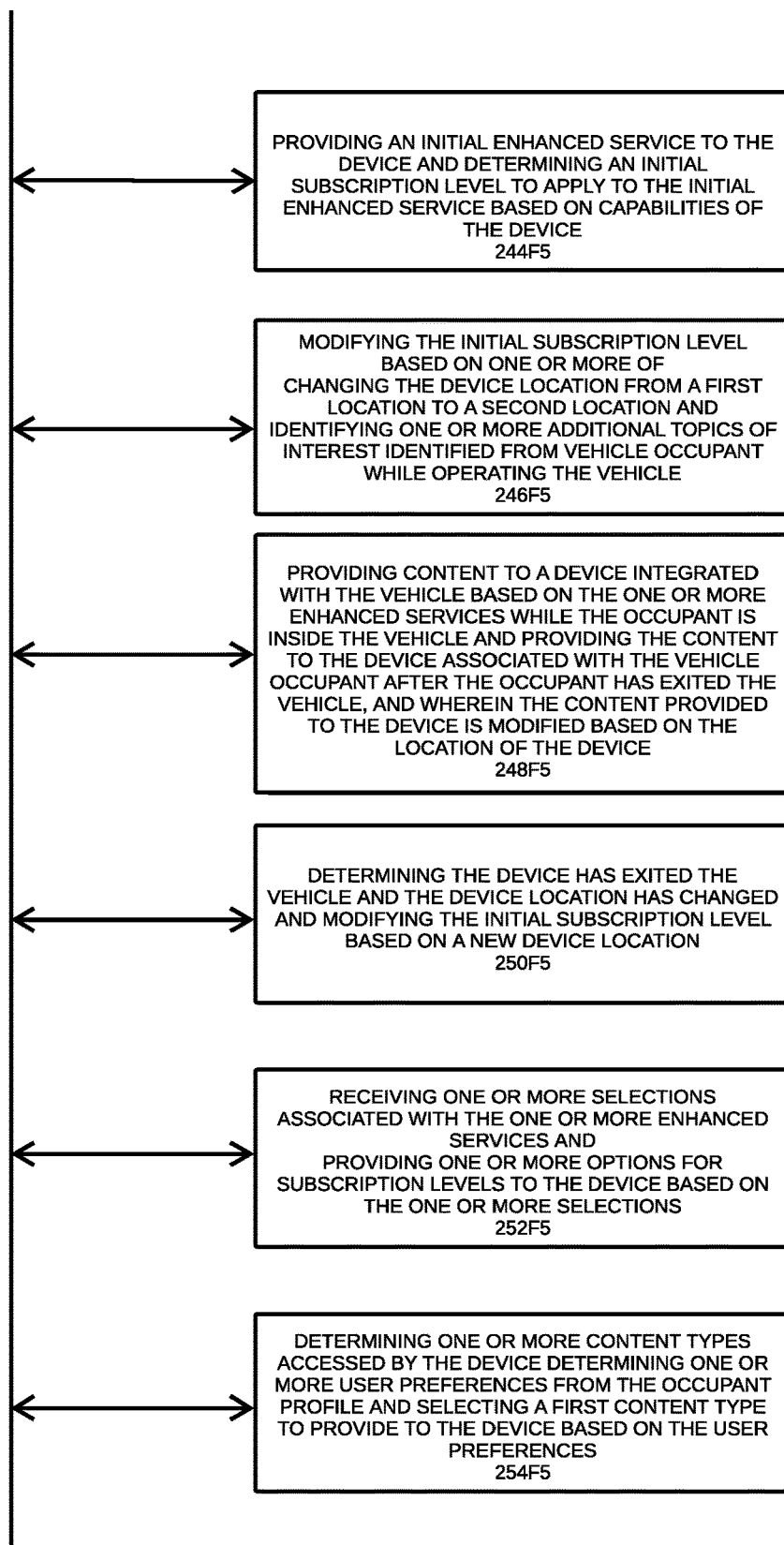
FIG. 2F5

400A

VEHICLE OCCUPANT BEHAVIOR MONITORING APPLICATION

BACKGROUND

Vehicles or transports, such as cars, motorcycles, trucks, planes, trains, etc., generally provide transportation needs to occupants and/or goods in a variety of ways. Functions related to vehicles may be identified and utilized by various computing devices, such as a smartphone or a computer located on and/or off the vehicle.

SUMMARY

An example embodiment may include a process that performs one or more of the following determining, by a vehicle, that an occupant assist application is operating in the vehicle to assist a vehicle occupant during vehicle operation, determining, by the vehicle, that an unsafe driving condition is likely to occur via a monitoring application, prior to a time that the unsafe driving condition is expected to occur, ceasing, by the vehicle, the occupant assist application, and executing, by the vehicle, a driving assist application to assist with the vehicle operation during the unsafe driving condition.

Another example embodiment may include a system that includes one or more of at least one processor of a vehicle, and a memory, wherein the processor and the memory are communicably coupled, wherein the processor determines, by the vehicle, one or more of an occupant assist application is operating in the vehicle to assist a vehicle occupant during vehicle operation, determines, by the vehicle, that an unsafe driving condition is likely to occur via a monitoring application, prior to a time that the unsafe driving condition is expected to occur, ceases, by the vehicle, the occupant assist application, and executes, by the vehicle, a driving assist application to assist with the vehicle operation during the unsafe driving condition.

Another example embodiment may include a non-transitory computer readable medium configured to store instructions that when executed cause a processor to perform one or more of determining, by a vehicle, that an occupant assist application is operating in the vehicle to assist a vehicle occupant during vehicle operation, determining, by the vehicle, that an unsafe driving condition is likely to occur via a monitoring application, prior to a time that the unsafe driving condition is expected to occur, ceasing, by the vehicle, the occupant assist application, and executing, by the vehicle, a driving assist application to assist with the vehicle operation during the unsafe driving condition.

Another example embodiment may include a process that includes one or more of accessing, by an application providing assistance to a vehicle, sensor data associated with an environment inside and outside of a vehicle and profile data associated with a vehicle occupant, determining, by the application, an initial condition of the vehicle occupant based on the sensor data and the profile data, responsive to the initial condition being above a health condition threshold, accessing, by the application, health data associated with the vehicle occupant from a mobile device, determining, by the application, an updated condition of the vehicle occupant based on the health data, creating, by the application, an alert to notify the occupant based on the updated condition and one or more current driving conditions of the vehicle identified by the sensor data, and performing, by the vehicle, one or more vehicle actions based on the alert and the one or more current driving conditions.

Another example embodiment may include a system that includes one or more of at least one processor, and a memory, wherein the processor and the memory are communicably coupled, wherein the processor accesses, by an application providing assistance to a vehicle, sensor data associated with an environment inside and outside of a vehicle and profile data associated with a vehicle occupant, determines, by the application, an initial condition of the vehicle occupant based on the sensor data and the profile data, responsive to the initial condition being above a health condition threshold, accesses, by the application, health data associated with the vehicle occupant from a mobile device, determines, by the application, an updated condition of the vehicle occupant based on the health data, creates, by the application, an alert to notify the occupant based on the updated condition and one or more current driving conditions of the vehicle identified by the sensor data, and performs, by the vehicle, one or more vehicle actions based on the alert and the one or more current driving conditions.

Another example embodiment may include a non-transitory computer readable storage medium configured to store instructions that when executed cause a processor to perform one or more of accessing, by an application providing assistance to a vehicle, sensor data associated with an environment inside and outside of a vehicle and profile data associated with a vehicle occupant, determining, by the application, an initial condition of the vehicle occupant based on the sensor data and the profile data, responsive to the initial condition being above a health condition threshold, accessing, by the application, health data associated with the vehicle occupant from a mobile device, determining, by the application, an updated condition of the vehicle occupant based on the health data, creating, by the application, an alert to notify the occupant based on the updated condition and one or more current driving conditions of the vehicle identified by the sensor data, and performing, by the vehicle, one or more vehicle actions based on the alert and the one or more current driving conditions.

Another example embodiment may include a process that includes one or more of monitoring, via a vehicle, a behavior of an occupant of the vehicle, responsive to the behavior being above a threshold, generating via an application of the vehicle, a first suggested action intended for the occupant based on the behavior and an amount the behavior is above the threshold, monitoring, by the vehicle, whether the first suggested action is being performed by the occupant, determining an alternate action is being performed by the occupant, generating a second suggested action based on the alternate action and the first suggested action, and providing a value to an occupant device associated with the occupant responsive to the second action being detected by the transport.

Another example embodiment may include a system that includes one or more of the following at least one processor of a vehicle, and a memory, wherein the processor and the memory are communicably coupled, wherein the processor monitors, via the vehicle, a behavior of an occupant of the vehicle, responsive to the behavior being above a threshold, generates via an application of the vehicle, a first suggested action intended for the occupant based on the behavior and an amount the behavior is above the threshold, monitors, by the vehicle, whether the first suggested action is being performed by the occupant, determines an alternate action is being performed by the occupant, generating a second suggested action based on the alternate action and the first suggested action, and provides a value to an occupant device associated with the occupant responsive to the second action being detected by the transport.

Another example embodiment may include a non-transitory computer readable medium with instructions that when executed cause a processor to perform one or more of monitoring, via a vehicle, a behavior of an occupant of the vehicle, responsive to the behavior being above a threshold, generating via an application of the vehicle, a first suggested action intended for the occupant based on the behavior and an amount the behavior is above the threshold, monitoring, by the vehicle, whether the first suggested action is being performed by the occupant, determining an alternate action is being performed by the occupant, generating a second suggested action based on the alternate action and the first suggested action, and providing a value to an occupant device associated with the occupant responsive to the second action being detected by the transport.

Another example embodiment may include a process that includes one or more of receiving a first response, from an application associated with a vehicle, including one or more factual statements determined by the application based on a set of data, retrieving vehicle data from the vehicle related to the factual statements, parsing the first response into one or more portions of the one or more factual statements, comparing the one or more portions to other portions of other factual statements included in a first knowledgebase containing other factual statements, wherein the other factual statements are based on the vehicle data, and receiving a second response, from the application, including one or more amended factual statements based on the comparing.

Another example embodiment may include a system that includes one or more of at least one processor of a vehicle, and a memory, and the processor and the memory are communicably coupled, wherein the processor receives a first response, from an application associated with a vehicle, including one or more factual statements determined by the application based on a set of data, retrieves vehicle data from the vehicle related to the factual statements, parses the first response into one or more portions of the one or more factual statements, compares the one or more portions to other portions of other factual statements included in a first knowledgebase containing other factual statements, wherein the other factual statements are based on the vehicle data, and receives a second response, from the application, including one or more amended factual statements based on the comparison.

Another example embodiment may include a non-transitory computer readable storage medium that includes one or more of receiving a first response, from an application associated with a vehicle, including one or more factual statements determined by the application based on a set of data, retrieving vehicle data from the vehicle related to the factual statements, parsing the first response into one or more portions of the one or more factual statements, comparing the one or more portions to other portions of other factual statements included in a first knowledgebase containing other factual statements, wherein the other factual statements are based on the vehicle data, and receiving a second response, from the application, including one or more amended factual statements based on the comparing.

Another example embodiment may include a process that includes one or more of identifying, via a vehicle application of a vehicle, one or more topics of interest associated with a vehicle occupant based one or more vehicle occupant behaviors detected by the vehicle, applying, via the vehicle application, one or more enhanced services to a device associated with vehicle occupant based on the one or more topics of interest and an occupant profile, and modifying, via the vehicle application, the one or more enhanced services based on the device location and changes to the one or more vehicle occupant behaviors.

Another example embodiment may include a system that includes one or more of at least one processor of a vehicle, and a memory, and the processor and the memory are communicably coupled, and the processor identifies, via a vehicle application of the vehicle, one or more topics of interest associated with a vehicle occupant based one or more vehicle occupant behaviors detected by the vehicle, applies, via the vehicle application, one or more enhanced services to a device associated with vehicle occupant based on the one or more topics of interest and an occupant profile, and modifies, via the vehicle application, the one or more enhanced services based on the device location and changes to the one or more vehicle occupant behaviors.

Another example embodiment may include a non-transitory computer readable storage medium configured to store instructions that when executed cause a processor to perform identifying, via a vehicle application of a vehicle, one or more topics of interest associated with a vehicle occupant based one or more vehicle occupant behaviors detected by the vehicle, applying, via the vehicle application, one or more enhanced services to a device associated with vehicle occupant based on the one or more topics of interest and an occupant profile, and modifying, via the vehicle application, the one or more enhanced services based on the device location and changes to the one or more vehicle occupant behaviors.

BRIEF DESCRIPTION OF THE DRAWINGS

FIG. 2C1 illustrates yet another vehicle network diagram, according to example embodiments.

FIG. 2C2 illustrates yet another vehicle network diagram, according to example embodiments.

FIG. 2C3 illustrates yet another vehicle network diagram, according to example embodiments.

FIG. 2C4 illustrates yet another vehicle network diagram, according to example embodiments.

FIG. 2C5 illustrates yet another vehicle network diagram, according to example embodiments.

FIG. 2D1 illustrates a further vehicle network diagram, according to example embodiments.

FIG. 2D2 illustrates a further vehicle network diagram, according to example embodiments.

FIG. 2D3 illustrates a further vehicle network diagram, according to example embodiments.

FIG. 2D4 illustrates a further vehicle network diagram, according to example embodiments.

FIG. 2D5 illustrates a further vehicle network diagram, according to example embodiments.

FIG. 2E1 illustrates a flow diagram, according to example embodiments.

FIG. 2E2 illustrates a flow diagram, according to example embodiments.

FIG. 2E3 illustrates a flow diagram, according to example embodiments.

FIG. 2E4 illustrates a flow diagram, according to example embodiments.

FIG. 2E5 illustrates a flow diagram, according to example embodiments.

FIG. 2F1 illustrates another flow diagram, according to example embodiments.

FIG. 2F2 illustrates another flow diagram, according to example embodiments.

FIG. 2F3 illustrates another flow diagram, according to example embodiments.

FIG. 2F4 illustrates another flow diagram, according to example embodiments.

FIG. 2F5 illustrates another flow diagram, according to example embodiments.

DETAILED DESCRIPTION

Figure 1A:
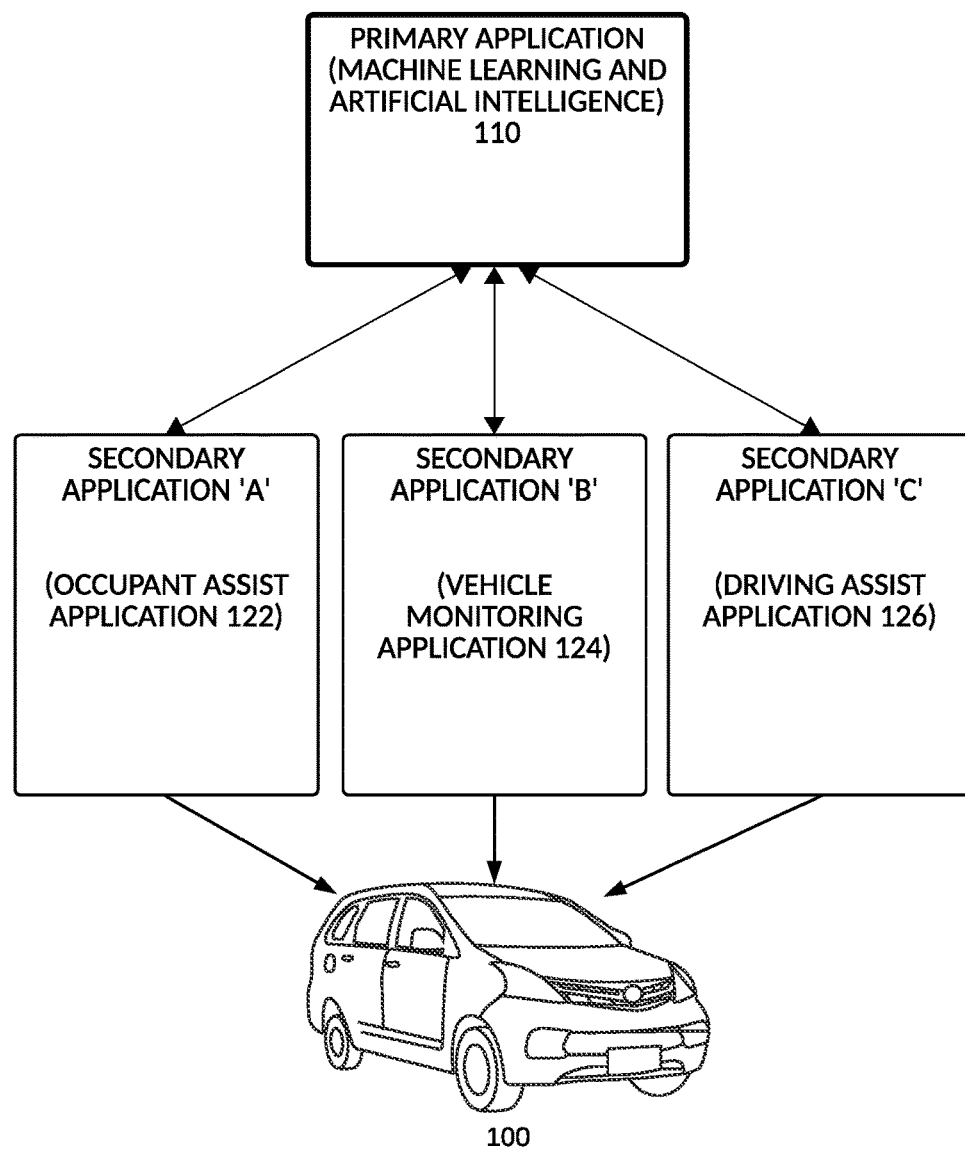
FIG. 1A illustrates an example machine learning and artificial intelligence primary application that receives data to monitor, manage and control other applications associated with a vehicle, according to example embodiments.

It will be readily understood that the instant components, as generally described and illustrated in the figures herein, may be arranged and designed in a wide variety of different configurations. Thus, the following detailed description of the embodiments of at least one of a method, apparatus, computer readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer readable media or a non-transitory computer readable storage medium.

Communications between the vehicle(s) and certain entities, such as remote servers, other vehicles and local computing devices (e.g., smartphones, personal computers, vehicle-embedded computers, etc.) may be sent and/or received and processed by one or more 'components' which may be hardware, firmware, software or a combination thereof. The components may be part of any of these entities or computing devices or certain other computing devices. In one example, consensus decisions related to blockchain transactions may be performed by one or more computing devices or components (which may be any element described and/or depicted herein) associated with the vehicle(s) and one or more of the components outside or at a remote location from the vehicle(s).

The instant features, structures, or characteristics described in this specification may be combined in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one example. Thus, appearances of the phrases "example embodiments", "in some embodiments", "in other embodiments," or other similar language, throughout this specification can all refer to the same embodiment. Thus, these embodiments may work in conjunction with any of the other embodiments, may not be functionally separate, and the described features, structures, or characteristics may be combined in any suitable manner in one or more embodiments. In the diagrams, any connection between elements can permit one-way and/or two-way communication, even if the depicted connection is a one-way or two-way arrow. In the current solution, a vehicle may include one or more of cars, trucks, Internal Combustion Engine (ICE) vehicles, battery electric vehicle (BEV), e-Palettes, fuel cell bus, motorcycles, scooters, bicycles, boats, recreational vehicles, planes, drones, Unmanned Aerial Vehicle (UAV) and any object that may be used to transport people and or goods from one location to another. In the diagrams, any connection between elements can permit one-way and/or two-way communication, even if the depicted connection is a one-way or two-way arrow. In the current solution, a vehicle may include one or more of cars, trucks, walking area battery electric vehicle (BEV), e-Palette, fuel cell bus, motorcycles, scooters, bicycles, boats, recreational vehicles, planes, and any object that may be used to transport people and or goods from one location to another.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer readable media, devices, and/or networks, which provide at least one of a transport (also referred to as a vehicle or car herein), a data collection system, a data monitoring system, a verification system, an authorization system, and a vehicle data distribution system. The vehicle status condition data received in the form of communication messages, such as wireless data network communications and/or wired communication messages, may be processed to identify vehicle status conditions and provide feedback on the condition and/or changes of a vehicle. In one example, a user profile may be applied to a particular vehicle to authorize a current vehicle event, service stops at service stations, to authorize subsequent vehicle rental services, and enable vehicle-to-vehicle communications.

Within the communication infrastructure, a decentralized database is a distributed storage system which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes, or peer nodes. Each peer maintains a copy of the database records, and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In public or permissionless blockchains, anyone can participate without a specific identity. Public blockchains can involve cryptocurrencies and use consensus-based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol produces an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry proposals to an ordering service (e.g., ordering node). Another type of node is a peer node, which can receive client submitted entries, commit the entries and maintain a state and a copy of the ledger of blockchain entries. Peers can also have the role of an endorser. An ordering-service-node or orderer is a node running the communication service for all nodes and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which stores an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the vehicle, the exterior of the vehicle, on a fixed object apart from the vehicle, and on another vehicle proximate the vehicle. The sensor may also be associated with the vehicle's speed, the vehicle's braking, the vehicle's acceleration, fuel levels, service needs, the gear-shifting of the vehicle, the vehicle's steering, and the like. A sensor, as described herein, may also be a device, such as a wireless device in and/or proximate to the vehicle. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach could not be implemented on a traditional centralized database.

Various driving systems of the instant solution can utilize software, an array of sensors as well as machine learning functionality, light detection and ranging (Lidar) projectors, radar, ultrasonic sensors, etc. to create a map of terrain and road that a vehicle can use for navigation and other purposes. In some embodiments, GPS, maps, cameras, sensors and the like can also be used in autonomous vehicles in place of Lidar.

The instant solution includes, in certain embodiments, authorizing a vehicle for service via an automated and quick authentication scheme. For example, driving up to a charging station or fuel pump may be performed by a vehicle operator or an autonomous vehicle and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the vehicle and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing vehicle-related data and transactions.

Any of the actions described herein may be performed by one or more processors (such as a microprocessor, a sensor, an Electronic Control Unit (ECU), a head unit, and the like), with or without memory, which may be located on-board the vehicle and/or or off-board the vehicle (such as a server, computer, mobile/wireless device, etc.). The one or more processors may communicate with other memory and/or other processors on-board or off-board other vehicles to utilize data being sent by and/or to the vehicle. The one or more processors and the other processors can send data, receive data, and utilize this data to perform one or more of the actions described or depicted herein.

FIG. 1A illustrates an example machine learning and artificial intelligence (AI) primary application that receives data to monitor, manage and control other applications associated with a vehicle, according to example embodiments. Referring to FIG. 1A, the vehicle 100 is operating an occupant assist application that operates by providing information, prompts, vehicle related action in an attempt to assist one or more vehicle occupants while approaching the vehicle, being inside the vehicle and/or operating the vehicle. The occupant assist application 122 may be monitoring an occupant's current health status, preparing a navigation route based on destinations and occupant profile preferences, planning a logistics operation, etc.

The vehicle 100 is also operating a monitoring application 124 concurrently with the occupant assist application 122 to monitor the use of the vehicle, status of the occupant(s) conditions of the vehicle, conditions of a roadway, upcoming traffic, weather conditions, etc. The vehicle 100 is generally using the monitoring application 124 most of the time the vehicle is operational especially when vehicle conditions change, etc. The monitoring application identifies unsafe conditions which are occurring or are likely to occur in the future. The occupant assist application 122 may be suspended when the monitoring application identifies a particular condition that is potentially detrimental to the operation of the vehicle. Another application, such as a driving assist application 126 may be dormant while the occupant assist application 122 is operational. In one example, the occupant assist application 122 may be providing the occupant(s) with answers to questions, entertainment options (e.g., video, radio, etc.), assistance for traveling, planning, etc. However, when the vehicle monitoring application 124 identifies a concern, such as upcoming roadway safety concerns, traffic, weather changes, etc., the driving assist application 126, which was previously dormant, may be enacted to begin operation to assist with the automated and suggested operation of the vehicle. The occupant assist application 122 may be suspended for a period of time pending an outcome of driving conditions identified by the management application 124.

The primary application 110 may be a machine learning and/or artificial intelligence based application that manages the start and stop of one or more sub-applications or subordinate applications, such as applications 122-126. The artificial intelligence application 110 may establish a databank as a primary information source that collects inputted data that is received starting with a particular starting point of time. The start of information collection may be triggered by one or more vehicle operations, such as a vehicle start-up, a vehicle application (122-126) initiation, etc. The inputted data may include current roadway conditions (e.g., traffic, navigation routes) occupant data, such as user profile data of one or more occupants including but not limited to preferences, a current navigation route, user health information, etc. The inputted data may also be a combination of internal and external sensor data that is produced by one or more vehicle sensors and/or one or more occupant devices. Once a databank is initiated, the information may be formed into a collection of data that can be used as the basis for decisions and vehicle actions initiated by the primary application 110.

One example may include one or more objective(s) being identified by the primary application 110, such as vehicle safety, occupant(s) safety, efficient navigation, etc. The objective being identified may cause a plurality of threshold values to be imported into the data set of the databank stored in one or more databases accessible to the vehicle and the primary application 110. As sensor data and other data is received and stored for the primary application 110, new processes may be initiated to control operation of the vehicle 100. In one example, as the received data exceeds one or more imported thresholds, vehicle actions may be initiated by the primary application 110 to control operation of the vehicle. The primary application 110 may act as an umbrella application that manages all of the subordinate applications using scores, thresholds, priority and the knowledgebase of information that is constantly growing based on the additional inputted data. The databank may have a time window of operation and the artificial intelligence may cause the application to continue to cause vehicle operation actions to be performed until the time window has expired and the data is purged and/or until the vehicle stops operating for a period of time. The vehicle 100 may continue to store and use the same databank of information for the life of the vehicle and for the life of additional vehicles operated by a common occupant and managed by the occupant profile. The databank may also provide the primary application 110 to make predictions about various operation techniques (e.g., traffic, safety, efficiency) and share that information with the occupant and cause actions to be performed by the vehicle or transport 110 and other transports which are proximate to the transport. Any change in the databank of information can cause new actions to be performed and may cause previous actions to be withdrawn. In one example, the health monitoring of the occupant may demonstrate that the occupant is exceeding a safety concern by performing detectable actions which are captured by sensor data. That sensor data may cause a safety threshold to be exceeded. If the occupant then behaves in a way that causes the safety threshold to not be exceeded, the actions taken by the primary application 110 may cause the subordinate applications to being operating, cease operating or provide additional functions which may not have been available prior to the occupant having been detected as exceeded the safety threshold.

According to example embodiments, the AI application or system deployed in the vehicle 100 is capable of various enhanced AI services, one of which is assisting with unsafe driving situations. Modern vehicles are equipped with sensors on the exterior, in the chassis, and in the interior cabin. The exterior sensors may provide information about the vehicle's surroundings, such as weather conditions, terrain, and obstacles. The chassis and component sensors provide information about the vehicle's operating conditions, such as engine, brakes, fluid levels, collisions and tires. The interior sensors may provide information about the vehicle's occupants, such as facial expressions, gaze, speech, breathing, behavior (anger, intoxication, etc.) and health vitals.

The many sensors are integrated into a vehicle's advanced driver assistance system (ADAS). Such components provide technologies which are real-time and which are intended to promote safety, alert the driver, avoid collisions, and take control of vehicle operation if necessary. ADAS reacts quickly to multiple data inputs and uses preemptive priority scheduling to organize which task needs to be completed first. The ADAS technology relies on multiple data sources, such as in-car networking and various sensors that can perform automotive imaging, LIDAR, radar, and image processing. In one example, upon the ADAS detection that an unsafe driving situation has arisen outside of the vehicle, within the chassis or components of the vehicle, or in the cabin of the vehicle, the primary application 110 may cease the currently running AI application(s) that have engaged the driver (e.g., 122), in order to regain the driver's attention, and execute an appropriate AI application (e.g., 126) to assist in the unsafe driving condition. For example, the vehicle's ADAS automotive navigation system may detect a dangerous intersection, a freeway interchange, or lanes merging. The detection may be scored and compared to a particular threshold value and if the score exceeds the value then the primary application 110 may elect to pause the occupant assist application, which may also be an AI application, which has been engaged in conversation with the occupant performing various responses and services while the occupant is operating the vehicle 100. The primary application 110 may then execute another AI application, such as driving assist 126 to assist with automated operation of the vehicle during the unsafe situation. The decision of which AI applications are permissible when others are not permissible may be based on a scoring procedure that when certain scores are high, such as unsafe roadway conditions, which may be detected by vehicle sensor data as being currently high, such as 85 out of 100. The result of a high unsafe roadway score may be one application is not permitted (e.g., occupant assist 122) while another is invoked to begin operating (e.g., driving assist 126) since that vehicle driving assist application may be considered beneficial to reducing the vehicle operation score.

In one example embodiment, instead of ceasing a first AI application, the vehicle executes another AI application to run concurrently with the first AI application. For example, the instant that a safety concern is identified, the vehicle monitoring application 124 may begin operating assuming it is already not operating. In another example, the vehicle pauses the active AI assist application (e.g., a conversation between the application and the occupant) and marks the status of the application where the AI assist was paused, so that the AI application can be resumed later with the same information being reused to resume that session. After the unsafe driving condition has passed and/or based on an amount of time that has transpired, the AI assist application provides a brief synopsis of the discussion before resuming the conversation with the occupant. In another example, after the occupant has exited the vehicle, the AI application, running on an application of the occupant's personal device may prompt the driver if they would like to resume the conversation now, or if not now, when a time that the AI should inquire again later.

In another example, if the unsafe driving condition is one in which the occupant can handle the situation without assistance, the vehicle ceases (or pauses) the AI application that has engaged the driver's attention (application 122) and executes the another AI application (application 124) to alert the driver, and subsequently executes a second AI application (application 126) to alert with increased intensity. The prompt could be delivered audibly, such an announcement stating that there is traffic ahead and to break gently, or a tone with graduated volume and/or repeating intensity to indicate the severity of the warning. The cue could also be delivered visually, such as on a heads-up display that shows the obstacle on the unlit road ahead. In another example, if the unsafe driving condition is imminent, or if the vehicle has detected the driver is experiencing a medical emergency, the vehicle may execute an AI application (126) to take control of the vehicle on behalf of the driver until a later point in time when it is safe for the control to be relinquished back to the driver. The term 'occupant' and 'driver' are used interchangeably and may be the same user.

One example process of operation may include determining, by a vehicle, that an occupant assist application 122 is operating in the vehicle 100 to assist a vehicle occupant during vehicle operation, and determining, by the vehicle, that an unsafe driving condition is likely to occur via a monitoring application 124 which may be operating concurrently with the assist application 122. The primary application may be using a databank of information to make decisions and predictions about how to operate the vehicle based on an AI corpus of data being expanded by various data inputs which cause various data outputs. Prior to a time that the unsafe driving condition is expected to occur, the vehicle may cease the occupant assist application as instructed by the AI functions of the primary application 110 or other applications. The process may also include executing, by the vehicle, a driving assist application to assist with the vehicle operation during the unsafe driving condition. Other types of applications may also be initiated to being operation based on the triggers necessary to start and stop any of the one or more available applications. Such as exceeded, underperformed thresholds, scores and other criteria being tracked and monitored and associated with the operation of the vehicle.

In another example, responsive to identifying the unsafe driving condition, the primary application may identify priorities assigned to the occupant assist application and the driving assist application, and determine to execute the driving assist application based on the priority assigned to the driving assist application being higher than a priority assigned to the occupant assist application. The changing of applications (starting, stopping, etc.) may be managed by the primary application and the decisions to perform such actions may be based on AI functions. The process may also include assigning a value to the unsafe driving condition based on a plurality of stored values and associated unsafe driving conditions, determining the value exceeds an unsafe driving condition threshold value, and determining to cease the occupant assist application based on the value exceeding the unsafe driving condition threshold.

The process may also include performing one or more autonomous vehicle driving operations via the driving assist application, and determining via the monitoring application that the unsafe driving condition is less likely to occur based on a new value assigned to the unsafe driving condition after the one or more autonomous vehicle driving operations have been performed. The process may also include ceasing, by the vehicle, the occupant assist application comprises partially ceasing the occupant assist application to only permit vehicle driving operations performed by the occupant assist application. The process may also include transmitting, via the vehicle, an alert via the driving assist application to alert the vehicle occupant; and responsive to the alert being transmitted, ceasing the occupant assist application. The process may also include determining, by the vehicle, that the unsafe driving condition has expired via the monitoring application, and re-establishing portions of the driving assist application for a period of time.

Figure 1B:
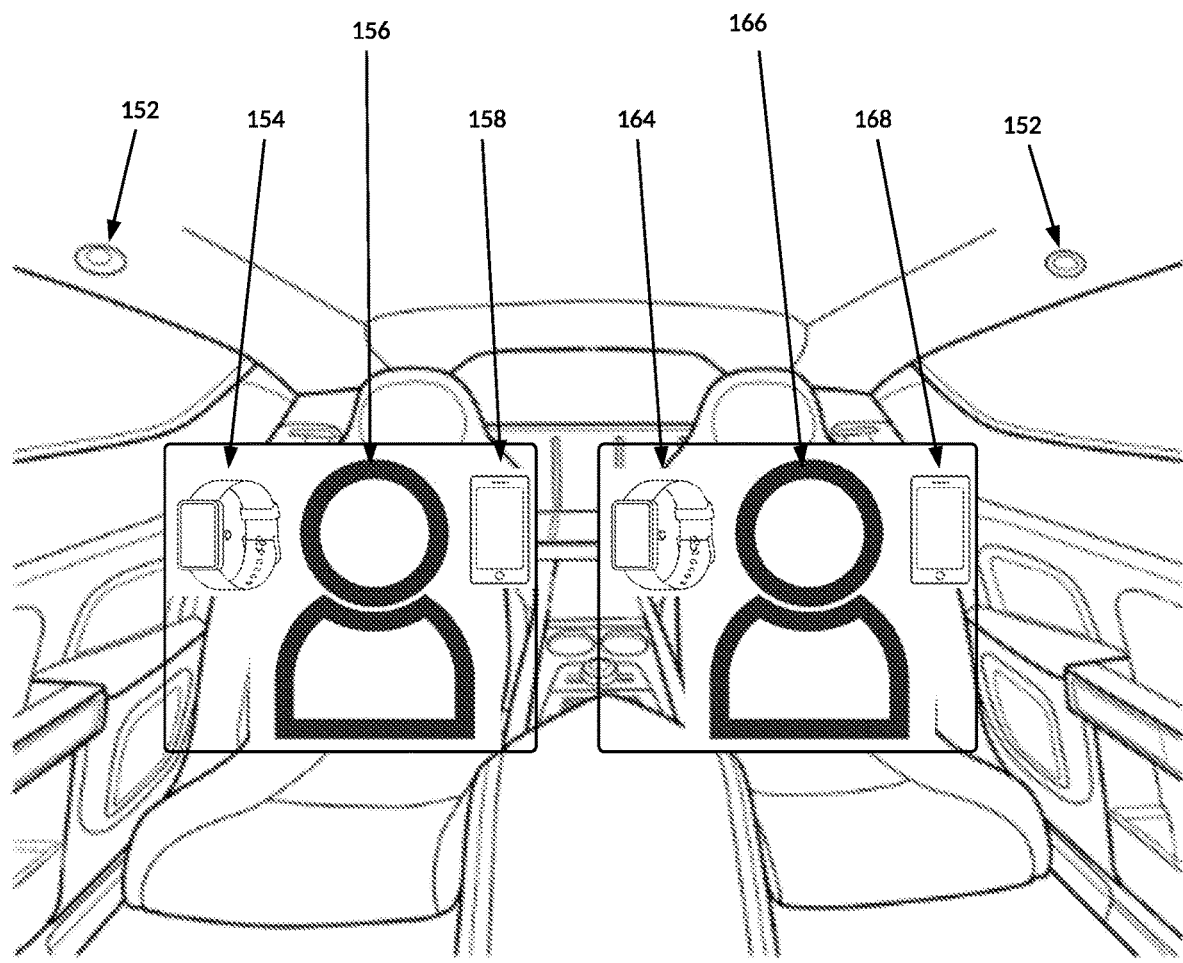
FIG. 1B illustrates a further example of one or more vehicle occupants being monitored by a machine learning and artificial intelligence application that utilizes occupant data to control vehicle operation, according to example embodiments.

FIG. 1B illustrates a further example of one or more vehicle occupants being monitored by a machine learning and artificial intelligence application that utilizes occupant data to control vehicle operation, according to example embodiments. Referring to FIG. 1B, the example configuration 150 provides an interior view of vehicle 100. The example provides multiple vehicle occupants including a main occupant or driver 166 and a second occupant 156. There may be any number of occupants in the vehicle 100. The health monitoring application may be an artificial intelligence and/or machine learning type of application that operates by receiving various data inputs from various sources, such as vehicle sensors inside the vehicle 152 and vehicle sensors outside the vehicle (not shown). The internal sensors 152 may be monitoring an occupant's breathing patterns by tracking movement of their mouth, chest and/or vital signs. The sensors 152 may also be monitoring noise, words that are spoken by the occupants, body gestures, hand gestures and other types of behavior to determine if the occupant is safe and healthy. Any of these occupant activities may be compared to an occupant behavior threshold to determine whether immediate action should be taken by the vehicle controls to assist the occupant(s).

The vehicle 100 may be operating a sensor-based feedback system that tracks the inside and outside environment of the vehicle as well as a profile of the occupant and his or her current, past and potentially future "condition". The occupant may have an occupant profile that is available to the computing system of the vehicle and/or a remote server, and the occupant health status may be updated based on ongoing monitoring processes that include receiving data from internal vehicle sensors, exterior vehicle sensors which may provide details of the vehicle's operation on a roadway and other data that may indicate a condition of the occupant(s). Other data sources may include a mobile device of the user, such as a wireless communication device or a smartphone 168. Still other data sources may include a body worn sensor and communication device, such as a smartwatch 164. Both occupants 166 and 156 in this example may have one or more wireless devices (154/158/164/168) which are providing data to a health monitoring application or occupant assist application 122 and/or to a primary application 110 utilizing an artificial intelligence function and/or machine learning function to provide the vehicle, and, in turn, the occupants with safety actions to perform to alleviate the driving experience while the vehicle is operating.

The primary application 110 may be deriving data from multiple sources to drive a transport application and receive input data from a mobile device application and the vehicle sensors. In one example, the monitoring application 124 and/or the primary application 100 may be tracking and determining the roads may be busy or traffic intensive at a particular time and the occupant is not feeling satisfactory, such an observation made by automated functions of the one or more application may invoke a decision to navigate an easier or safer way to a destination. Other results may ensue, one observation may include performing health measurement monitoring of one or more occupants on a smart watch or identifying the occupant is wearing formal attire and is headed to work. The AI based application, which is providing assistance to the vehicle 100, uses available information sources to compile multiple forms of data to realize a conclusion or action that provides an objective result. In this example, the occupant's health is the focus of the data processing performed by the application. The vehicle is an additional source of data (e.g., sensor data) and is being operated during the occupant health analysis. The information available from the occupant's mobile device, the vehicle sensors and other data sources can provide data necessary for the AI based application to make a decision to protect the occupant with an emphasis on the occupant's health. The transformation procedure creates an alert and resulting transport action.

In one example, the various available information sources and devices use the network to provide the data to the vehicle. The AI functions may access the data collected from the individual's wireless device and other devices and ascertain their health and physical condition. For example, the AI functions may detect the individual is exhausted after exercising. The AI instructs the individual on the safest route to take to the next destination and continues to monitor the individual in case the individual needs assistance. The application may use sensor on the outside of the vehicle to detect cues about the approaching individual, such as identifying their attire or items being carried on their person, to ascertain the activity the individual is planning to perform. Given the detected cues, application may determine where the individual is headed and begins to provide specific information to the individual. For example, if the individual is attaching a bicycle to the vehicle and the vehicle is headed in the direction of a park. The application may provide information about the park, a map of the bike trails, conditions of the trails based on recent weather, suggestions for the best trail suited to their physical activity level, where to park the vehicle, etc.

In another example, if the application observes the individual is carrying their briefcase and is heading to the office for a meeting. The AI functions may access the individual's personality profile and identify that they like to be prepared, so the AI gathers the upcoming meeting schedule to provide a briefing about the participants, the meeting topics, updates to meeting materials, any current events pertaining to the meeting, or any other relevant information to prepare the individual for an upcoming event. In another example, when the individual arrives at the destination, the application remains ever-present, tracking the individual, and searching for data that would be relevant to share. For example, when the individual exits the vehicle to ride a bike, the AI application may transfer to the vehicle application on the fitness watch, and the AI functionality may continue to provide relevant information, such as directions to a path and/or warnings about upcoming trail hazards and dangerous intersections. In another example, when the individual exits the vehicle after arriving home, the AI transfers from the vehicle to an in-home device to continue delivering information to the individual.

One example process may include accessing, by an application providing assistance to a vehicle, sensor data associated with an environment inside and outside of a vehicle and profile data associated with a vehicle occupant and determining, by the application, an initial condition of the vehicle occupant based on the sensor data and the profile data. Such initial data may include whether the vehicle is being operated safely, is undergoing strenuous roadway conditions, etc. The process may also include, responsive to the initial condition being above a health condition threshold, accessing, by the application, health data associated with the vehicle occupant from a mobile device, such as a smartphone. The process may also include determining, by the application, an updated condition of the vehicle occupant based on the health data and creating, by the application, an alert to notify the occupant based on the updated condition and one or more current driving conditions of the vehicle identified by the sensor data, and performing, by the vehicle, one or more vehicle actions based on the alert and the one or more current driving conditions. The AI functions of the application may be setup to monitor an upcoming change in conditions of the vehicle and the occupant's health and then further changes to determine whether a vehicle's health is improving, getting worse or staying the same.

One example may include when monitoring the occupant actions, the application may determine whether the vehicle occupant performs one or more suggested actions. For instance, stop moving, turn on a vehicle feature, (A/C, etc.), drink some water, turn the fan on, roll down the window, make a phone call, contact another occupant to make sure the occupant performs the action, move the vents, make sure the other occupant is performing the action, talk to the other occupant. Other actions may include contacting a remote contact, monitoring the heart rate of a first occupant, and if it is above a threshold, then accessing the mobile device of that occupant to retrieve additional health vital signs, the updated condition may be updated based on the received data and the wireless device being compared for data integrity. If a discrepancy exists, the application may make a decision as to whether the occupant really needs assistance. The occupant may be behaving erratically, however, it may be a false positive identification since the occupant is healthy but was just moving around while listening to a fast paced song on the radio.

The other occupants may also be monitored to ensure their vital signs are below a threshold value. The other occupants may be demonstrating a safe vital sign reading that is not above a threshold, example thresholds include a heart rate, breathing rate, pulse, blood pressure. The sensors can be a camera, steering wheel hand pad pulse sensor, vehicle seat sensors, etc. The wireless device may be a watch worn on the wrist of the user or another device.

Continuing with the same process, the process may also include determining an initial condition of the vehicle occupant includes identifying one or more of occupant actions from the sensor data received from one or more internal vehicle sensors, and conditions of the vehicle occupant from a health monitoring application operating on the mobile device. The mobile device may be worn by the vehicle occupant and may be monitoring one or more vital signs of the vehicle occupant. The process may also include updating the profile data associated with the occupant based on the sensor data received from one or more internal vehicle sensors and one or more conditions of the vehicle occupant captured by a health monitoring application operating on the mobile device. The accessing, by the vehicle, the sensor data further may include identifying a vehicle driving environment has exceeded a roadway safety threshold based on the sensor data associated with the outside of the vehicle, identifying the profile data is above the health condition threshold, and determining the initial condition requires the one or more vehicle actions. Also, the one or more vehicles actions may include identifying a plurality of routes to a destination, comparing the plurality of routes to identify one or more of the shortest route, the fastest route, the safest route and the lowest cost route, and selecting the safest route based on a route score and the initial condition of the vehicle occupant. The process may also include determining after a period of time, by the application, an updated condition of the vehicle occupant is lower than the health condition threshold based on the health data, and performing, by the vehicle, one or more additional vehicle actions which were not permissible while the health condition threshold was exceeded.

In one embodiment, the instant solution provides a dynamic shift between an occupant assist application 122 and a driving assist application 126 based on the real-time assessment of potentially unsafe driving conditions. Operations of the vehicle 100 are determined, anticipating unsafe conditions. Software behaviors are adjusted to prioritize safety using adaptive, context-aware AI systems 110. The instant solution, executing in a processor associated with the vehicle, has an AI-driven module, which constantly monitors the active applications and services in use. This system monitors the occupant assist application, a software module designed to aid the vehicle's occupant 156/166 in non-driving related tasks, such as providing entertainment, suggesting in-car amenities, interacting about topics of interest, etc. The monitoring is done using onboard vehicle sensors 152, software application status checks, and/or communication with a device 158/168 associated with an occupant of the vehicle. In one embodiment, a separate monitoring application 124 (or a subset of the primary AI system executing in the vehicle and/or a server connected to the vehicle) constantly processes data from the vehicle's external sensors, such as cameras, lidars, and radars. Additionally, external data is obtained from one or more servers associated with real-time data about weather reports, traffic updates, and road conditions. The AI system predicts unsafe driving conditions by combining this external data with knowledge about the vehicle's status and the driver's behavior. For example, when the vehicle moves at high speeds in a densely populated area, and the weather report predicts rain, the system may determine a higher likelihood of unsafe conditions. When the AI determines a potential risk, the primary action is to minimize distractions. The instant solution suggests or invokes other software applications, such as sending a command to cease or minimize the functions of the occupant assist application. In one embodiment, this may involve pausing media playback, minimizing displays, or silencing notifications, ensuring the vehicle's occupant and possibly the driver isn't distracted. After ceasing the occupant assist features, the AI system invokes the driving assist application. This application is equipped to aid the driver in maneuvering through or avoiding the predicted unsafe conditions. In one embodiment, the driving assist might have multiple levels. For imminent threats, it takes partial control of the vehicle, guiding it to safety, or suggests optimal paths to the driver, such as messages sent to a display on the vehicle, such as the display associated with the head unit. It may also adjust in-car settings, like increasing brake responsiveness or adjusting suspension for better grip.

The instant solution identifies a potential unsafe driving condition through its monitoring application 124. This involves the synthesis of various data streams-external sensors, online data sources like weather updates, and internal car metrics-to form a predictive analysis of the immediate driving environment. The AI system 110 maintains a dynamic registry of operational priorities for onboard applications. This registry may be implemented as a list or database, where each application (in this case, the occupant assists and driving assist applications 126) is tagged with a priority value. The priority value is determined based on predefined criteria, such as safety importance, driving conditions, or the driver's set preferences. The AI system conducts a comparative analysis upon identifying a likely unsafe driving condition and referencing the priority values. When the priority assigned to the driving assist application exceeds that of the occupant assist application 122, the system executes the driving assist application. The AI system emphasizes actions or responses that mitigate or navigate the perceived threat, even if it temporarily inconveniences or disrupts the occupant's 156/166 experience.

In one embodiment, the current application utilizes a database or knowledge graph containing potentially unsafe driving conditions and their corresponding severity values. This database may be in the vehicle 100, such as in memory associated with a main processor in the vehicle, or in a server connected to the vehicle, such as through a cloud or network, such as the Internet. For example, a minor road obstruction might have a lower value than a sudden, intense rainstorm. The AI system 110 ensures that these values are assigned based on the potential risks associated with each condition, either derived from historical driving data or expert-driven safety benchmarks obtained from a server connected to the vehicle through a network, for example. Once a potentially unsafe driving condition is identified through the monitoring application 124 (as further described herein), the AI system references the database to fetch the associated severity value or threshold. This threshold serves as a decision-making benchmark. It could be set based on factors such as the vehicle's capabilities, the average reaction times of human drivers, and the acceptable safety margins determined by automotive safety experts. If the assigned value for the unsafe driving condition surpasses the threshold, the AI system decides to cease or reduce the occupant assist application 122 functionalities. This decision prioritizes safety over any other operational aspect of the vehicle. The cessation could be a complete shutdown or a partial reduction, depending on the severity of the unsafe condition and any complementary factors, like the vehicle's speed or the presence of pedestrians.

In one embodiment, once a value is assigned to an unsafe driving condition and the monitoring application 124 takes corrective actions, the AI system 110 reassesses the likelihood of that unsafe driving condition, such as using a feedback loop. Using the AI-driven driving assist application, the vehicle 100 implements corrective or preventive measures to counteract or mitigate the identified unsafe driving condition. For example, if the system has identified potential hydroplaning due to water on the road, it may reduce the vehicle's speed or adjust tire traction control settings, which is related to the highest safety standards, incorporating data from past experiences, simulations, and expert input. Once the driving assist application has adjusted, the monitoring application 124 continuously evaluates the environment. For example, after slowing down in our hydroplaning scenario, sensor 152 could assess the water levels on the road, tire grip, and other relevant parameters, such as using sensors on the vehicle. The AI system analyzes this real-time data against stored benchmarks to evaluate if the risk level associated with the initial unsafe driving condition has been reduced. The AI system assigns a new value to the unsafe driving condition after the corrective actions have been taken, which is crucial for dynamic reassessment or feedback. For example, if the system initially assigned a high-risk value due to heavy rain, but post-intervention (like activating windshield wipers and reducing speed), the visibility and control improved, a lower value could be assigned, reflecting the reduced risk. The feedback loop feeds post-action data into the system to adjust its response, ensuring that further actions could be taken if initial interventions weren't sufficient. The first task of the AI system is to determine how to 'partially' cease the application. This requires a clear distinction of functions within the occupant assist application 122. The system prioritizes safety-critical functions or those relevant to the immediate driving condition. For example, if the occupant assist application handles both entertainment (like playing music) and critical alerts (like a lane departure warning), the entertainment feature might be paused while preserving the critical alert system. The system advocates for a structured hierarchy of functions, ranking them based on their relevance to safety. With this hierarchy, the system decides which functionalities to keep running and which to cease. The AI system, trained with datasets and reinforced through simulations, instantly decides which functions to retain based on the severity of the unsafe driving condition identified. The occupant assist application 122 seamlessly integrates with the monitoring application. When an unsafe driving condition is predicted, the monitoring application can communicate directly with the occupant assist application, instructing it to cease specific operations partially. This communication channel may be fortified against data errors (through established protocols), ensuring the information relayed is accurate and timely. Feedback mechanisms are in place to re-initiate ceased functions when it's safe, such as after the vehicle has navigated out of the unsafe condition or post-intervention from the monitoring application 124. The transition between full and partial functionality of the occupant assist application is made known to the vehicle occupant 156/166. The system has interfaces that effectively communicate these changes, ensuring the driver or occupants are informed but not overwhelmed or distracted. For example, if a music player is paused due to an identified unsafe driving condition, a non-intrusive alert notifies the driver of this change.

In one embodiment, before any action is taken, the system reliably detects or predicts unsafe driving conditions. This detection system employs sensors 152, cameras, and other data inputs. The AI system 110 is trained on vast datasets to recognize patterns indicating potential hazards, ensuring a robust and reliable detection system. Redundancy and fail-safes are built into the system to minimize false positives or negatives. Upon determining an unsafe condition, the vehicle 100 transmits an alert via the monitoring application 124. This alert may take various forms: auditory (beeps, spoken warnings), visual (flashing lights, HUD messages), or haptic (vibration of the steering wheel or seat). These alerts' design is implemented intuitively and non-distracting, ensuring they convey urgency without inducing panic. The AI system determines the most effective type and intensity of alert based on the nature and imminence of the unsafe condition. In one embodiment, the vehicle ceases the occupant assist application 122 after the alert transmission. The system guides this process by ensuring the cessation is done seamlessly and safely. When the occupant assist application executes a function that needs a safe termination procedure (e.g., adjusting a seat), the AI system ensures it's brought to a safe state before completely ceasing its operation. After the alert and subsequent application cessation, the driver or vehicle occupant 156/166 can acknowledge the alert. This could be done through a simple button press or voice command. Acknowledgment serves as feedback to the AI system, potentially assisting in refining future alerts and responses. The system follows clear protocols on when and how the occupant assist application can be reactivated. This could be after the unsafe condition has passed, post-driver acknowledgment, or after a specific time interval. The AI system analyzes the driving conditions, ensuring they're conducive before restarting the application. By collecting data on each instance when an alert is issued and the subsequent driver or vehicle response, the system refines its detection functionality, the nature of alerts, and the timing of the cessation of the occupant assist application to enhance safety and user experience over time, such as using feedback previously described.

In one embodiment, to determine the expiration of an unsafe condition, the system monitors the environment using its sensors, cameras, and other data inputs. This monitoring is designed for reliability, leveraging redundant systems and cross-checking sensor data to confirm that conditions have returned to normal or safe levels. Once data indicates a potential return to safe conditions, the AI system 110 assesses whether it's appropriate to re-establish the monitoring application 124. This decision-making process is rooted in probabilistic reasoning, ensuring that the decision isn't just based on the immediate data, patterns, and predictions of near-future conditions. The system emphasizes the use of well-trained models, ensuring that decisions made by the AI system are robust and reliable.

In one embodiment, instead of fully reactivating all functionalities at once, the system prioritizes re-establishing critical or non-intrusive portions of the monitoring application 124 first. This phased reactivation ensures that if any miscalculation occurs, not all systems are engaged simultaneously, reducing potential risks. To ensure transparency and user trust, the system recommends informing the driver or vehicle 100 occupant 156/166 of the reactivation. This may be through visual or auditory cues. Additionally, the user can manually override the reactivation if necessary, empowering them and ensuring they feel in control. The reactivation period dictates that this period be pre-defined based on rigorous testing and data analysis but should also be adaptive. The AI system 110 may learn from continuous data feeds and user feedback to adjust the time frames for optimal safety and performance. This re-establishment is also a source of learning for the AI system. The system logs instances, gathers user feedback, and continuously refines its protocols, ensuring its predictions and actions become even more precise and user centric.

In one embodiment, an Advanced Driver Assistance System (ADAS) leverages current applications for enhanced safety and user-responsive functionality. The current application is integrated with sensors 152 deployed inside and outside the vehicle 100 and interfaces with the occupant's mobile device 158/168 for collecting profile and health data. In this embodiment, the vehicle is equipped with external sensors, like LIDAR and cameras, to monitor the environment around the vehicle, capturing data such as obstacles, traffic conditions, and road quality. Internal sensors could include infrared cameras and biometric sensors to monitor the condition of the vehicle occupant 156/166, observing factors like eye movement, heart rate, and body temperature. The collected sensor data are processed by an onboard Edge AI processor, for example. This processor operates in real-time, making rapid decisions without communicating with a centralized server, reducing latency. The occupant's mobile device, potentially a smart wearable 154/164, may execute a health monitoring application 124, providing real-time health data such as heart rate, blood pressure, and other vital signs to the vehicle through a secure Bluetooth or Wi-Fi connection. This health data, coupled with the profile data stored in the vehicle's system-such as medical history, preferences, and driving habits are analyzed by the current application to determine the initial condition of the vehicle occupant.

Upon the determination that the initial condition of the occupant 156/166 is above a predetermined health condition threshold, the current application may access more detailed and updated health data from the occupant's mobile device 158/168 and, based on this additional information, refine the determination of the occupant's condition. For example, if the occupant displays signs of fatigue or medical distress, the system creates an alert to notify the occupant and could potentially initiate automatic vehicle 100 actions like slowing down the vehicle or activating hazard lights, depending on the severity of the condition and the driving conditions identified by the external sensors. The current application executing on a vehicle processor communicates with other processors to perform these vehicle modifications.

In one embodiment, the current application integrates with the vehicle's 100 navigation system, allowing real-time adjustments to the driving plan based on the occupant's 156/166 condition and external environmental conditions. For example, if the system detects that the occupant is in distress and there is a hospital nearby, it suggests or autonomously navigates to the hospital while also sending alert messages to emergency services providing the location and the occupant's condition. The vehicle processor may communicate with external servers, such as the cloud or network. Additionally, the vehicle could communicate with a central server through Vehicle-to-Everything (V2X) communication, allowing it to send and receive messages to and from other vehicles, infrastructure, and network services. This could enable the vehicle to receive updates on traffic conditions, road closures, and other relevant information and to share its status and alerts with other vehicles and entities. The current application may continually update the occupant's profile data based on the received sensor data and health information, enabling it to make more accurate and personalized decisions over time.

In one embodiment, internal vehicle 100 sensors 152 such as cameras, equipped with advanced image recognition capabilities, identify occupant 156/166 actions. These could include monitoring eye movements to detect drowsiness or distraction, analyzing facial expressions for signs of discomfort or distress, and observing overall body language and posture. Additionally, biometric sensors may be used to monitor physiological signs like heart rate, breathing rate, or even sweat levels, providing an in-depth analysis of the occupant's condition. The occupant's mobile device 158/168, such as a smartphone or a wearable device 154/164 containing a health monitoring application 124, may gather health-related data, including vitals and other medically relevant information, and communicate this data securely to the current application executing on a vehicle processor via a secure and encrypted connection, such as Bluetooth or Wi-Fi.

In one embodiment, machine learning functionality 110 processes and analyzes the incoming data from the internal sensors and the mobile device's health monitoring application 124. By cross-referencing this real-time data with the occupant's 156/166 pre-stored profile data, the system determines the initial condition of the occupant, discerning whether it aligns with normal parameters or if any anomalies require attention. When anomalies are detected, such as signs of a medical emergency or extreme fatigue, the current application may trigger predefined response protocols stored in memory associated with the vehicle processor, other memory in the vehicle 100, and/or external servers. These alerts may include alerts for the occupant, modifying the vehicle's driving parameters, or taking control of the vehicle to navigate to a safer location or a medical facility. The system may employ Vehicle-to-Infrastructure (V2I) and Vehicle-to-Vehicle (V2V) communication, utilizing dedicated short-range communications (DSRC) or cellular V2X, to relay messages about the occupant's condition and/or the vehicle's status. For instance, the system may inform nearby vehicles about a potential emergency, request traffic condition updates from infrastructure, or send emergency alerts to medical services with precise location details and the identified condition of the occupant.

In one embodiment, the occupant's 156/166 device, such as a wearable 154/164 or a smartphone 158/168, worn by the vehicle 100 occupant may monitor vital signs, involving AI components for constant monitoring and instant reaction to any detected anomalies in the occupant's vital signs. For example, the occupant device may feature sensors capable of capturing real-time biometric data, such as heart rate, blood oxygen levels, and body temperature, and an AI-powered application to process and analyze this data. This application may employ advanced AI functionality to monitor the vitals and continuously assess deviations from the norm. This occupant device may communicate securely with the current application executing in the vehicle via secured and encrypted wireless communications protocols, such as Bluetooth or Wi-Fi, to send the processed vital signs and any detected anomalies. The vehicle, equipped with processors and advanced machine learning models, is responsible for further analysis and correlation of this data with the vehicle's internal sensor data and the occupant's profile data through the execution of the current application executing on a vehicle processor. In parallel, the current application's AI system constantly communicates with other vehicle systems, including the vehicle's navigation and control systems, through internal communication protocols like the CAN bus to make real-time decisions based on the received data. For example, if the AI system perceives a health risk, it can instantly activate vehicle safety mechanisms like slowing the vehicle, altering the route to the nearest hospital, or sending automated SOS messages. To facilitate communication with external entities like nearby vehicles and infrastructure, the current application leverages technologies like Vehicle-to-Everything (V2X) communication, enabling the vehicle to share alerts and updates about the occupant's condition and the vehicle's status with surrounding entities. This communication could, for example, be critical in alerting emergency medical services and providing them with real-time location and vital signs data, enabling timely intervention. In this embodiment, real-time data analysis and secure communication between the mobile device and the vehicle processor executing the current application or a portion of the current application play pivotal roles in identifying potential health risks and ensuring prompt responses to safeguard the occupant's health and well-being.

In one embodiment, after receiving data from internal sensors 152 and the health monitoring application 124, the current application synchronizes and analyzes this data to continuously update the occupant's 156/166 profile. Machine learning models detect patterns or anomalies in the occupant's behaviors and health conditions and adjust the profile data accordingly. Based on the updated profile data, the current application makes informed decisions and implements actions to enhance the occupant's comfort, safety, and well-being. For example, it could adjust the vehicle's 100 environment, like seat position, temperature, or even the vehicle's driving style, if it is autonomous, to suit the occupant's condition. The current application may also utilize V2X communication to interact with external entities, such as other vehicles and infrastructure, to optimize the driving experience based on the updated occupant profile. For example, if the occupant is detected to be in distress, the current application may communicate with traffic lights to optimize the route for minimal stops or alert nearby medical facilities. The current application may access sensor data related to the vehicle's internal and external environment. The external environment sensors scan the roadway and surroundings to determine if safety thresholds are surpassed, while the onboard health monitoring system evaluates the occupant's health condition. The current application may analyze the accessed data to identify potential safety concerns in the driving environment and assess the occupant's health condition in real time to determine if the internal and external conditions necessitate vehicle actions for enhanced safety. When a safety threshold is surpassed externally, or if the occupant's profile data indicates a health condition above the threshold, the current application communicates this information to a vehicle control unit. Based on the received messages, the control unit adjusts the vehicle's actions accordingly to mitigate risks. This might involve altering the vehicle's speed, route, or other driving parameters. The current application may also interface with the vehicle's user interface to keep the occupant informed of any identified concerns and the resultant adjustments made to the vehicle's operation, providing the occupant with the opportunity to make manual adjustments if necessary and ensuring transparency in the system's operation. An intelligent navigation system incorporating real-time traffic data, road conditions, and geographic information may be employed. Routing functionality is employed to compute the shortest, fastest, safest, and lowest-cost routes using the available data. Machine learning models can optimize this functionality, learning from historical data and real-time inputs to improve route suggestions. The implementation may employ vehicle-to-everything communication to receive real-time updates about road conditions, traffic, and other relevant information from nearby vehicles, infrastructure, and network services. The current application receives data from the advanced navigation system, V2X communications, and internal sensors. This data includes real-time traffic information, road conditions, and occupant's health conditions. The processors analyze this data to identify possible routes and calculate a route score based on various parameters like safety, time, and cost.

In one embodiment, the routing functionality may compare the identified routes based on route scores and select the safest one, considering the initial condition of the vehicle 100 occupant 156/166. If the occupant's health condition is below a certain threshold, the system may prioritize routes with less traffic and smoother roads to ensure the occupant's comfort and well-being. To implement this, the current application continues to receive and process real-time data to adjust the route dynamically if needed. If a safer route becomes available or the occupant's condition changes, the current application may recalculate the route scores and alter the route accordingly. When the safest route is selected, the current application communicates this to the vehicle's navigation system and notifies the driver or, in the case of autonomous vehicles, the vehicle's control system. Messages regarding the selected route, subsequent adjustments, and relevant information are securely transmitted between the systems to ensure the vehicle follows the safest route.

In one embodiment, the current application, integrated with health monitoring devices, which may be wearable devices 154/164 or in-built vehicle 100 sensors 152, monitors the vital signs and health condition of the vehicle occupant 156/166 and assesses the occupant's health data. Advanced onboard processors, e.g., processors that process and analyze data, determine conditions and threshold values, and enable real-time decision-making, analyze this data to determine if the occupant's updated condition is below the health condition threshold. When the occupant's updated condition improves and is below the threshold, the current application determines additional vehicle actions that were not permissible. In contrast, the health condition threshold was exceeded, which may include enabling more dynamic driving maneuvers or optimizing the route for time efficiency rather than just safety. Upon determining the permissible actions, the current application communicates these to vehicle control systems, which may be advanced driver-assistance systems (ADAS) or autonomous driving systems that can perform vehicle actions like adjusting speed or route based on the processed information. Messages detailing the revised actions are securely transmitted to the vehicle's control modules, which then execute the actions, such as altering the route or adjusting the driving style. This can involve interactions with various vehicle subsystems, like the engine control unit (ECU), braking system, and steering control. Additionally, the current application may update the user interface to notify the driver or occupants of the changed vehicle actions, providing transparency and possibly options to override or adjust the decisions based on personal preferences. The system remains adaptive, meaning if the occupant's condition changes again, the current application dynamically adjusts the vehicle actions as needed, ensuring the occupant's well-being is always prioritized. Continuous feedback between health monitoring devices, onboard processors, control systems, and user interface keeps the vehicle's actions aligned with the occupant's condition.

Figure 1C:
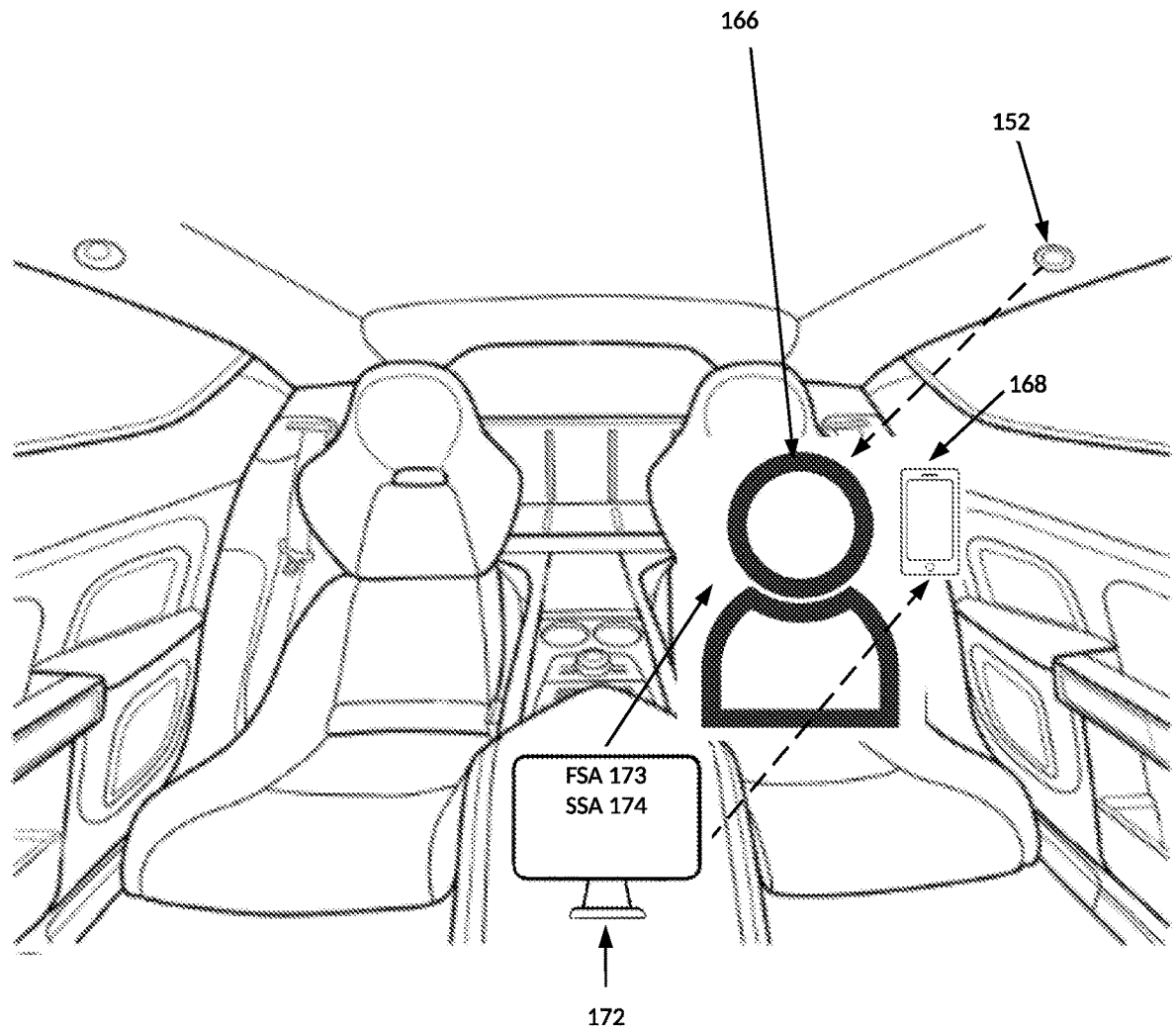
FIG. 1C illustrates a further example of one or more vehicle occupants being monitored by a machine learning and artificial intelligence application that monitors occupant activity and creates suggested occupant activities, according to example embodiments.

FIG. 1C illustrates a further example of one or more vehicle occupants being monitored by a machine learning and artificial intelligence application that monitors occupant activity and creates suggested occupant activities, according to example embodiments. Referring to FIG. 1C, the example 170 provides a vehicle occupant 166 that is being monitored by the vehicle via one or more sensors 152 and/or other monitoring mechanisms, such as a user interface that is tracking the occupant actions/selections over time. In one example, an AI application may be deployed to a device integrated with the vehicle and/or managed by the occupant (e.g., mobile device 168) that is capable of various enhanced AI services, such as promoting positive behaviors by the occupant.

The AI application may be an ever-present intelligent assistant for the occupant(s) that assesses data from various relevant sources to promote positive behaviors for the occupant(s). In one example, as the occupant is monitored, certain suggestions may be made to modify the current or recent behavior of the occupant based on recent actions performed by the occupant. One example may be identifying one or more actions which are deemed to be unsafe and then prompting the occupant to drive safer and/or perform lifestyle habits which are considered safe, such as slow down, steer carefully, do not tailgate other vehicles, brake cautiously, accelerate gradually, turn the radio down, etc., by sharing positive reinforcement types of suggestions and coaching prompts. The principle of positive reinforcement in psychology is to encourage certain behaviors. When an action is followed and the result is a positive outcome, the individual is more likely to repeat that behavior in the future. The reinforcement could be positive feedback, verbal praise, or tangible rewards. The AI application will attempt to identify a strategy based on what the individual occupant identifies to be satisfactory or preferable as a way to entice the occupant to continue performing such actions.

In one example, if the occupant is exceeding a speed limit threshold, the AI application may take actions to encourage staying within the speed limit and provide positive reinforcement suited to the occupant's personality and motivations when the individual decelerates or remains within the speed limit by monitoring the occupant actions before and after a suggested action is prompted to the occupant. In another example, if the occupant is chronically late and always exceeding a departure threshold, the AI application can identify this chronic schedule lapse and take proactive actions, such as setting a departure reminder that is in advance of a previous reminder or engaging the occupant in time-management techniques if scheduling tools are not being utilized. When the occupant is on-time, the AI application can provide real-time, positive reinforcement suited to the occupant's personality and motivations, such as presenting coupons for products of interest, and unlocking new features provided by the vehicle which were not previously available.

Behavior monitoring can be detected, received, processed and analyzed on a device located inside and/or integrated with the vehicle, such as a mobile device 168 or wearable device, or in a remote network (i.e., cloud). The analysis specific to the behavior(s) is processed on the device most relevant to the behavior. For example, driving analysis of certain actions (first, second, alternate) would be performed on a monitoring module found on the vehicle and based on a device 172 and/or one or more sensors 152 which are monitoring the occupant's actions. The monitoring module can also be active when the occupant is driving another vehicle (e.g., rental car). Behavior monitoring can include a measure of timeliness and/or one or more thresholds (e.g., vehicle speed, media content use, eye position, hand position, braking movements, accelerating movements, etc.), and the analysis can be performed on the vehicle or in a network (cloud). The measure of timeliness or the example thresholds may become an indicator that the individual is adhering to the coaching and suggested activity prompts. For example, a measure as to how much the occupant improved and sustained the modified behavior for a duration of time or a distance after being prompted to make the change. Positive reinforcement would be presented to the occupant's device when suggested actions are presented and performed. The positive reinforcement may be a value, credit and/or point value, other values may be unlocking additional features, such as applications provided by the vehicle, such as automated driving, steering, parking etc. A value may be redeemed as an appointment and/or position in a queue for charging the vehicle, a reserved charging station, an amount of charging time, etc., a service priority for the vehicle, etc. In one example, there is no value provided unless the individual remains within the threshold(s). In another example, depending on a severity associated with an amount over the threshold the occupant is exceeding, if the occupant performs the first suggested action and/or the second action, etc., and the action places the occupant closer to compliance or the threshold target, a further additional value/credit (or more of the same value/credit) is offered to the occupant.

In another example, the AI application may identify instances of positive behaviors exhibited by the individual beyond the suggested actions and provide additional value to the occupant for being proactive. If deemed necessary, the AI application may initiate a proactive teaching module to instruct the occupant to avoid the occurrence of a negatively identified behavior. The application may offer real-time or regular feedback to the occupant based on the occupant's performance through a feedback module (interface), and the feedback may be designed to highlight improvements.

In one example, if the occupant is frequently accelerating or accelerating quickly when the occupant does accelerate the vehicle, the AI application may identify an interest of the occupant and attempt to use the interest based on historical selection information (e.g., trips to the gym, music type, purchases, frequent coffee purchases, etc.) to incentivize the occupant with a potential value associated with one or more of the interests. The AI application may offer weight lifting tips as a form of content to the occupant when the occupant is not accelerating quickly and/or as often as desired by the objectives of the AI application safety measures. The occupant's responses may be tracked and stored in the databank or knowledgebase so each time the occupant performs an action, more information about the occupant is known to use as an incentive when attempting to suggest actions for the occupant to perform.

Referring again to FIG. 1C, the vehicle display may provide a first suggested action 173 and a second suggested action 174 as a video, words, audio, etc., to the occupant area where the occupant is located 166. The vehicle interface 172 may be part of the vehicle and may offer communication to the occupant device 168 to provide the value to the occupant when earned. The sensors 152 may monitor the occupant actions to determine whether the occupant is performing any unsafe actions, safe actions, suggested actions, etc. In the case of suggested actions, the vehicle application may be attempting to determine whether the action was attempted and/or satisfied within a defined period of time.

The vehicle application may be monitoring a behavior of an occupant of the vehicle (e.g., vehicle speed, aggressive steering, content accessing, talking on the device 168, watching the road) and responsive to the behavior being above a threshold, such as a maximum amount of activity that is considered acceptable (e.g., volume, time, speed), the application may generate via a first suggested action intended for the occupant based on the behavior and an amount the behavior is above the threshold, for example, the occupant may be prompted to slow down by 12 miles per hour. The vehicle application may then monitor the occupant for a period of time (e.g., 30 seconds) to identify whether the first suggested action is being performed by the occupant, and if so, a value may be provided to the occupant device or other device maintaining the occupant profile. If the occupant has not performed the alternate action then the application may generate a second suggested action based on the alternate action and the first suggested action, such as a prompt to consider using cruise control which inadvertently may slow the vehicle down by a certain speed naturally. Another action may be unrelated to the first action, such as to turn down the volume of the radio. The application may then provide a value to the occupant device 168 responsive to the second action being detected by the transport. The first action may then be reissued in order to attempt to have the occupant comply with the request and may be suggested in another format, such as a notification that traffic is increasing and/or the exit is approaching so the occupant is more likely to comply based on the AI application knowledgebase of known successful occupant behaviors which are stored. Also, the known unsuccessful occupant behaviors which are stored may also be referenced when attempting to suggest a new suggested action, those actions which are deemed similar may be linked and used to select/avoid a next suggested action.

In one example, the occupant behavior may include one or more of a vehicle operation action such as driving related and a limited time related action, such as moving a head position or eye position being tracked by the vehicle sensors. Also, the behavior may include stopping at an unexpected location while a scheduled appointment is about to mature. In one example, the first suggested action may include a prompt to notify the occupant to perform one or more of modify a current vehicle operation action, such as vehicle speed and a future vehicle operation action, such as changing lanes. In one example, the vehicle may receive sensor data from internal vehicle sensors identifying a movement of the occupant, and determine whether the occupant has performed the first suggested action based on the sensor data. In another example, a profile associated with the occupant may be retrieved from the vehicle integrated device or from the occupant device, and a value type may be applied to subsequent occupant compliance actions based on the profile. In another example, one or more of the first suggested action and the second suggested action may be determined to have been performed by the occupant, and the value of the value type may be applied to the occupant profile. The value types may include discounts, rebates, credits, access, points, priority, etc. In one example, the application may determine only the second suggested action has been performed by the occupant, and provide a partial value of the value type to the occupant profile and a suggested action which if fulfilled would include the full value.

In one embodiment, the current application may utilize a multitude of in-vehicle 100 sensors, such as cameras and motion detectors, to continually monitor the behavior of the vehicle occupant 166. This information may be processed by a processor, such as an onboard Behavior Analysis Processor (BAP), which analyzes the incoming data streams in real-time to identify any behaviors that surpass predefined thresholds. Using suitable communication protocols, messages containing sensor data and initial analysis results are transmitted securely between in-vehicle sensors and the BAP. When a behavior above a threshold is detected, the current application generates a first suggested action 173 intended for the occupant, leveraging a rule-based engine or machine learning models that consider the type and degree of the observed behavior. The BAP may continue to monitor the occupant's behavior to identify if the first suggested action 173 is being performed. If the occupant performs an alternate action, the current application may generate a second suggested action 174, considering both the first suggested action 173 and the latter's alternate action. Upon detection of the occupant performing the second action, a value is calculated by the Value Determination Processor (VDP) based on predefined criteria. The VDP communicates with an External Device Communicator (EDC), sending messages to transfer the calculated value to the occupant's device 168, such as a smartphone, using Bluetooth or Wi-Fi, updating an app or service on the occupant's device 168 associated with the vehicle.

For example, a high-end vehicle 100 equipped with a comprehensive suite of internal sensors and an onboard computing system executing the current application, possibly as part of an advanced driver-assistance system (ADAS) or a similar setup designed to enhance driving safety and occupant 166 experience. The system monitors the occupant's posture and alertness and suggests actions like adjusting the seat or taking a break if signs of fatigue are detected. If alternate actions like increasing the music volume are detected instead, a second suggestion, like recommending a nearby rest area, could be made. The current application may ensure that the vehicle is capable of monitoring and analyzing occupant behavior in real-time, generating and communicating contextually relevant suggestions, and subsequently providing feedback values to the occupant's device 168, enhancing the overall safety and experience of the occupant.

In one embodiment, the current application may generate a first suggested action 173 as a prompt, instructing the occupant 166 to modify a vehicle 100 operation action or a future one. This is based on the monitored behavior and the extent to which the behavior is above the threshold. Once behavior above a predetermined threshold is detected, a message is transmitted to a processor based on the analyzed behavior and predetermined logic. This processor may generate suitable prompts suggesting modifications in current or future vehicle operation actions. For example, if a driver is detected exceeding speed limits, The current application may generate a prompt suggesting a reduction in speed or recommending adherence to speed limits in future instances. Similarly, if erratic lane changes are detected, the current application may generate a prompt advising more careful and intentional lane changes in the future. The generated prompt is then conveyed to the occupant, utilizing the vehicle's display units, auditory systems, or haptic feedback mechanisms to ensure the driver is adequately informed. The prompt could be a visual message displayed on the vehicle's dashboard, an audible message, or a vibration on the steering wheel, aiming to get immediate attention from the driver and ensure prompt compliance. After the prompt is delivered, the current application may continue monitoring the occupant's behavior to observe compliance or non-compliance with the suggested action. For example, if the driver reduces speed following the prompt, it is interpreted as compliance, and if not, the system might escalate the alert or generate alternate suggestions.

In one embodiment, based on the user's preferences and driving conditions, the current application may customize the delivery of the prompts, prioritizing the most effective communication method to ensure that the driver receives and acknowledges the suggested actions.

In one embodiment, the current application receives sensor data from internal vehicle 100 sensors to identify any movements of the occupant 166 and determine whether the occupant has performed the first suggested action 173 based on this data. For example, seat or steering wheel sensors detect subtle movements, shifts, or adjustments the occupant makes. The current application determines compliance with the suggested action. For example, if the first suggested action 173 is to adjust the seat to a safer position, the system monitors whether the occupant makes the necessary adjustments, analyzing the data for any movement indicative of seat adjustment. If a suggestion is made to keep hands on the steering wheel, the system will monitor steering wheel interactions and infer compliance or non-compliance based on detected movements. Upon determining compliance or non-compliance, the current application may communicate with the user interface on the display, such as a display associated with the head unit of the vehicle, to provide appropriate feedback to the occupant through visual, auditory, or haptic signals. For example, a visual confirmation message on the vehicle's dashboard or a brief, pleasant sound could confirm compliance, while a contrasting alert could indicate non-compliance.

In one embodiment, the current application may retrieve a profile associated with the occupant 166 from the occupant device 168 and determine a value type to apply to subsequent occupant compliance actions based on the profile. The system may utilize functionality designed to connect securely to the occupant's device and retrieve the user's profile. This profile may contain historical data regarding the occupant's behavior, preferences, and compliance with suggested actions. For example, if the occupant has a mobile app linked to the vehicle 100, the occupant's profile is retrieved while considering data privacy and security protocols to ensure the safety and integrity of personal data. Once the profile is retrieved, the current application may analyze the profile data to determine the suitable value type for subsequent compliance actions. The value type could be rewards, points, or other incentives to encourage the occupant to comply with the suggested actions. For example, if an occupant consistently complies with suggestions, the current application may determine a reward-based value type, like discount coupons or loyalty points, which may be more motivating for the occupant. Real-time data exchange is crucial to adapt the value types based on the evolving behavior and preferences of the occupant. Secure message transfer enables the secure and efficient exchange of information between the processors of the vehicle to ensure data integrity and confidentiality. After the value type is determined, the determined value type is applied to subsequent compliance actions, and the occupant's profile is updated accordingly. For example, if the occupant complies with a suggested action, the current application allocates the corresponding rewards or points to the occupant's profile, with immediate notifications sent to the occupant's device.

In one embodiment, the system determines if the occupant 166 has performed one or more of the first and second suggested actions 174 and then provides the value of the determined value type to the occupant profile. Action Monitoring Processor (AMP) monitors the occupant's behavior in real-time by leveraging internal vehicle 100 sensors and interpreting the retrieved data to ascertain if the occupant has performed the suggested actions. For example, this could involve using cameras and motion sensors within the vehicle to monitor occupant movements and interactions with the vehicle controls. Based on the data received from the AMP, the Value Assignment Processor (VAP) is responsible for assigning the predetermined value to the occupant's profile if the actions have been performed. For example, if the occupant has followed the suggested actions, VAP updates the occupant's profile with rewards or points, following the predetermined value types decided by the Value Type Determination Processor (VTDP) from the previous claim. The processors employ secure communication protocols to exchange information related to occupant actions and value assignments, ensuring the integrity and confidentiality of the data. Secure Message Transfer Protocol (SMTP) could be used for secure, real-time communication between AMP and VAP to update the occupant's actions and assigned values accurately and promptly. The User Interface and Notification Controller (UINC) collaborates with the VAP to notify the occupant about the assigned values through user-friendly interfaces and notifications. In practical embodiments, this could manifest as a user-friendly notification on the vehicle's dashboard or the occupant's mobile device 168, informing them about the received value, such as rewards or points, enhancing the user experience and encouraging compliance with suggested actions. DSUP ensures that the occupant's profile is regularly updated and synchronized with the assigned values, maintaining the coherence and relevance of the data. This is particularly crucial in real-world settings where the occupant's compliance and corresponding value assignments can vary, requiring consistent updates to reflect the accurate state of the occupant's profile. FOP continuously assesses the effectiveness of the value assignments in promoting occupant compliance and optimizes the value types and amounts based on the occupant's feedback and changing behavior patterns. This could involve analyzing the occupant's responsiveness to different value types and adjusting the incentive mechanisms to maximize occupant engagement and compliance in real-world applications.

Figure 1D:
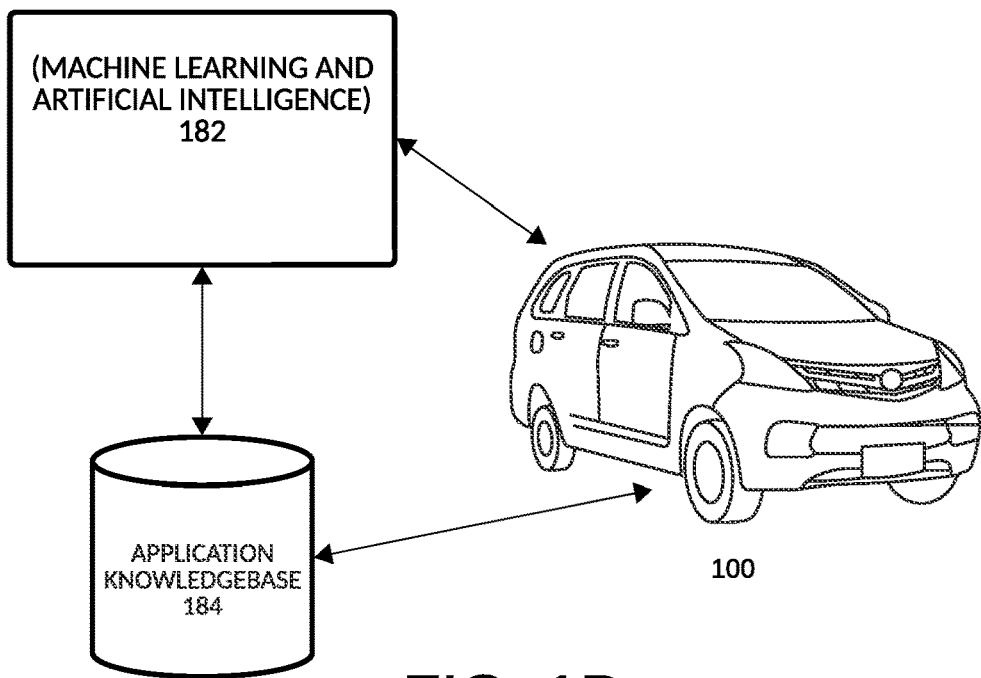
FIG. 1D illustrates a further example of providing a machine learning and artificial intelligence application to control operation of a vehicle, according to example embodiments.

FIG. 1D illustrates a further example of providing a machine learning and artificial intelligence application to control operation of a vehicle, according to example embodiments. Referring to FIG. 1D, the example 180 demonstrates a machine learning application 182 which is using a specified knowledgebase 184 of information including information about the objectives sought by the application and including information pertaining to a particular vehicle 100, the vehicle's use by one or more occupants, etc. Over time, the information available in the knowledgebase 184 will increase and the possibilities for the outputs of the application 182 will also increase. In one example, the information stored in the knowledgebase 184 may be from data provided by the vehicle 100 in varying conditions. Ultimately, the application 182 will provide certain suggestions and actions which are attuned to the specific attributes of the vehicle 100. Also, the output of the application may be tested and reconsidered when compared to live data obtained and shared by the vehicle 100.

In one example, a vehicle 100 may receive a first response, from an application associated with the vehicle, including one or more factual statements determined by the application based on a set of data, such as an instruction to slow down since the weather and/or terrain is about to change abruptly. When the AI application makes predictions about circumstances and corresponding suggestions based on the data that is believed to be valid, the decision may include an output, such as a prompt to the vehicle occupant via a device integrated with the vehicle or a device controlled by the occupant, etc. The outputted data from the application may also have an instruction for the application to retrieve current vehicle data from the vehicle related to the factual statements while the vehicle is operating, while the vehicle is moving or just prior to the application outputting the information. In another example, the output of the application may be based on a conclusion however the data may not be presented to a display or other sharing medium until the data is confirmed by the AI application by current data. The output may be based on recent data, such as vehicle sensor data, however, the output prompt instruction that notifies the vehicle occupant may not be presented on the one or more displays until the recent and/or live feedback data is received and confirmed by the AI application 182.

The process may also include parsing the first response into one or more portions of the one or more factual statements, each factual statement may have a tag that identifies whether the factual statement must be confirmed by live data or recent data. In another example, the process may also include comparing the one or more portions of the factual statement to other portions of other factual statements previously logged and included in a first knowledgebase 184 containing the other factual statements, and the other factual statements are based on the vehicle data at a previous time compared to the current time. In the event that the live or recent data is not consistent with the output intended to be shared with the vehicle occupant, the data may be disregarded and removed from an intended presentation queue of data that was previously intended to be shared with the occupant but was disqualified by updated data from the transport prior to the information being shared in an application specific manner (e.g., warning, suggestion, etc.).

The process may also include receiving a second response, from the application, including one or more amended factual statements based on the comparing operation. When the new data is available, the application 182 may amend the intended output data by incorporating the new data with the previous data. In one example, the weather data collected by the vehicle may indicate that the rain or snow has not yet made contact with the vehicle and the previous suggestion may be amended to include a further distance away and/or or a later time as to when the inclement weather may be experienced by the vehicle 100. The information available to the machine learning and artificial intelligence system may be used to provide data outputs, such as predictions or suggestions based on active datasets which are activate in the knowledgebase 184.

Figure 1E:
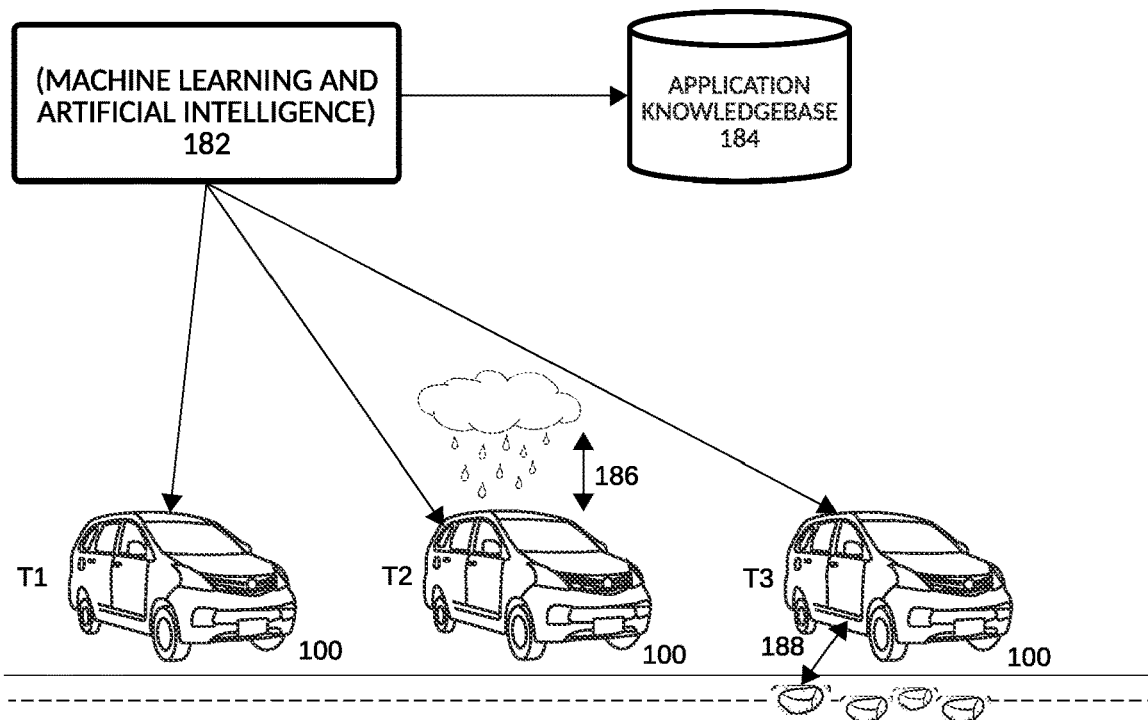
FIG. 1E illustrates a further example of providing a machine learning and artificial intelligence application to confirm control operations by monitoring vehicle activity, according to example embodiments.

FIG. 1E illustrates a further example of providing a machine learning and artificial intelligence application to confirm control operations by monitoring vehicle activity, according to example embodiments. Referring to FIG. 1E, the example provides the machine learning application attempting to provide instructions the vehicle 100 at a first time T1 based on a knowledgebase of information 184. The initial instruction may be to control the vehicle operation in preparation for a predicted weather event, such as rain at a later time T2. When the instruction is initially created, the application 182 may have predicted that the vehicle will be encountering rain at a later time. The instruction may be prepared and held in a wait status until the vehicle has identified additional information via a sensor(s) that can detect the condition 186. The sensor may identify a change in humidity, rain droplets, and/or other data that would assist with confirming the application prediction. The data provided by the vehicle at a time T2 may confirm the application prediction, and the instruction may then be sent to the vehicle to modify a current vehicle operation to accommodate the change in weather. The instruction may also alert the occupant to prepare for the predicted condition. At a later time, the application 182 may identify a change in roadway conditions, such as uneven roadway conditions due to rocks or debris in the road. The application 182 may predict the change in roadway conditions based on previously stored data about the road or via other information stored in the knowledgebase 184. The instruction to slow down the vehicle before the roadway condition may be stored in memory and confirmed by sensor data of the vehicle at a time T3 just before the condition occurs. The sensor data may include a visual representation of the roadway being uneven 188 which is captured by the vehicle, and the sensor data may be sent to the application 182 for additional confirmation operations prior to the application performing the change in vehicle operation instruction. Once the confirmation is made, the instruction may be sent to the vehicle to change its operation status to accommodate the instruction.

One example may include identifying one or more matches between the one or more portions of the factual statement and the other portions of the factual statements based on the comparing operation. The various portions of the factual statement may be confirmed by subsequently received data stored in the knowledgebase 184. The process may also include assigning a first match accuracy score to the identified matches and responsive to the first match accuracy score being below an accuracy threshold, querying the knowledgebase and performing an additional comparing operation, and assigning a further match accuracy score to further identified matches. The accuracy score may be required to be above a certain level of certainty prior to the instruction being enacted by the vehicle. When the further match accuracy score is calculated and is below the accuracy threshold a second response may be created. The process may also include receiving the vehicle data (e.g., sensor data) from one or more vehicle sensors during a roadway driving event, and storing the vehicle data in the knowledgebase for comparison purposes. In the event that there is no confirmation and the one or more factual statements from the first response are false based on the vehicle data, then the knowledgebase may be modified by removing the false factual statements which were previously identified as true, and a second response may be created based on the modified knowledgebase.

Another example embodiment may include an AI application deployed on a device(s) capable of identifying enhanced AI services that might benefit a vehicle occupant and offer a sample experience and subsequent subscription options customized to a particular occupant. Not all potential customers desire a same level of service offered by a particular application (i.e., online service). As a result, offering a tiered level of subscription options provides businesses with more ways to accommodate the needs of a larger variety of customers. The vehicle AI application can also utilize a subscription model with tiered levels. For example, as a suggested action performed by the AI application invokes an available software application, the AI application output may provide a software application as a remedy to an identified issue.

The specific type of application provided may be offered as a preview or as a temporary usage model that has a limit on the amount of usage based on types of operations and/or time. The application may receive various user selections made by the vehicle occupant and determine a certain subscription option, among a plurality of subscription options would be appropriate based on previous user interests and current application usage. Although the software application may be deployed on the vehicle or the user device, the subscription service may unlock the levels of AI services that the individual experiences. Depending on the current data being utilized, the vehicle AI application 'assistant' may offer enhanced services above the occupant's current subscription level(s) based on the occupant's interests (stored in the user profile), and based dynamically on location and other parameters to maximize the application experience (e.g., in-vehicle, at-home, etc.). The dynamic application service can provide the occupant with access to enhanced service and various subscription options.

In one example, the vehicle occupant may be conversing with the AI assistant application on topics of interest while inside the vehicle. The AI assistant may provide data that would typically be offered with an upgraded, enhanced level of service. In one example, the topic may be stocks and investments, and the AI assistant may display data about stocks, their average prices and trends, and if the investment would be redundant or complementary to the vehicle occupant's portfolio. Since a conversation between the vehicle occupant and the AI application is occurring in the vehicle where there may be larger displays, the application can present greater visual data to the individual versus on a mobile phone device. The AI may inquire as to whether the vehicle occupant would like to continue with an enhanced level of software content after a preview session. If the user declines the application invitation to continue service, the AI application may retry at a later time. If the individual exits the vehicle, the AI application may continue to present information on the user device held by the user.

In one example, while the user is at home and away from the vehicle, the AI application may detect the individual is watching a sports game based on audio and/or video identified from sensors on the device as detected from a television or other device. Even though the previous enhanced experience in the car was related to investments, the AI interacts with the individual about the sports game, providing interesting information about the game, or assisting with placing a sports bet or merchandise sales. The application may consider the setting (i.e., time, location) before dynamically providing the enhanced services to the individual. For example, the application will not provide the sports information when the individual is at work. In another embodiment, the AI may prioritize the enhanced service based on the most important real-time information. For example, if the individual's profile indicates preferences in sports, politics, and gardening, the application prioritizes the live sports game, then news on politics or financials, such as a specific technology or company that the individual is following on social media, and lastly, the application would share gardening information with the individual, as it is not as time critical among the topics of interest identified. In another example, when the individual decides to utilize the enhanced service, the individual is only charged when the enhanced service can be experienced under the best conditions. For example, a media room experience may only be charged when the individual can experience it in the media room versus on a mobile phone. In another example, if the individual declines the enhanced service offering, the AI application may temporarily discontinue the offer, and at a later point in time, offer the same or an alternate service.

In one embodiment, a central processing unit (CPU) within the vehicle 100 manages the overall operation, communicating with internal and external systems through a secure and fast network interface. The instant application associated with the vehicle receives a response containing one or more factual statements determined by parsing data from vehicle sensors. These sensors can include speed sensors, GPS, temperature sensors, etc., constantly collecting real-time data about the vehicle and its environment. The instant solution can parse the received response to isolate each portion of the factual statements. The parsed data is then compared to the data already present in a knowledgebase 184. This knowledgebase is an extensive database stored in a secured, central server, possibly cloud-based, containing various factual statements related to vehicles and is continuously updated. The current application communicates with the central server hosting the knowledgebase using secure network protocols to compare the parsed factual statements against the existing statements in the knowledgebase. The system utilizes advanced matching functionality to identify similarities or differences between the incoming parsed data and the existing data in the knowledgebase. After the comparison, if discrepancies or additional clarifications or amendments are required, the system generates a second response containing amended factual statements. The application sends this second response back to the vehicle's CPU using secure and reliable communication protocols. Throughout this process, the current application may employ security measures such as encryption and authentication to ensure data integrity, confidentiality, and real-time processing capabilities to provide quick and accurate responses.

In one embodiment, the system employs components to identify matches between parsed portions of factual statements and the knowledgebase 184, assigning a match accuracy score to each identified match. For example, once the system has received and parsed the first response, the parsed portions of factual statements are compared to other portions of factual statements in the first knowledgebase. The comparison is facilitated by high-speed processors utilizing matching functionality to identify similarities or equivalences between the parsed data and the existing data in the knowledgebase. Once the matches are identified, the current application assigns a first-match accuracy score to each of the identified matches. The calculation of the match accuracy score may involve evaluating the closeness of the match, the reliability of the data sources, and other relevant factors using predefined criteria and functionality. The match accuracy scores and the matched data are communicated securely and efficiently between the vehicle's 100 application and the central server hosting the knowledgebase, which may involve real-time, secure messaging protocols to ensure data integrity and confidentiality while maintaining optimal performance.

If the first match accuracy score is below a predetermined accuracy threshold, this may trigger subsequent actions as per the further claims, including querying an additional knowledgebase and performing an additional comparing operation. For example, meticulous attention is paid to data security, accuracy of the matching functionality, real-time processing of data, and seamless communication between the vehicle's application and the centralized knowledgebase, ensuring the reliability and efficiency of the entire process. The related processors in this implementation may handle intensive computations and manage secure, high-speed communications, ensuring the quick and accurate delivery of the results.

In one embodiment, the system employs advanced comparison functionality and parallel processing to evaluate the first match accuracy score and to query additional knowledgebases 184, if necessary. For example, when the first match accuracy score, determined from the previous comparison, is below the predefined accuracy threshold, the system automatically initiates a query to an additional knowledgebase. This could involve accessing external or supplementary databases or sources of information that are not part of the first knowledgebase. High-speed, secure communication protocols may facilitate querying to access and retrieve relevant data from the additional knowledgebase.

The system may perform an additional comparing operation using the newly retrieved data. Matching and comparison functionality evaluates the retrieved data against the parsed portions of the factual statements, looking for further matches or correlations. This may involve multi-threaded or parallel processing to expedite the comparison of large volumes of data.

Upon completion of the additional comparing operation, the system may assign a further match accuracy score to any further identified matches based on the data's reliability, relevance, and congruity. These scores and any newly identified matches may be securely transmitted between the vehicle's 100 components, utilizing encrypted messaging protocols to preserve data integrity and confidentiality. When the further match accuracy score remains below the accuracy threshold, subsequent steps are determined, involving the determination of the second response. Throughout this process, the efficiency, security, and precision of the data processing and communication are paramount, ensuring that the implemented system can operate reliably and effectively in real-world conditions, responding adaptively to the varied and dynamic data environments characteristic of modem vehicles and intelligent systems.

In one embodiment, when the further match accuracy score remains below the accuracy threshold, the system may invoke a meticulous procedure to determine the second response, leveraging high-level computational intelligence and secure, swift communication protocols. For example, the current application uses robust decision-making functionality to ascertain the most accurate and appropriate response when the further match accuracy score, determined after additional comparing operations, still needs improvement. The current application, utilizing high-speed processing units, computes the optimal approach for generating the second response, which may involve re-evaluating the parsed portions of factual statements, invoking alternative data comparison methodologies, or refining the search parameters used in the additional comparing operation. While formulating the second response, the current application may continuously scrutinize the relevance and precision of the accumulated data, ensuring that the formulated response is coherent, valid, and substantiated by the available data, which may involve multi-layered validation processes, cross-referencing with various internal and external databases, and advanced data analytics to deduce the most reliable and pertinent response. The intelligent components within the instant solution may securely exchange the computed response and pertinent data via encrypted messages, mitigating the risk of data breaches or unauthorized access. This ensures that the integrity and confidentiality of the transmitted information are uncompromised, even in intricate and diversified data landscapes. The current application may optimize the response generation and transmission processes to deliver the second response promptly, enabling the swift execution of subsequent actions and adjustments.

In one embodiment, the vehicle 100 efficiently receives data from various sensors during a driving event and subsequently stores this data in a knowledgebase 184. Sensors integrated into the vehicle continuously monitor different parameters and states during a roadway driving event. These sensors may be one or more of accelerometers, gyros, temperature sensors, LIDAR, etc., to capture comprehensive, real-time data about the vehicle's surroundings and internal states. Advanced data acquisition systems in the current application may ensure that this sensor data is accurately captured and relayed to the vehicle processor in real time through secure and efficient communication protocols.

In one embodiment, when received, the vehicle processor processes the data, extracting relevant features and transforming raw data into actionable insights. The processed data is transmitted to the knowledgebase, utilizing advanced encryption and secure transmission protocols to protect it from unauthorized access and corruption, ensuring that the vehicle data is stored safely, with its integrity maintained, and is readily available for subsequent retrieval and analysis. Throughout this process, Components of the current application may continually exchange messages and coordinate their operations, ensuring the seamless flow of information and the coherent execution of tasks. The combination of advanced sensing, processing, and storage technologies within the current application ensures that the vehicle data from roadway driving events is accurately captured, analyzed, stored, and available for future use.

In one embodiment, the current application may harmonize the functions of diverse components, including advanced processors, analytical software, and knowledgebases 184, to validate the authenticity of factual statements seamlessly. The initial stage of this implementation involves the vehicle 100 receiving factual statements from the application. These statements are then meticulously parsed and analyzed by specialized processors within the current solution, which executes advanced analytical functionality to determine the accuracy of each statement against the stored vehicle data. Comparison and validation techniques enable the system to accurately discern true statements from false ones based on real-time and historical vehicle data. The processors constantly communicate and exchange data and analysis results with other components throughout the process. These communications are facilitated through secure and efficient messaging protocols, ensuring that all components are synchronized, and the data and results are exchanged without loss or compromise. When a statement is determined to be false, corrective actions are initiated to modify the knowledgebase. Specialized routines are executed to remove the identified false statements from the knowledgebase, ensuring the database remains accurate and reliable. The modifications to the knowledgebase are carried out using secure and atomic transactions, preserving the data's integrity and consistency.

New, amended factual statements are generated based on the modified knowledgebase after removing false statements. Newly created statements are determined to be accurate, coherent, and reflective of the true state of the vehicle and its environment. The generated statements are then relayed to the current application as part of the second response, using secure and reliable communication channels.

In one embodiment, when false factual statements are identified, an analytical module immediately initiates procedures to update the knowledgebase 184. This module employs functionality to safely remove or correct false factual statements within the knowledgebase, ensuring that data integrity and consistency are maintained during modification. Parallelly, data processors actively analyze and compare factual statements, continuously sending and receiving messages with other system components to coordinate actions and share analytical results. These processors operate on high-speed, secure communication channels, enabling an efficient and synchronous exchange of information between components, ensuring timely and accurate modification of the knowledgebase. Once the false statements are removed or corrected in the knowledgebase, the generation of a second response is triggered based on the refined and accurate data now present in the modified knowledgebase. This response generation considers the most current and accurate information available, ensuring that the second response reflects the true state of the knowledgebase and the related vehicle 100 data. This generated second response is then transmitted back to the application through secure communication protocols, ensuring the updated and accurate factual statements are delivered reliably and promptly.

Figure 1F:
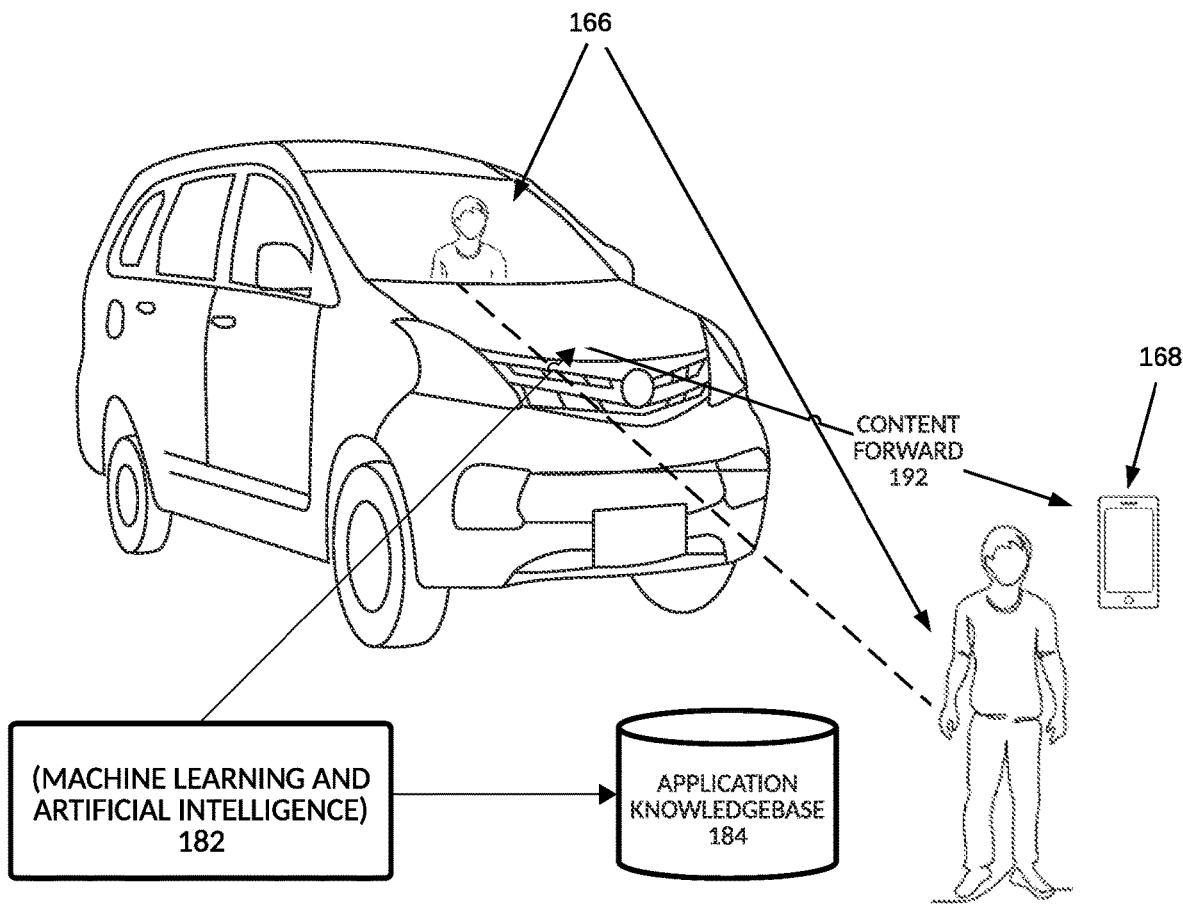
FIG. 1F illustrates a further example of machine learning and artificial intelligence being used to provide occupant services, according to example embodiments.

FIG. 1F illustrates a further example of machine learning and artificial intelligence being used to provide occupant services, according to example embodiments. Referring to FIG. 1F, the example configuration 190 includes a vehicle 100 with a vehicle occupant 166 being inside and outside of a vehicle at a later time. The machine learning and artificial intelligence application 182 may store data in a knowledgebase 184 used as a reference to make automated decisions. The output of the application may include suggestions and automated actions, such as a decision to move an in-vehicle used application to the mobile device 168 of the user when the user is no longer a vehicle occupant and has moved outside of the vehicle. The decision to continue the application use on a separate device may be based on a time of day, a geographical location of the user, a type of application, etc.

One example process of operation may include identifying, via a vehicle application of a vehicle, one or more topics of interest associated with a vehicle occupant based one or more vehicle occupant behaviors detected by the vehicle, such as recent queries performed by the vehicle occupant, recent actions taken by the vehicle occupant, recent movements of the vehicle occupant, etc. The topics of interest may be stored in a knowledgebase 184 as they are identified and reference by the application 182 during a suggested or predicted type of operation. The process may also include applying, via the vehicle application, one or more enhanced services to a device associated with vehicle occupant based on the one or more topics of interest and an occupant profile, and modifying, via the vehicle application, the one or more enhanced services based on the device location and changes to the one or more vehicle occupant behaviors. In one example, an initial application use may be for a specific vehicle operation. The occupant may shift around when the vehicle is stopped and turned off and the movements are detected by vehicle sensors which then predict the user is headed into the mall to shop, or to work depending on the day or location of the vehicle. The application may predict a more appropriate content should be shared with the occupant based on the likelihood the occupant is leaving the vehicle to enter a store or other establishment. The occupant history may be referenced to offer additional information, such as a receipt for a previous purchase at the nearby location or certain offers for similar products related to the previous purchase, such information may be stored in the application data 184 and reference based on the occupant actions and location.

In another example, the process may include providing an initial enhanced service to the user device, such as which application was provided to the user inside the vehicle or on a user device, the application usage may be based on previous user interests and may be presented to the user on an in-vehicle display, in-vehicle audio, and/or via a personal user device, such as a smartphone. The process may also include determining an initial subscription level to apply to the initial enhanced service based on capabilities of the device, such as a size of the device display, other applications installed on the device, etc. The process may also include modifying the initial subscription level based on one or more of changing the device location from a first location to a second location and identifying one or more additional topics of interest identified from vehicle occupant while operating the vehicle. In one example, if the vehicle occupant has exited the vehicle the amount of application usage may indicate a minor amount of use indicating a lesser subscription option or a limited subscription option. If the user is then attempting to continue using the application, the subscription option may default to the user's device and include a more advanced subscription option that includes ongoing usage. The process may also include providing content to a device integrated with the vehicle based on the one or more enhanced services while the occupant is inside the vehicle, such as vehicle usage services which inherently include using the vehicle, and providing the content to the device associated with the vehicle occupant after the occupant has exited the vehicle, and the content provided to the device is modified based on the location of the device. The process may also include determining the device has exited the vehicle and the device location has changed and modifying the initial subscription level based on a new device location. One example may include a service area associated with the application being active by the user device. When a user device enters an area serviced by the application, the initial subscription may go from basic to a more advanced subscription option. The process may also include receiving one or more selections associated with the one or more enhanced services and providing one or more options for subscription levels to the device based on the one or more selections. The selections made by the user or automatically made to accommodate the user actions may cause a subscription level to become more or less advanced depending on the selections made. In another example, the process may also include determining one or more content types accessed by the device, determining one or more user preferences from the occupant profile, and selecting a first content type to provide to the device based on the user preferences.

In one embodiment, the vehicle's 100 embedded system runs an application that continuously monitors and analyzes the behaviors of the vehicle's occupants using sensors and cameras, collecting data on conversation topics, interaction with the vehicle's interfaces, and biometric data. For example, once the current application has identified topics of interest associated with an occupant, it can communicate with a centralized server, which may reside external to the vehicle, utilizing secure communication protocols to transmit and receive data. This server could be powered by machine learning model 182 to process and analyze the occupant's behavior and deduce topics of interest. Upon identifying topics of interest, the system applies enhanced services to a device associated with the occupant, such as a smartphone or a tablet. The application of enhanced services may be based on the identified topics of interest and an occupant profile retrieved from a secure database, which could contain the occupant's preferences, history, and subscriptions, among other information. Applying enhanced services may involve sending personalized notifications, content, or service recommendations to the occupant's device.

In one embodiment, the vehicle application may also continuously monitor the location of the occupant's device and any changes in occupant behaviors. If any changes are detected, the application may modify the applied enhanced services accordingly. For example, if the occupant's device moves to a location where a particular service is unavailable or a different service is more relevant, the application may adjust the services provided, ensuring relevance and user satisfaction. All the data processing, communication between components, and service modifications may be handled by embedded processors within the vehicle and the servers, utilizing encryption and secure transmission methods to maintain data privacy and integrity.

In one embodiment, the current application executing within the vehicle 100 may initially provide an enhanced service to the device and determine an appropriate subscription level based on the capabilities of the associated device, such as a smartphone or tablet associated with the vehicle occupant. For example, this process begins with the vehicle's embedded system running the current application, providing an initial enhanced service to the occupant's device. In an alternate embodiment, the application is a software component running on the vehicle's onboard computer, equipped with processors capable of handling multiple tasks, including secure communication with external devices, data processing, and interaction with other vehicle components. The application assesses the capabilities of the occupant's device, such as processing power, storage capacity, and available features, through secure communication channels, such as Bluetooth or Wi-Fi, which may involve the exchange of messages containing device specifications and supported features between the vehicle application and the occupant's device.

In one embodiment, once the device's capabilities are known, the application determines an initial subscription level to apply to the enhanced service, ensuring compatibility and optimal performance with the device. The determination of the subscription level could be based on predefined criteria. It may involve interaction with a central server containing more extensive data and more powerful processing capabilities for more accurate and personalized service provisioning. The central server, for example, may be a high-performance computing system capable of processing extensive amounts of data and securely managing communication with multiple vehicles and devices simultaneously. It may contain or have access to databases containing subscription plans, user profiles, and other relevant information and utilize machine learning model 182 to optimize service provision based on the device's capabilities and user preferences. All interactions between the vehicle application, the occupant's device, and the central server may be conducted over secure, encrypted communication channels to protect user privacy and data integrity. The transmission of messages, instructions, and data between these components may be managed by specialized communication protocols, ensuring reliability, efficiency, and speed in information exchange.

In one embodiment, the system may modify the initial subscription level based on changes such as device location alteration or identification of additional topics of interest from the vehicle 100 occupant while operating the vehicle. For example, a vehicular embedded system may comprise specialized processors and software applications designed to observe and analyze the vehicle occupant's behavior, preferences, and device location. The system may utilize an assortment of sensors and GPS modules to pinpoint the device's exact location and subsequently discern any alterations in that location. To identify additional topics of interest from the vehicle occupant, it may utilize intelligent functionality, which may utilize Machine Learning models, to analyze the occupant's interactions, preferences, and behaviors while operating the vehicle. It may use onboard cameras and microphones, interfaced with advanced image and speech recognition systems, to gather pertinent data. Any acquired data is processed and analyzed in real-time by onboard processors, which send and receive messages to and from other in-vehicle systems and potentially to a central server to refine the analysis. When changes in device location or additional topics of interest are identified, the system may dynamically modify the initial subscription level. This modification involves the onboard application recalculating the subscription level, considering the newly acquired data and any predetermined criteria or rules. The application may communicate with a central server to access more comprehensive data and processing resources, using secure and efficient communication protocols to exchange information. The central server may be a highly advanced computing system capable of securely managing and processing vast amounts of data from multiple vehicles simultaneously. It runs functionality to optimize service provisioning based on the new inputs and communicates the adjusted subscription level to the current application.

In one embodiment, upon receiving the adjusted subscription level, the current application implements modifications that may alter the services provided to the occupant's device to match the new subscription level. The current application maintains secure and continual communication with the occupant's device, transmitting messages containing updated service details and receiving responses to ensure smooth and accurate implementation of the modified services.

In one embodiment, when the occupant is inside the vehicle 100, the system engages in real-time data exchange with the integrated device, utilizing onboard processors to analyze data and provide content based on the enhanced services. This may involve displaying multimedia content on the vehicle's infotainment system, navigational guidance, or other services based on the occupant's preferences and behavior. Once the occupant exits the vehicle, the system continues to monitor the location of the occupant's device, using tracking functionality and communication protocols to maintain a connection with the device. The system may use machine learning model 182 to modify the content provided to the occupant's device based on its current location. For example, the system may adapt the content or services to suit the new environmental context, like switching from driving-related information to pedestrian navigation guidance. Throughout this process, the current application communicates with a central server. This server may support the processing and analysis of large amounts of data from multiple vehicles simultaneously. It facilitates the refinement of the content provided to the occupant's device based on real-time and historical data analysis, ensuring the relevance and accuracy of the services provided. The central server securely and efficiently transmits the refined content details back to the current application, which may relay this information to the occupant's device. The communication between the server, in-vehicle system, and the occupant's device may be encrypted and optimized to ensure data security and minimize latency.

In one embodiment, the system recognizes the exit of a device from the vehicle 100 and adapts the initial subscription level in response to the detected change in the device's location.

In one embodiment, the vehicle may be equipped with the current application, various sensors, and communication modules capable of detecting the location and status of the occupant's device. The current application determines the device's presence within the vehicle and maintains a subscription level based on the detected location and other parameters, such as occupant behavior and preferences. Once the occupant's device exits the vehicle, advanced tracking technologies are employed, possibly utilizing GPS and network-based location services, to monitor the device's location continuously. The current application analyzes the received location data to determine any changes in the device's location after it has left the vehicle. Concurrently, the current application maintains a constant, secure communication link with centralized servers, which may be cloud-based, to receive, process, and send back the refined and updated subscription levels to the current application executing in the vehicle based on the device's new location. The central server may utilize extensive computing resources and functionality to accurately calculate the required modifications to the subscription level based on real-time and historical data regarding the device's locations and movements. Modifying the subscription level may involve altering the range or type of services provided, adapting the content delivered to the occupant's device, or any other necessary changes based on the location change. The central server subsequently securely sends the revised subscription details back to the current application executing in the vehicle to implement the updates.

In one embodiment, the system receives selections associated with enhanced services and provides subscription-level options to the device based on those selections. Initially, the occupant interacts with the in-vehicle 100 system or their mobile device to make selections associated with enhanced services. These selections may be preferences for services, content types, or desired features. For example, the user interface for making selections may be presented on the vehicle's infotainment screen or the occupant's mobile device. Once the selections are made, the current application executing on a processor in the vehicle encapsulates these selections in messages and transmits them securely to the cloud-based servers. These servers analyze the received selections and determine appropriate subscription-level options that align with the occupant's selections. To generate tailored subscription-level options, the servers may consider parameters such as the occupant's profile, preferences, an/or behavior. Once determined, the subscription level options may be communicated to the current application and/or the occupant's device. The current application may then present these subscription level options to the occupant (via the occupant device), allowing them to choose a preferred subscription level. The selected subscription level could then be stored in the vehicle and the cloud servers to ensure consistency and to adapt the provided services to the occupant's preferences.

In one embodiment, the system determines the content types accessed by the device, establishes user preferences from the occupant profile, and selects a content type to provide to the device based on those user preferences. For example, the current application, which may be part of the vehicle's 100 infotainment system, comprises processors and software to detect content types accessed by the user's device and to communicate with user devices and cloud servers. The onboard processors may identify the content types the user's device accessed when connected to the vehicle. The content types may be retrieved by monitoring the data requests made by the user's device, such as music, videos, news, etc., ensuring user privacy is maintained. The system refers to the occupant profile stored either locally on the vehicle in memory or on the cloud servers to determine the user preferences. These preferences may include favorite genres of music, preferred news topics, or favored types of content. The vehicle processor communicates with the cloud-based servers to determine the most suitable content type based on the occupant's profile and preferences. The cloud servers process the received data and select a content type that aligns best with the user preferences and previously accessed content types. This selected content type is then communicated back to the current application. Upon receiving the selected content type, the current application presents or provides this content to the user's device, which may adapt the delivery method according to whether the user is inside or outside the vehicle and modify the content based on the device's location. For example, when the user prefers music and is currently inside the vehicle, the selected music content might be played through the vehicle's audio system.

In one embodiment, as a vehicle is driving, a computing node determines it should receive an update about a newly formed traffic jam. However, a portion of this data is already stored in a nearby taxi (the second vehicle) that recently drove through that jammed area. The system determines that the taxi is about to cross paths with the car. Instead of the car downloading all the data from the central node, the nearby taxi directly transmits the relevant traffic jam information when they get close. The remaining data, like alternative routes or road conditions, is sent from the central computing node to the car.

In one embodiment, at a music festival, attendees are frequently capturing photos and videos. An attendee with a smart car (the first vehicle) wants to download a collection of the day's highlights from the festival's main server (computing node). The server determines what data, such as photos or videos, needs to be transmitted to this attendee. It notices that a portion of the desired videos is already stored in another attendee's van (the second vehicle) parked nearby. The system establishes that the van will soon be parked next to the smart car. As they come into proximity, the van transmits the videos directly to the smart car, saving time and bandwidth. Any remaining data, not present in the van, gets downloaded from the festival's main server.

In one embodiment, a fleet of delivery trucks is considered, equipped with onboard systems that require periodic software updates. One morning, the fleet's main control center (computing node) pushes out a significant software update. A delivery truck (the first vehicle) nearing its next drop-off point communicates with the central node for this update. The node realizes that a part of the update is already present in another delivery truck (the second vehicle) which just got updated and is close to the first truck's route. Predicting their paths will cross at a certain intersection, the system arranges for the second truck to directly transfer that part of the software to the first truck when they meet at the intersection. The rest of the update is downloaded directly from the main control center by the first truck.

In one embodiment, a vehicle drives through a stretch where there's been a recent minor accident. The local traffic management system (the first node) in that area sends accident information to the car. The car responds by sending back its speed, direction, and destination. The first node analyzes this information and determines the car's potential route. Predicting the vehicle's trajectory, the first node anticipates that the car will soon pass another segment of the highway overseen by an adjacent traffic node. The accident details and the car's trajectory are shared with this adjacent node. The adjacent node, based on the analyzed information and its own local data, constructs a route with safety warnings tailored for the car. As the car enters the adjacent node's segment, it receives these safety alerts.

In one embodiment, a shopper with a smart device walks into a store that's having a sale. The store's system (the first node) sends the ongoing sale details to the shopper's device. The device sends back the shopper's purchase history and preferences to the first node. After analyzing this information and predicting the shopper's path based on his past visits, the first node determines that the shopper is likely to walk into a neighboring store overseen by an adjacent promotional node. The first node shares the analyzed shopper data with this adjacent node. The adjacent node, leveraging the received insights and its own promotional content, constructs a set of offers specifically tailored for the shopper. As the shopper nears the adjacent store, his device receives these tailored promotions.

In one embodiment, a surveillance camera equipped with smart analytics (the first node) detects a multi-car collision in one of the lanes. Based on the visuals and past data, it predicts the severity as 'major', the duration for clearing the accident as 'two hours' and identifies a particular truck (the vehicle) associated with the accident that's carrying hazardous materials. The first node sends this prediction, and the estimated time the truck will approach a junction managed by another traffic management system (the second node). Before the truck reaches the junction, the second node sends notifications to other vehicles nearby, advising them to take alternative routes or to maintain a safe distance from the truck.

In one embodiment, a forest fire monitoring station (the first node) detects the start of a forest fire in a particular region. It predicts the severity based on the fire's spread rate, anticipates the fire lasting 'three days', and identifies a camper van (the vehicle) that's close to the fire origin. The first node shares this prediction with a nearby campground's alert system (the second node), including the time the camper van will be near the campground. Before the camper van reaches the campground, the second node sends notifications to other campers and vehicles in the vicinity, warning them about the fire and advising evacuation or specific safety measures.

In one embodiment, a health monitoring wearable detects that its wearer has had a serious medical episode, e.g., a heart attack. This information is relayed to the nearest emergency medical response center (the first node). Based on the wearer's medical history and the nature of the episode, the center predicts the event's severity, anticipates the duration for which medical intervention will be needed, and identifies an ambulance (the vehicle) dispatched for the event. The first node sends these predictions, and the estimated time the ambulance will pass a particular intersection to the city's traffic management system (the second node). Before the ambulance reaches the intersection, the second node sends notifications to vehicles near the intersection, directing them to clear the path or reroute, ensuring the ambulance gets a swift and unhindered passage.

In one embodiment, a vehicle containing advanced geospatial tracking modules integrates them with onboard infotainment systems. Concurrently, at the event venue, a high-capacity on-site digital relay hub is established, equipped with robust broadcasting tools and short-range communication capabilities, like Bluetooth or Wi-Fi Direct. As vehicles embark on their journey to the venue, the central command platform constantly pulls data from regional traffic management systems and combines it with real-time geospatial data from vehicles. When potential delays are detected, it initiates a connection with the on-site digital relay hub and begins streaming the event via cloud servers to the delayed vehicle's infotainment system. This connection is optimized using adaptive streaming algorithms that gauge the vehicle's cellular connectivity and adjust video quality in real time. As the vehicle nears the event location, the central command platform and the on-site digital relay hub communicate through an Application Programming Interface (API) handshake. This facilitates the seamless transfer of broadcast responsibilities to the relay hub. Using the vehicle's GPS data and predefined geofences set around the event location, the relay hub identifies when the vehicle has reached a specific proximity. At this crucial juncture, the hub automatically discontinues the broadcast to the vehicle.

In one embodiment, a vehicle is equipped with an onboard Artificial Intelligence (AI) module, which, through machine learning, continually adapts and refines its understanding of passengers' preferences and behaviors over time. This AI module is interconnected with the vehicle's multimedia system, navigation tools, and internal environmental controls. Simultaneously, the event location hosts an Intelligent Event Streamer (IES), which is not just a broadcasting tool but also an AI-driven content curator. A course is set for an event wherein the vehicle's AI module communicates with a central cloud-based Traffic Analysis System (TAS) to anticipate potential delays using historical traffic data, real-time congestion information, and predictive algorithms. When a delay is deemed likely, the AI module interfaces with the IES. Recognizing the specific profiles of the attendees in the vehicle through machine learning, the IES curates a tailored real-time event experience. This experience isn't just a direct stream; it's a personalized version of the event, highlighting moments or angles predicted to be of most interest to these specific passengers. While in transit, the vehicle's multimedia system presents this curated content, and the AI module uses feedback loops to understand passengers' reactions. If they seem disinterested or if there's a significant moment in the event, the AI module requests content adjustments from the IES in real time. As the vehicle nears the event venue, onboard sensors coupled with machine learning algorithms gauge the best moment to transition passengers from the virtual experience to the live event. The AI module collaboratively decides with the IES when to cease the broadcast, considering factors like parking time estimates and walking distance to the event entrance.

In one embodiment, a fleet of vehicles is equipped with data logging systems. Before a journey commences by a vehicle of the fleet of vehicles, the company's central management system determines the performance data it wants to upload to the vehicle, such as optimal engine settings or route updates, and identifies certain operational data it needs to download from the vehicle, such as fuel efficiency logs, wear and tear data, etc. To optimize this data transfer, the system calculates a route for the truck. This route determination is based on the time needed for the data exchange, the vehicle's average speed, and the locations of computing nodes across the highway system. By following this optimized route, the vehicle can swiftly and seamlessly exchange data with these hubs during its journey.

In one embodiment, a ride-sharing platform is presented. Before a car in the platform picks up a passenger, the platform's system determines which entertainment or news content to provide to the car's infotainment system (based on the passenger's preferences) and what trip data (like driving patterns, passenger feedback, etc.) it needs to retrieve from the car post-trip. The system then maps out a route for the driver, factoring in the time needed for these data operations, the car's speed, and the location of Wi-Fi hotspots and/or data hubs (computing nodes) in the city. By following this route, the car can download fresh entertainment content for the passenger and later upload trip data back to the platform with maximum efficiency.

In one embodiment, a smart city is presented wherein an ambulance needs to reach a critical patient. While speed is essential, the ambulance's onboard system also needs to receive real-time medical data about the patient (e.g., recent scans or medical history) and upload its current medical inventory or the vitals of any patients already on board. The city's emergency response system, using its smart grid, determines the best route for the ambulance. This route is calculated considering the time needed for data exchange, the ambulance's average speed, and the location of computing nodes that are spread throughout the city. By following this path, the ambulance can ensure it has all the necessary patient information before arrival while also keeping the hospital updated about its onboard situation.

Flow diagrams depicted herein, such as FIGS. 2C1, 2C2, 2C3, 2C4, 2C5, FIGS. 2D1, 2D2, 2D3, 2D4, 2D5, FIG. 2E, and FIG. 2F, are separate examples but may be the same or different embodiments. Any of the operations in one flow diagram could be adopted and shared with another flow diagram. No example operation is intended to limit the subject matter of any embodiment or corresponding claim.

It is important to note that all the flow diagrams and corresponding processes derived from FIGS. 2C1, 2C2, 2C3, 2C4, 2C5, FIGS. 2D1, 2D2, 2D3, 2D4, 2D5, FIG. 2E, and FIG. 2F may be part of a same process or may share sub-processes with one another thus making the diagrams combinable into a single preferred embodiment that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
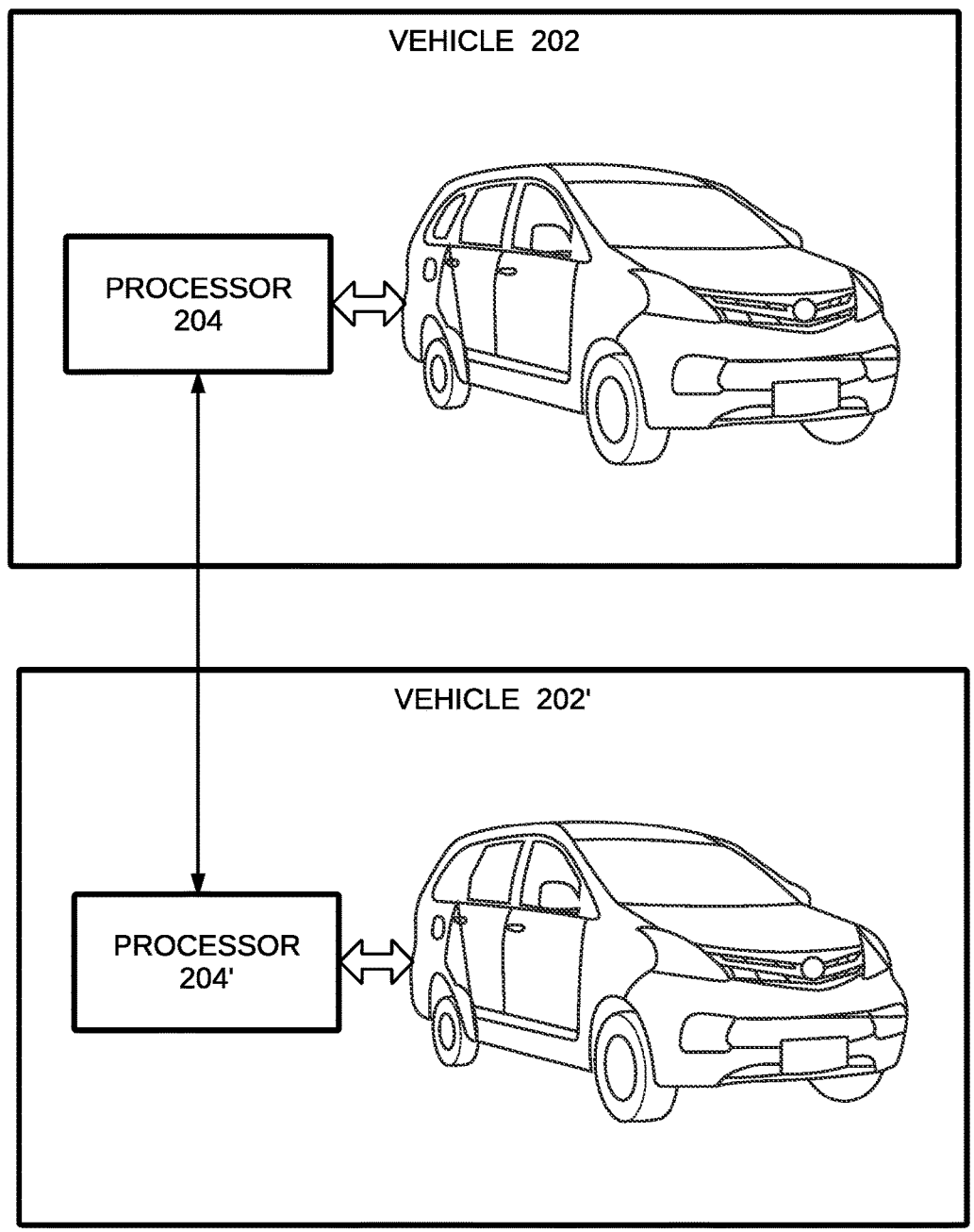
FIG. 2A illustrates a vehicle network diagram, according to example embodiments.

FIG. 2A illustrates a vehicle network diagram 200, according to example embodiments. The network comprises elements including a vehicle 202 including a processor 204, as well as a vehicle 202' including a processor 204'. The vehicles 202, 202' communicate with one another via the processors 204, 204', as well as other elements (not shown) including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. Although depicted as single vehicles and processors, a plurality of vehicles and processors may be present. One or more of the applications, features, steps, solutions, etc., described and/or depicted herein may be utilized and/or provided by the instant elements.

Figure 2B:
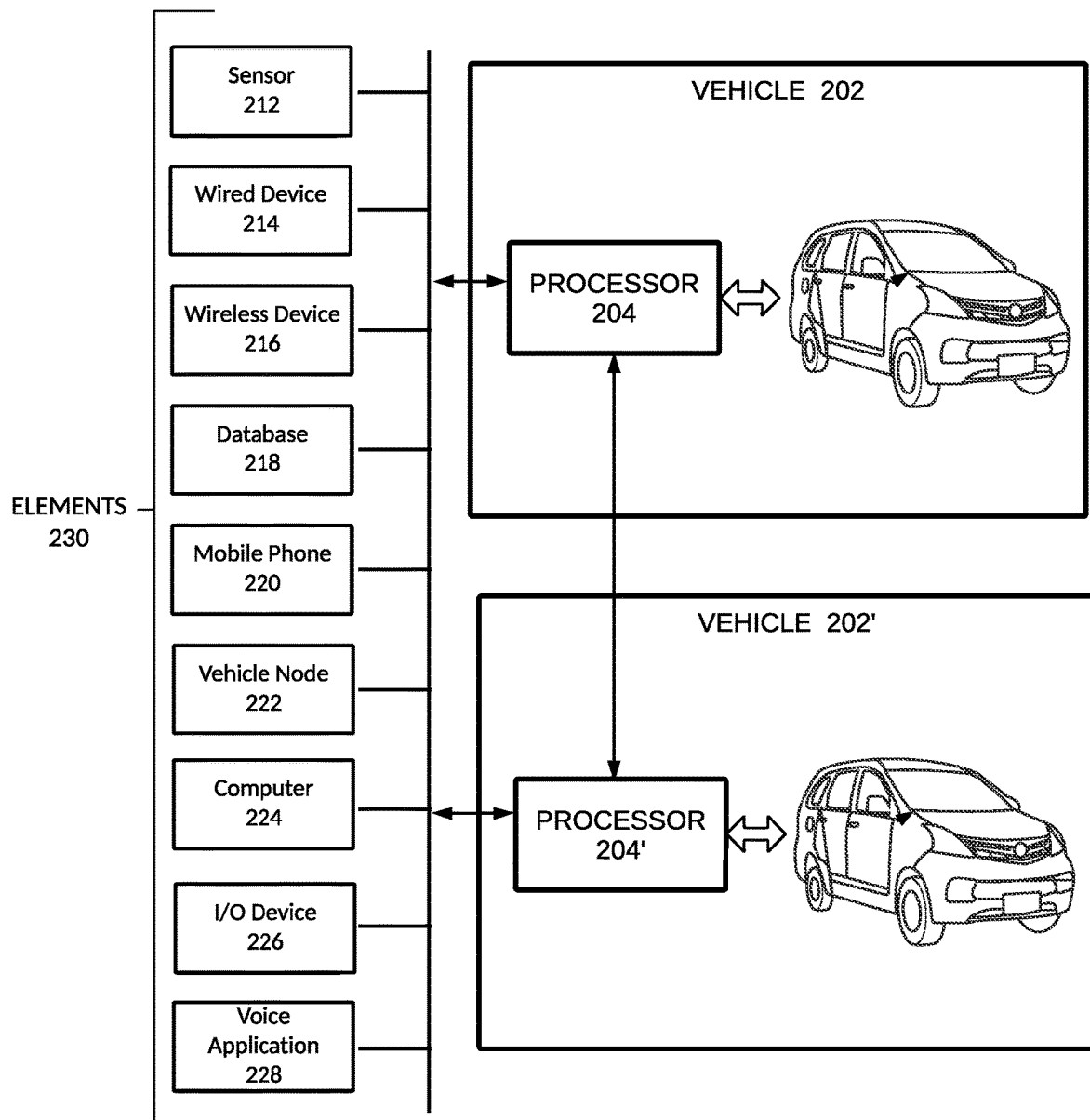
FIG. 2B illustrates another vehicle network diagram, according to example embodiments.

FIG. 2B illustrates another vehicle network diagram 210, according to example embodiments. The network comprises elements including a vehicle 202 including a processor 204, as well as a vehicle 202' including a processor 204'. The vehicles 202, 202' communicate with one another via the processors 204, 204', as well as other elements (not shown), including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. The processors 204, 204' can further communicate with one or more elements 230 including sensor 212, wired device 214, wireless device 216, database 218, mobile phone 220, vehicle 222, computer 224, I/O device 226, and voice application 228. The processors 204, 204' can further communicate with elements comprising one or more of a processor, memory, and software.

Although depicted as single vehicles, processors and elements, a plurality of vehicles, processors and elements may be present. Information or communication can occur to and/or from any of the processors 204, 204' and elements 230. For example, the mobile phone 220 may provide information to the processor 204, which may initiate the vehicle 202 to take an action, may further provide the information or additional information to the processor 204', which may initiate the vehicle 202' to take an action, may further provide the information or additional information to the mobile phone 220, the vehicle 222, and/or the computer 224. One or more of the applications, features, steps, solutions, etc., described and/or depicted herein may be utilized and/or provided by the instant elements.

FIG. 2C1 illustrates yet another vehicle network diagram 240C1, according to example embodiments. The network comprises elements including a vehicle 202, a processor 204, and a non-transitory computer readable media 242C1. The processor 204 is communicably coupled to the computer readable media 242C1 and elements 230 (which were depicted in FIG. 2B). The vehicle 202 could be a vehicle, server, or any device with a processor and memory.

The processor 204 performs one or more of determining, by a vehicle, that an occupant assist application is operating in the vehicle to assist a vehicle occupant during vehicle operation 244C1, determining, by the vehicle, that an unsafe driving condition is likely to occur via a monitoring application 2446C1, prior to a time that the unsafe driving condition is expected to occur, ceasing, by the vehicle, the occupant assist application 248C1, executing, by the vehicle, a driving assist application to assist with the vehicle operation during the unsafe driving condition 250C1.

FIG. 2C2 illustrates yet another vehicle network diagram 240C2, according to example embodiments. The network comprises elements including a vehicle 202, a processor 204, and a non-transitory computer readable media 242C2. The processor 204 is communicably coupled to the computer readable media 242C2 and elements 230 (which were depicted in FIG. 2B). The vehicle 202 could be a vehicle, server, or any device with a processor and memory.

The processor 204 performs one or more of accessing, by an application providing assistance to a vehicle, sensor data associated with an environment inside and outside of a vehicle and profile data associated with a vehicle occupant 244C2, determining, by the application, an initial condition of the vehicle occupant based on the sensor data and the profile data 246C2, responsive to the initial condition being above a health condition threshold, accessing, by the application, health data associated with the vehicle occupant from a mobile device 248C2, determining, by the application, an updated condition of the vehicle occupant based on the health data 250C2, creating, by the application, an alert to notify the occupant based on the updated condition and one or more current driving conditions of the vehicle identified by the sensor data 252C2, and performing, by the vehicle, one or more vehicle actions based on the alert and the one or more current driving conditions 254C2.

FIG. 2C3 illustrates yet another vehicle network diagram 240C3, according to example embodiments. The network comprises elements including a vehicle 202, a processor 204, and a non-transitory computer readable media 242C3. The processor 204 is communicably coupled to the computer readable media 242C3 and elements 230 (which were depicted in FIG. 2B). The vehicle 202 could be a vehicle, server, or any device with a processor and memory.

The processor 204 performs one or more of monitoring, via a vehicle, a behavior of an occupant of the vehicle 244C3, responsive to the behavior being above a threshold, generating via an application of the vehicle, a first suggested action intended for the occupant based on the behavior and an amount the behavior is above the threshold 246C3, monitoring, by the vehicle, whether the first suggested action is being performed by the occupant 248C3, determining an alternate action is being performed by the occupant, generating a second suggested action based on the alternate action and the first suggested action 250C3, providing a value to an occupant device associated with the occupant responsive to the second action being detected by the transport 252C3.

FIG. 2C4 illustrates yet another vehicle network diagram 240C4, according to example embodiments. The network comprises elements including a vehicle 202, a processor 204, and a non-transitory computer readable media 242C4. The processor 204 is communicably coupled to the computer readable media 242C4 and elements 230 (which were depicted in FIG. 2B). The vehicle 202 could be a vehicle, server, or any device with a processor and memory.

The processor 204 performs one or more of receiving a first response, from an application associated with a vehicle, including one or more factual statements determined by the application based on a set of data 244C4, retrieving vehicle data from the vehicle related to the factual statements 246C4, parsing the first response into one or more portions of the one or more factual statements 248C4, comparing the one or more portions to other portions of other factual statements included in a first knowledgebase containing other factual statements, wherein the other factual statements are based on the vehicle data 250C4, receiving a second response, from the application, including one or more amended factual statements based on the comparing 252C4.

FIG. 2C5 illustrates yet another vehicle network diagram 240C5, according to example embodiments. The network comprises elements including a vehicle 202, a processor 204, and a non-transitory computer readable media 242C5. The processor 204 is communicably coupled to the computer readable media 242C5 and elements 230 (which were depicted in FIG. 2B). The vehicle 202 could be a vehicle, server, or any device with a processor and memory.

The processor 204 performs one or more of identifying, via a vehicle application of a vehicle, one or more topics of interest associated with a vehicle occupant based one or more vehicle occupant behaviors detected by the vehicle 244C5, applying, via the vehicle application, one or more enhanced services to a device associated with vehicle occupant based on the one or more topics of interest and an occupant profile 246C5, and modifying, via the vehicle application, the one or more enhanced services based on the device location and changes to the one or more vehicle occupant behaviors 248C5.

FIG. 2D1 illustrates a further vehicle network diagram 250D1, according to example embodiments. The network comprises elements including a vehicle 202 a processor 204, and a non-transitory computer readable media 242D1. The processor 204 is communicably coupled to the computer readable media 242D1 and elements 230 (which were depicted in FIG. 2B). The vehicle 202 could be a vehicle, server or any device with a processor and memory.

The processor 204 performs one or more of responsive to identifying the unsafe driving condition, identifying priorities assigned to the occupant assist application and the driving assist application and determining to execute the driving assist application based on the priority assigned to the driving assist application being higher than a priority assigned to the occupant assist application 244D1, assigning a value to the unsafe driving condition based on a plurality of stored values and associated unsafe driving conditions determining the value exceeds an unsafe driving condition threshold value, and determining to cease the occupant assist application based on the value exceeding the unsafe driving condition threshold 245D1, performing one or more autonomous vehicle driving operations via the driving assist application, and determining via the monitoring application that the unsafe driving condition is less likely to occur based on a new value assigned to the unsafe driving condition after the one or more autonomous vehicle driving operations have been performed 246D1, ceasing, by the vehicle, the occupant assist application comprises partially ceasing the occupant assist application to only permit vehicle driving operations performed by the occupant assist application 247D1, transmitting, via the vehicle, an alert via the driving assist application to alert the vehicle occupant, and responsive to the alert being transmitted, ceasing the occupant assist application 248D1, determining, by the vehicle, that the unsafe driving condition has expired via the monitoring application, and re-establishing portions of the driving assist application for a period of time 249D1.

FIG. 2D2 illustrates a further vehicle network diagram 250D2, according to example embodiments. The network comprises elements including a vehicle 202 a processor 204, and a non-transitory computer readable media 242D2. The processor 204 is communicably coupled to the computer readable media 242D2 and elements 230 (which were depicted in FIG. 2B). The vehicle 202 could be a vehicle, server or any device with a processor and memory.

The processor 204 performs one or more of determining an initial condition of the vehicle occupant comprises identifying one or more of occupant actions from the sensor data received from one or more internal vehicle sensors, and conditions of the vehicle occupant from a health monitoring application operating on the mobile device 244D2, the mobile device is worn by the vehicle occupant and is monitoring one or more vital signs of the vehicle occupant 245D2, updating the profile data associated with the occupant based on the sensor data received from one or more internal vehicle sensors and one or more conditions of the vehicle occupant captured by a health monitoring application operating on the mobile device 246D2, the accessing, by the vehicle, the sensor data further comprises identifying a vehicle driving environment has exceeded a roadway safety threshold based on the sensor data associated with the outside of the vehicle, identifying the profile data is above the health condition threshold, and determining the initial condition requires the one or more vehicle actions 247D2, the one or more vehicles actions comprise identifying a plurality of routes to a destination, comparing the plurality of routes to identify one or more of the shortest route, the fastest route, the safest route and the lowest cost route, and selecting the safest route based on a route score and the initial condition of the vehicle occupant 248D2, and determining after a period of time, by the application, an updated condition of the vehicle occupant is lower than the health condition threshold based on the health data, and performing, by the vehicle, one or more additional vehicle actions which were not permissible while the health condition threshold was exceeded 249D2.

FIG. 2D3 illustrates a further vehicle network diagram 250D3, according to example embodiments. The network comprises elements including a vehicle 202 a processor 204, and a non-transitory computer readable media 242D3. The processor 204 is communicably coupled to the computer readable media 242D3 and elements 230 (which were depicted in FIG. 2B). The vehicle 202 could be a vehicle, server or any device with a processor and memory.

The processor 204 performs one or more of determining the behavior comprises one or more of a vehicle operation action and a limited time related action 244D3, the first suggested action comprises a prompt to notify the occupant to perform one or more of modify a current vehicle operation action and a future vehicle operation action 245D3, receiving sensor data from internal vehicle sensors identifying a movement of the occupant, and determining whether the occupant has performed the first suggested action based on the sensor data 246D3, retrieving a profile associated with the occupant from the occupant device, and determining a value type to apply to subsequent occupant compliance actions based on the profile 247D3, determining one or more of the first suggested action and the second suggested action have been performed by the occupant, and providing the value of the value type to the occupant profile 248D3, and determining only the second suggested action has been performed by the occupant, and providing a partial value of the value type to the occupant profile 249D3.

FIG. 2D4 illustrates a further vehicle network diagram 250D4, according to example embodiments. The network comprises elements including a vehicle 202 a processor 204, and a non-transitory computer readable media 242D4. The processor 204 is communicably coupled to the computer readable media 242D4 and elements 230 (which were depicted in FIG. 2B). The vehicle 202 could be a vehicle, server or any device with a processor and memory.

The processor 204 performs one or more of identifying matches between the one or more portions and the other portions based on the comparing, and assigning a first match accuracy score to the identified matches 244D4, responsive to the first match accuracy score being below an accuracy threshold, querying an additional knowledgebase and performing an additional comparing operation, and assigning a further match accuracy score to further identified matches 245D4, responsive to the further match accuracy score being below the accuracy threshold, determining the second response 246D4, receiving the vehicle data from one or more vehicle sensors during a roadway driving event, and storing the vehicle data in the knowledgebase 247D4, determining one or more of the factual statements from the first response are false based on the vehicle data 248D4, modifying the knowledgebase by removing the false factual statements, and creating the second response based on the modified knowledgebase 249D4.

FIG. 2D5 illustrates a further vehicle network diagram 250D5, according to example embodiments. The network comprises elements including a vehicle 202 a processor 204, and a non-transitory computer readable media 242D5. The processor 204 is communicably coupled to the computer readable media 242D5 and elements 230 (which were depicted in FIG. 2B). The vehicle 202 could be a vehicle, server or any device with a processor and memory.

The processor 204 performs one or more of providing an initial enhanced service to the device, and determining an initial subscription level to apply to the initial enhanced service based on capabilities of the device 244D5, modifying the initial subscription level based on one or more of: changing the device location from a first location to a second location, and identifying one or more additional topics of interest identified from vehicle occupant while operating the vehicle 245D5, providing content to a device integrated with the vehicle based on the one or more enhanced services while the occupant is inside the vehicle, and providing the content to the device associated with the vehicle occupant after the occupant has exited the vehicle, and wherein the content provided to the device is modified based on the location of the device 246D5, determining the device has exited the vehicle and the device location has changed, and modifying the initial subscription level based on a new device location 247D5, receiving one or more selections associated with the one or more enhanced services, and providing one or more options for subscription levels to the device based on the one or more selections 248D5, determining one or more content types accessed by the device, determining one or more user preferences from the occupant profile, and selecting a first content type to provide to the device based on the user preferences 249D5.

While this example describes in detail only one vehicle 202, multiple such nodes may be connected to the blockchain 206. It should be understood that the vehicle 202 may include additional components and that some of the components described herein may be removed and/or modified without departing from a scope of the instant application. The vehicle 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the vehicle 202 may include multiple processors, multiple cores, or the like without departing from the scope of the instant application. The vehicle 202 could be a vehicle, server or any device with a processor and memory.

The processor 204 performs one or more of receiving a confirmation of an event from one or more elements described or depicted herein, wherein the confirmation comprises a blockchain consensus between peers represented by any of the elements 244E and executing a smart contract to record the confirmation on a blockchain-based on the blockchain consensus 246E. Consensus is formed between one or more of any element 230 and/or any element described or depicted herein, including a vehicle, a server, a wireless device, etc. In another example, the vehicle 202 can be one or more of any element 230 and/or any element described or depicted herein, including a server, a wireless device, etc.

The processors and/or computer readable media 242E may fully or partially reside in the interior or exterior of the vehicles. The steps or features stored in the computer readable media 242E may be fully or partially performed by any of the processors and/or elements in any order. Additionally, one or more steps or features may be added, omitted, combined, performed at a later time, etc.

FIG. 2E1 illustrates a flow diagram 260E1, according to example embodiments. Referring to FIG. 2E1, the process may include one or more of determining, by a vehicle, that an occupant assist application is operating in the vehicle to assist a vehicle occupant during vehicle operation 244E1, determining, by the vehicle, that an unsafe driving condition is likely to occur via a monitoring application 2446E1, prior to a time that the unsafe driving condition is expected to occur, ceasing, by the vehicle, the occupant assist application 248E1, and executing, by the vehicle, a driving assist application to assist with the vehicle operation during the unsafe driving condition 250E1.

FIG. 2E2 illustrates a flow diagram 260E2, according to example embodiments. Referring to FIG. 2E2, the process may include one or more of accessing, by an application providing assistance to a vehicle, sensor data associated with an environment inside and outside of a vehicle and profile data associated with a vehicle occupant 244E2, determining, by the application, an initial condition of the vehicle occupant based on the sensor data and the profile data 246E2, responsive to the initial condition being above a health condition threshold, accessing, by the application, health data associated with the vehicle occupant from a mobile device 248E2, determining, by the application, an updated condition of the vehicle occupant based on the health data 250E2, creating, by the application, an alert to notify the occupant based on the updated condition and one or more current driving conditions of the vehicle identified by the sensor data 252E2, and performing, by the vehicle, one or more vehicle actions based on the alert and the one or more current driving conditions 254E2.

FIG. 2E3 illustrates a flow diagram 260E3, according to example embodiments. Referring to FIG. 2E3, the process may include one or more of monitoring, via a vehicle, a behavior of an occupant of the vehicle 244E3, responsive to the behavior being above a threshold, generating via an application of the vehicle, a first suggested action intended for the occupant based on the behavior and an amount the behavior is above the threshold 246E3, monitoring, by the vehicle, whether the first suggested action is being performed by the occupant 248E3, determining an alternate action is being performed by the occupant, generating a second suggested action based on the alternate action and the first suggested action 250E3, providing a value to an occupant device associated with the occupant responsive to the second action being detected by the transport 252E3.

FIG. 2E4 illustrates a flow diagram 260E4, according to example embodiments. Referring to FIG. 2E4, the process may include one or more of receiving a first response, from an application associated with a vehicle, including one or more factual statements determined by the application based on a set of data 244E4, retrieving vehicle data from the vehicle related to the factual statements 246E4, parsing the first response into one or more portions of the one or more factual statements 248E4, comparing the one or more portions to other portions of other factual statements included in a first knowledgebase containing other factual statements, wherein the other factual statements are based on the vehicle data 250E4, receiving a second response, from the application, including one or more amended factual statements based on the comparing 252E4.

FIG. 2E5 illustrates a flow diagram 260E5, according to example embodiments. Referring to FIG. 2E5, the process may include one or more of identifying, via a vehicle application of a vehicle, one or more topics of interest associated with a vehicle occupant based one or more vehicle occupant behaviors detected by the vehicle 244E5, applying, via the vehicle application, one or more enhanced services to a device associated with vehicle occupant based on the one or more topics of interest and an occupant profile 246E5, and modifying, via the vehicle application, the one or more enhanced services based on the device location and changes to the one or more vehicle occupant behaviors 248E5.

FIG. 2F1 illustrates another flow diagram 270F1, according to example embodiments. Referring to FIG. 2F1, the process may include one or more of responsive to identifying the unsafe driving condition, identifying priorities assigned to the occupant assist application and the driving assist application and determining to execute the driving assist application based on the priority assigned to the driving assist application being higher than a priority assigned to the occupant assist application 244F1, assigning a value to the unsafe driving condition based on a plurality of stored values and associated unsafe driving conditions determining the value exceeds an unsafe driving condition threshold value, and determining to cease the occupant assist application based on the value exceeding the unsafe driving condition threshold 246F1, performing one or more autonomous vehicle driving operations via the driving assist application, and determining via the monitoring application that the unsafe driving condition is less likely to occur based on a new value assigned to the unsafe driving condition after the one or more autonomous vehicle driving operations have been performed 248F1, ceasing, by the vehicle, the occupant assist application comprises partially ceasing the occupant assist application to only permit vehicle driving operations performed by the occupant assist application 250F1, transmitting, via the vehicle, an alert via the driving assist application to alert the vehicle occupant, and responsive to the alert being transmitted, ceasing the occupant assist application 252F1, and determining, by the vehicle, that the unsafe driving condition has expired via the monitoring application, and re-establishing portions of the driving assist application for a period of time 254F1.

FIG. 2F2 illustrates another flow diagram 270F2, according to example embodiments. Referring to FIG. 2F2, the process may include one or more of determining an initial condition of the vehicle occupant comprises identifying one or more of occupant actions from the sensor data received from one or more internal vehicle sensors, and conditions of the vehicle occupant from a health monitoring application operating on the mobile device 244F2, the mobile device is worn by the vehicle occupant and is monitoring one or more vital signs of the vehicle occupant 246F2, updating the profile data associated with the occupant based on the sensor data received from one or more internal vehicle sensors and one or more conditions of the vehicle occupant captured by a health monitoring application operating on the mobile device 248F2, the accessing, by the vehicle, the sensor data further comprises identifying a vehicle driving environment has exceeded a roadway safety threshold based on the sensor data associated with the outside of the vehicle, identifying the profile data is above the health condition threshold, and determining the initial condition requires the one or more vehicle actions 250F2, the one or more vehicles actions comprise identifying a plurality of routes to a destination, comparing the plurality of routes to identify one or more of the shortest route, the fastest route, the safest route and the lowest cost route, and selecting the safest route based on a route score and the initial condition of the vehicle occupant 252F2, and determining after a period of time, by the application, an updated condition of the vehicle occupant is lower than the health condition threshold based on the health data, and performing, by the vehicle, one or more additional vehicle actions which were not permissible while the health condition threshold was exceeded 254F2.

FIG. 2F3 illustrates another flow diagram 270F3, according to example embodiments. Referring to FIG. 2F3, the process may include one or more of determining the behavior comprises one or more of a vehicle operation action and a limited time related action 244F3, the first suggested action comprises a prompt to notify the occupant to perform one or more of modify a current vehicle operation action and a future vehicle operation action 246F3, receiving sensor data from internal vehicle sensors identifying a movement of the occupant, and determining whether the occupant has performed the first suggested action based on the sensor data 248F3, retrieving a profile associated with the occupant from the occupant device, and determining a value type to apply to subsequent occupant compliance actions based on the profile 250F3, determining one or more of the first suggested action and the second suggested action have been performed by the occupant, and providing the value of the value type to the occupant profile 252F3, and determining only the second suggested action has been performed by the occupant, and providing a partial value of the value type to the occupant profile 254F3.

FIG. 2F4 illustrates another flow diagram 270F4, according to example embodiments. Referring to FIG. 2F4, the process may include one or more of identifying matches between the one or more portions and the other portions based on the comparing, and assigning a first match accuracy score to the identified matches 244F4, responsive to the first match accuracy score being below an accuracy threshold, querying an additional knowledgebase and performing an additional comparing operation, and assigning a further match accuracy score to further identified matches 246F4, responsive to the further match accuracy score being below the accuracy threshold, determining the second response 248F4, receiving the vehicle data from one or more vehicle sensors during a roadway driving event, and storing the vehicle data in the knowledgebase 250F4, determining one or more of the factual statements from the first response are false based on the vehicle data 252F4, modifying the knowledgebase by removing the false factual statements, and creating the second response based on the modified knowledgebase 254F4.

FIG. 2F5 illustrates another flow diagram 270F5, according to example embodiments. Referring to FIG. 2F5, the process may include one or more of providing an initial enhanced service to the device, and determining an initial subscription level to apply to the initial enhanced service based on capabilities of the device 244F5, modifying the initial subscription level based on one or more of: changing the device location from a first location to a second location, and identifying one or more additional topics of interest identified from vehicle occupant while operating the vehicle 246F5, providing content to a device integrated with the vehicle based on the one or more enhanced services while the occupant is inside the vehicle, and providing the content to the device associated with the vehicle occupant after the occupant has exited the vehicle, and wherein the content provided to the device is modified based on the location of the device 248F5, determining the device has exited the vehicle and the device location has changed, and modifying the initial subscription level based on a new device location 250F5, receiving one or more selections associated with the one or more enhanced services, and providing one or more options for subscription levels to the device based on the one or more selections 252F5, determining one or more content types accessed by the device, determining one or more user preferences from the occupant profile, and selecting a first content type to provide to the device based on the user preferences 254F5.

Figure 3A:
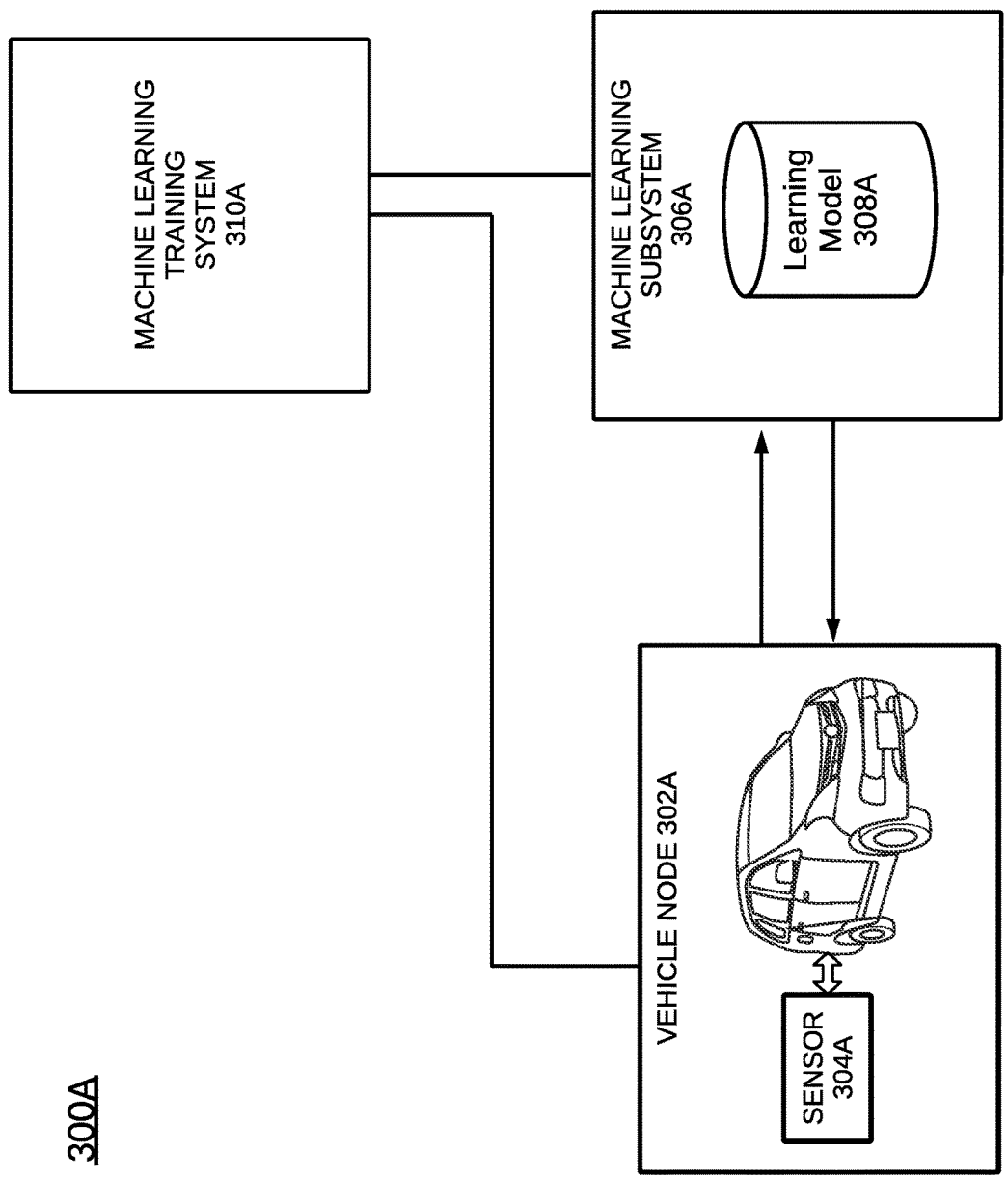
FIG. 3A illustrates a machine learning network diagram, according to example embodiments.

Referring now to FIG. 3A, a diagram depicting a machine learning vehicle network diagram 300A. The machine learning subsystem 306A contains a learning model 308A, which is an artifact created by a machine learning training system 310A that generates predictions by finding patterns in one or more training data sets. In some embodiments, the machine learning subsystem 306A resides in the vehicle node 302A. An artifact is used to describe an output created by a training process, such as a checkpoint, a file, or a model. In other embodiments, the machine learning subsystem 306A resides outside of the vehicle node 302A.

The vehicle 302A sends data from the one or more sensors 304A to the machine learning subsystem 306A. The machine learning subsystem 306A provides the one or more sensor 304A data to the learning model 308A, which returns one or more predictions. The machine learning subsystem 306A sends one or more instructions to the vehicle 302A based on the predictions from the learning model 308A.

In a further embodiment, the vehicle 302A may send the one or more sensor 304A data to the machine learning training system 310A. In yet another example, the machine learning subsystem 306A may send the sensor 304A data to the machine learning subsystem 306A. One or more of the applications, features, steps, solutions, etc., described and/or depicted herein may utilize the machine learning network 400 as described herein.

The example embodiments may communicate with a host platform 320, as shown in the examples of FIGS. 3B-3E. The system 300B may be hosted by or otherwise communicate with the host platform 320 shown in FIGS. 3B-3E. That is, the methods, systems, and processes described herein may interact with the processes and systems that are shown in the examples shown and described in FIGS. 3B-3E.

Figure 3B:
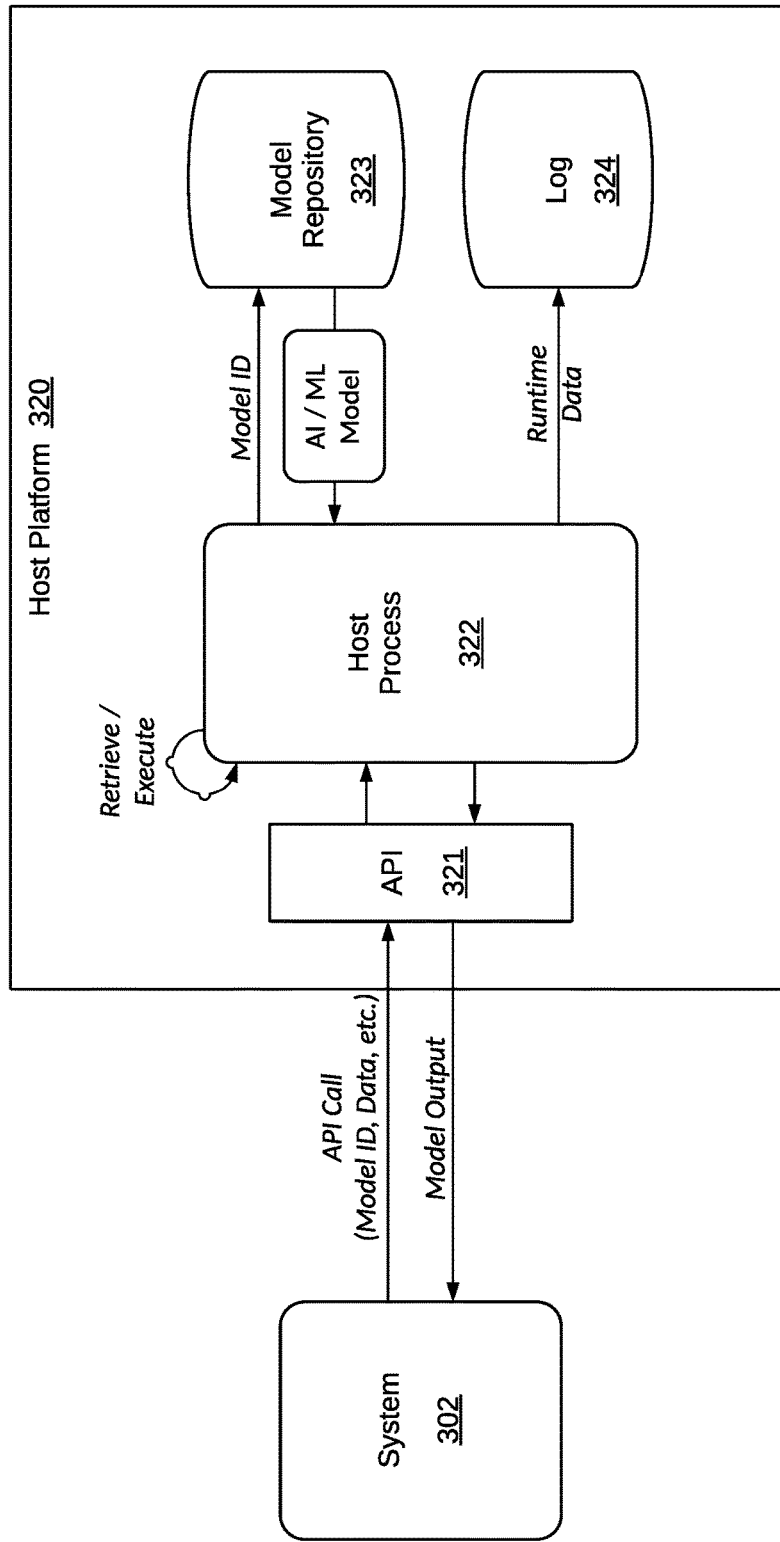
FIG. 3B illustrates another machine learning network diagram, according to example embodiments.

For example, FIG. 3B illustrates a process 300B of executing a machine learning model via the host platform 320. The host platform 320 may host a process 322 within a live runtime environment that is accessible to other software programs, applications, and the like, via a network such as the Internet. Here, the host process 322 may have a URL, endpoint, API, etc., which is publicly available on the Internet.

In this example, the host process 322 may control access to and execution of models that are stored within a model repository 323. For example, the models may include artificial intelligence (AI) models, machine learning models, neural networks, or the like. The system 300B may trigger the execution of a model from the model repository 323 via submission of a call to an application programming interface (API) 321 of the host process 322. The request may include an identifier of a model or models to be executed, a payload of data (e.g., to be input to the model during execution), and the like. The host process 322 may receive the call from the system 300B and retrieve the corresponding model from the model repository 323, deploy the model within a live runtime environment, execute the model on the input data, and return a result of the execution to the system 302. The result of the execution may include an output result from the execution of the model.

In some embodiments, the system 300B may provide feedback from the output provided by the model. For example, a user may input a confirmation that the prediction output by the model is correct or provide a notification that the model is incorrect. This information may be added to the results of execution and stored within a log 324. The log data may include an identifier of the input, an identifier of the output, an identifier of the model used, and feedback from the recipient. This information may be used to subsequently retrain the model, for example, using the model development environment shown in the example of FIG. 3C.

Figure 3C:
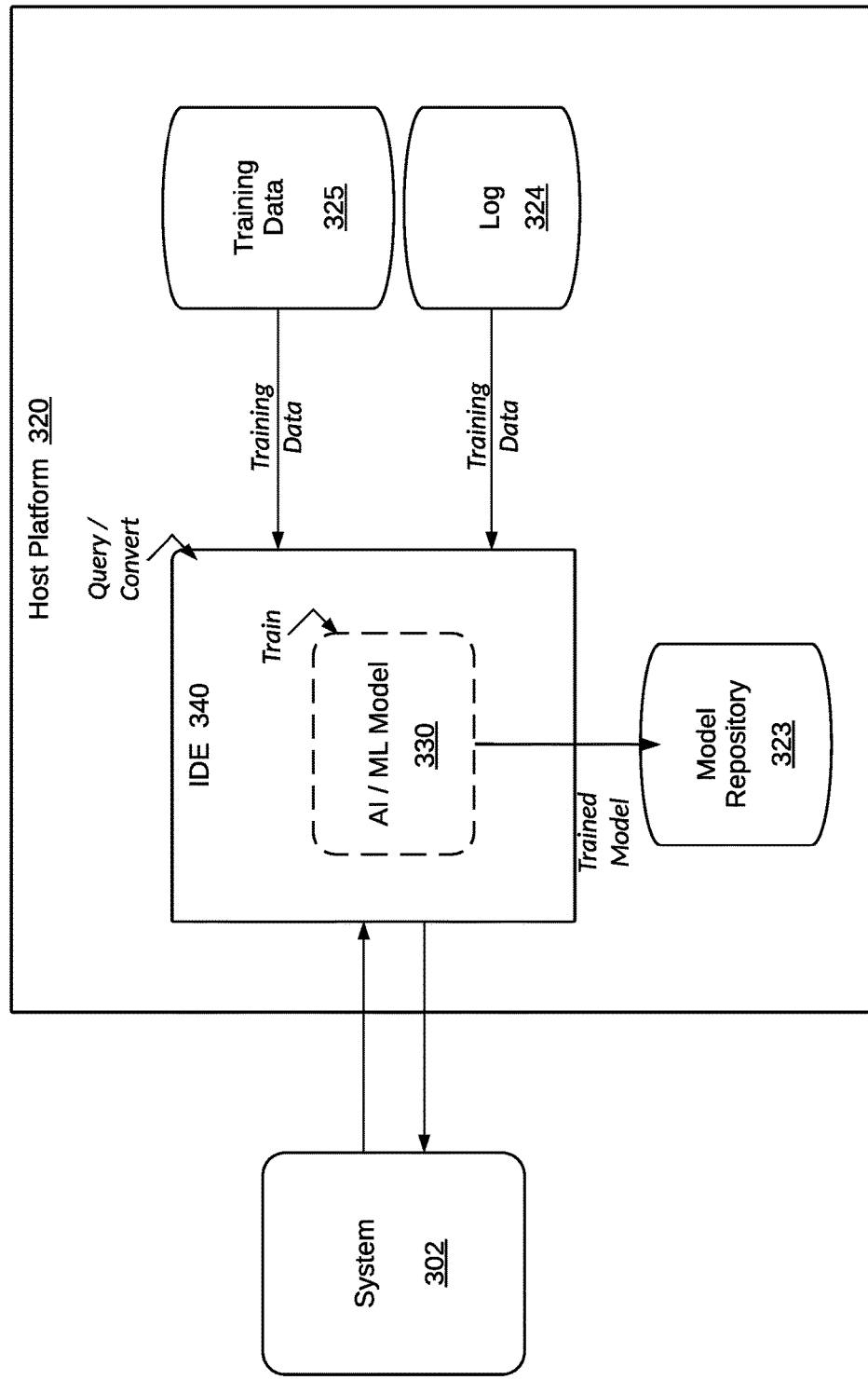
FIG. 3C illustrates yet another machine learning network diagram, according to example embodiments.

FIG. 3C illustrates a process 300C of training a machine learning model 330 according to example embodiments.

Referring to FIG. 3C, the host platform 320 may host an integrated development environment (IDE) 340 where machine learning models, AI models, and the like may be developed, trained, retrained, and the like. In this example, the IDE 340 may include a software application with a user interface accessible by the system 302. For example, the IDE 340 may be embodied as a web application that can be accessed by a device at a network address, URL, etc. As another example, the IDE 340 may be locally or remotely installed on a computing device used by a user.

The system 300C may be used to design a model (via a user interface of the IDE), such as a machine learning model, etc. The model can then be executed/trained based on the training data established via the user interface. For example, the user interface may be used to build a new model. The training data for training such a new model may be provided from a training data store 325, which includes training samples from the web, from customers, and the like. Here, the model is executed on the training data via the host platform 320 to generate a result. The execution of the model causes the model to learn based on the input training data. When the model is fully trained, it may be stored within the model repository 323 via the IDE 340, or the like.

As another example, the IDE 340 may be used to retrain an existing model. Here, the training process may use executional results previously generated/output by the model 330 (including any feedback, etc.) to retrain the model 330. For example, predicted outputs that are identified as accurate, best, good, etc., may be distinguished from outputs that are inaccurate, incorrect, bad, etc. One or more of these types of outputs can be identified and used for retraining the model to help the model provide better outputs.

Figure 3D:
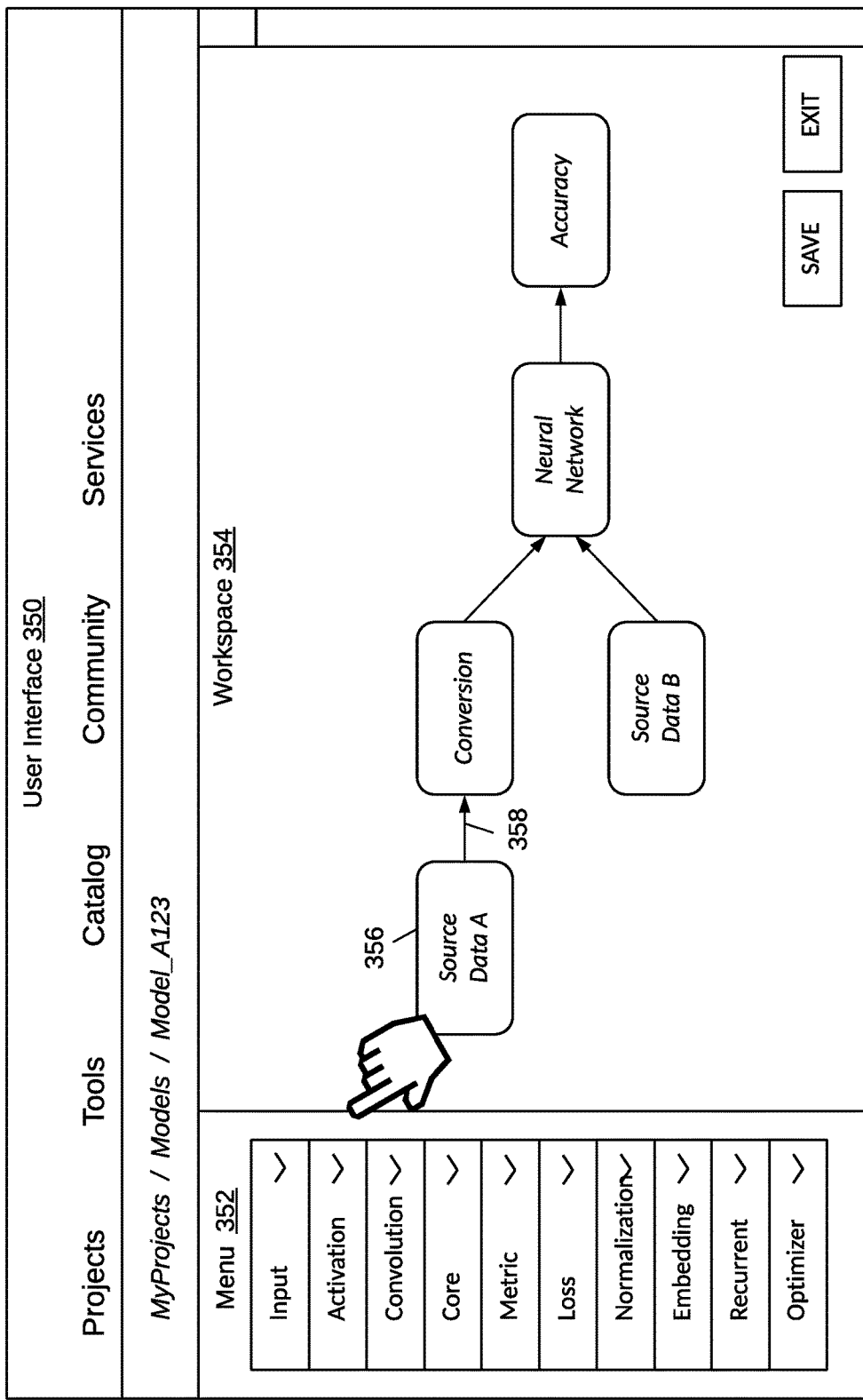
FIG. 3D illustrates a further machine learning network diagram, according to example embodiments.

FIG. 3D illustrates a process 300D of designing a new machine learning model via a user interface of the system 300B according to example embodiments. As an example, the system 300B may be output as part of the software application 330, which interacts with the IDE 340 shown in FIG. 3C, however, embodiments are not limited thereto. Referring to FIG. 3D, a user can use an input mechanism from a menu 352 of a user interface 350 to add pieces/components to a model being developed within a workspace 354 of the user interface 350.

In the example of FIG. 3D the menu 352 includes a plurality of graphical user interface (GUI) menu options which can be selected to drill down into additional components that can be added to the model design shown in the workspace 354. Here, the GUI menu includes options for adding features such as neural networks, machine learning models, AI models, data sources, conversion processes (e.g., vectorization, encoding, etc.), analytics, etc. The user can continue to add features to the model and connect them using edges or other means to create a flow within the workspace 354. For example, the user may add a node 356 to a diagram of a new model within the workspace 354. For example, the user may connect the node 356 to another node in the diagram via an edge 358, creating a dependency within the diagram. When the user is done, the user can save the model for subsequent training/testing.

In another example, the name of the object can be identified from a web page or a user interface 350 where the object is visible within a browser or the workspace 354 on the user device. A pop-up within the browser or the workspace 354 can be overlayed where the object is visible, which includes an option to navigate to the identified web page corresponding to the alternative object via a rule set.

Figure 3E:
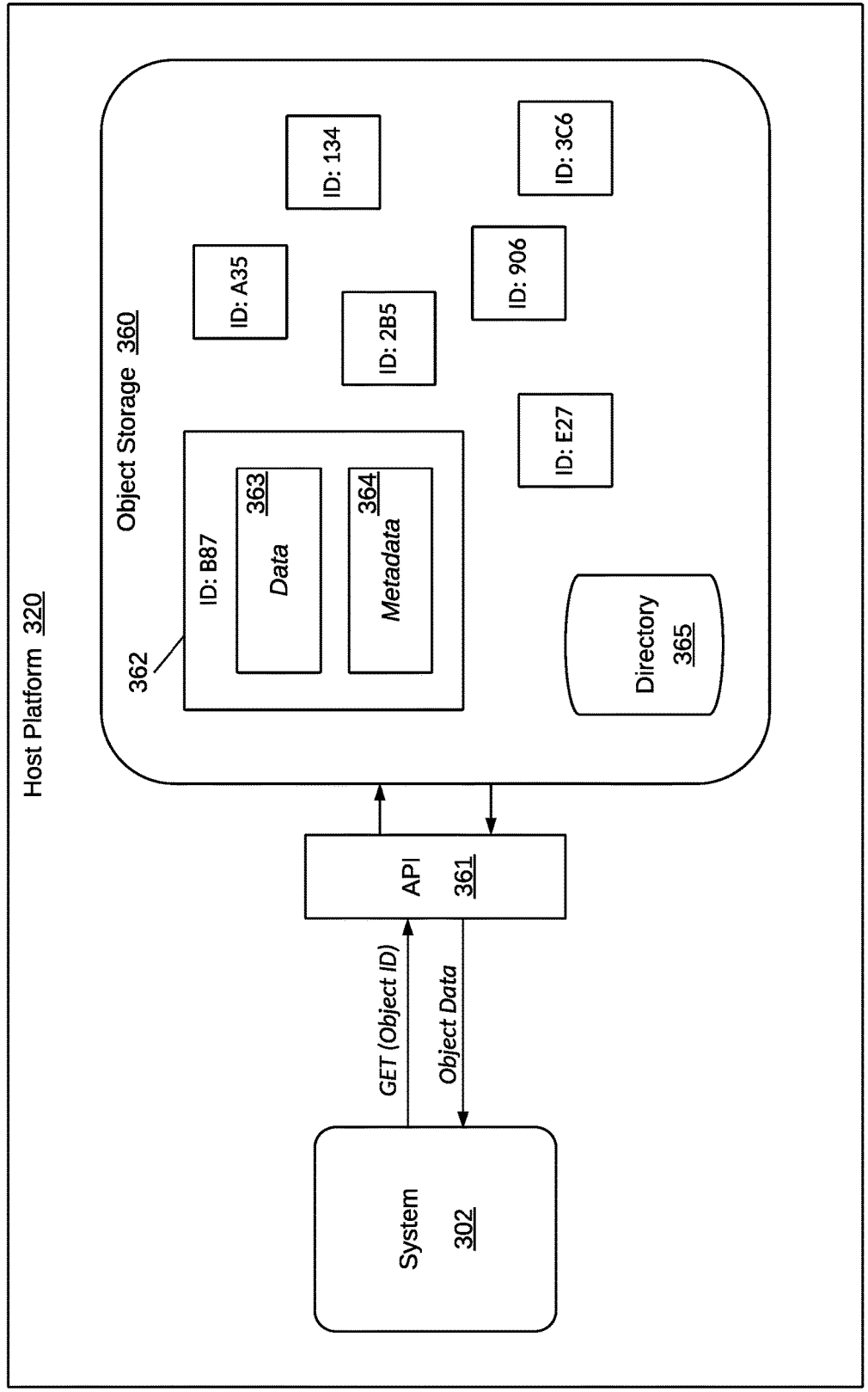
FIG. 3E illustrates a machine learning network diagram, according to example embodiments.

FIG. 3E illustrates a process 300E of accessing an object 362 from an object storage 360 of the host platform 320 according to example embodiments. For example, the object storage 360 may store data that is used by the AI models and machine learning (ML) models 330, training data, expected outputs for testing, training results, and the like. The object storage 360 may also store any other kind of data. Each object may include a unique identifier, a data section 363, and a metadata section 364, which provides a descriptive context associated with the data, including data that can later be extracted for purposes of machine learning. The unique identifier may uniquely identify an object with respect to all other objects in the object storage 360. The data section 363 may include unstructured data such as web pages, digital content, images, audio, text, and the like.

Instead of breaking files into blocks stored on disks in a file system, the object storage 360 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application 300C can use to locate and access it. In this case, the metadata is more descriptive than a file-based approach. The metadata can be customized with additional context that can later be extracted and leveraged for other purposes, such as data analytics.

The objects that are stored in the object storage 360 may be accessed via an application programming interface (API) 361. The API 361 may be a Hypertext Transfer Protocol (HTTP)-based RESTful API (also known as a RESTful Web service). The API 361 can be used by the client application 300C to query an object's metadata to locate the desired object (data) via the Internet from anywhere on any device. The API 361 may use HTTP commands such as "PUT" or "POST" to upload an object, "GET" to retrieve an object, "DELETE" to remove an object, and the like.

The object storage 360 may provide a directory 365 that uses the metadata of the objects to locate appropriate data files. The directory 365 may contain descriptive information about each object stored in the object storage 360, such as a name, a unique identifier, a creation timestamp, a collection name, etc. To query the object within the object storage 360, the client application 300C may submit a command, such as an HTTP command, with an identifier of the object 362, a payload, etc. The object storage 360 can store the actions and results described herein, including associating two or more lists of ranked assets with one another based on variables used by the two or more lists of ranked assets that have a correlation above a predetermined threshold.

Figure 4A:
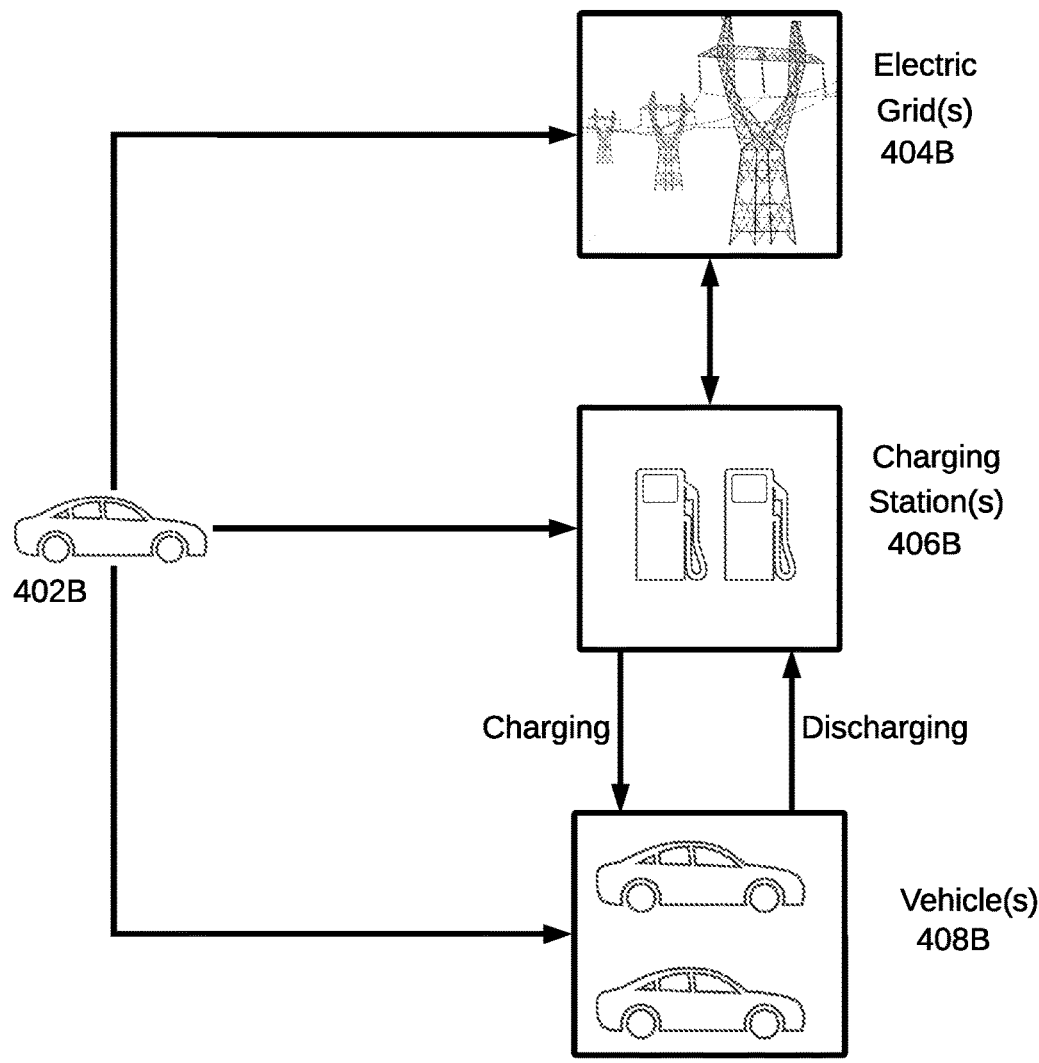
FIG. 4A illustrates a diagram depicting electrification of one or more elements, according to example embodiments.

FIG. 4A illustrates a diagram 400A depicting the electrification of one or more elements. In one example, a vehicle 402B may provide power stored in its batteries to one or more elements, including other vehicle(s) 408B, charging station(s) 406B, and electric grid(s) 404B. The electric grid(s) 404B is/are coupled to one or more of the charging stations 406B, which may be coupled to one or more of the vehicles 408B. This configuration allows the distribution of electricity/power received from the vehicle 402B. The vehicle 402B may also interact with the other vehicle(s) 408B, such as via Vehicle to Vehicle (V2V) technology, communication over cellular, WiFi, and the like. The vehicle 402B may also interact wirelessly and/or wired with other vehicles 408B, the charging station(s) 406B and/or with the electric grid(s) 404B. In one example, the vehicle 402B is routed (or routes itself) in a safe and efficient manner to the electric grid(s) 404B, the charging station(s) 406B, or the other vehicle(s) 408B. Using one or more embodiments of the instant solution, the vehicle 402B can provide energy to one or more of the elements depicted herein in various advantageous ways as described and/or depicted herein. Further, the safety and efficiency of the vehicle may be increased, and the environment may be positively affected as described and/or depicted herein.

The term 'energy', 'electricity', 'power', and the like may be used to denote any form of energy received, stored, used, shared, and/or lost by the vehicles(s). The energy may be referred to in conjunction with a voltage source and/or a current supply of charge provided from an entity to the vehicle(s) during a charge/use operation. Energy may also be in the form of fossil fuels (for example, for use with a hybrid vehicle) or via alternative power sources, including but not limited to lithium-based, nickel-based, hydrogen fuel cells, atomic/nuclear energy, fusion-based energy sources, and energy generated on-the-fly during an energy sharing and/or usage operation for increasing or decreasing one or more vehicles energy levels at a given time.

In one example, the charging station 406B manages the amount of energy transferred from the vehicle 402B such that there is sufficient charge remaining in the vehicle 402B to arrive at a destination. In one example, a wireless connection is used to wirelessly direct an amount of energy transfer between vehicles 408B, wherein the vehicles may both be in motion. In one embodiment, wireless charging may occur via a fixed charger and batteries of the vehicle in alignment with one another (such as a charging mat in a garage or parking space). In one example, an idle vehicle, such as a vehicle 402B (which may be autonomous) is directed to provide an amount of energy to a charging station 406B and return to the original location (for example, its original location or a different destination). In one example, a mobile energy storage unit (not shown) is used to collect surplus energy from at least one other vehicle 408B and transfer the stored surplus energy at a charging station 406B. In one example, factors determine an amount of energy to transfer to a charging station 406B, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one example, the vehicle(s) 408B, the charging station(s) 406B and/or the electric grid(s) 404B can provide energy to the vehicle 402B.

In one embodiment, a location such as a building, a residence, or the like (not depicted), communicably coupled to one or more of the electric grid 404B, the vehicle 402B, and/or the charging station(s) 406B. The rate of electric flow to one or more of the location, the vehicle 402B, the other vehicle(s) 408B is modified, depending on external conditions, such as weather. For example, when the external temperature is extremely hot or extremely cold, raising the chance for an outage of electricity, the flow of electricity to a connected vehicle 402B/308B is slowed to help minimize the chance for an outage.

In one embodiment, vehicles 402B and 408B may be utilized as bidirectional vehicles. Bidirectional vehicles are those that may serve as mobile microgrids that can assist in the supplying of electrical power to the grid 404B and/or reduce the power consumption when the grid is stressed. Bidirectional vehicles incorporate bidirectional charging, which in addition to receiving a charge to the vehicle, the vehicle can take energy from the vehicle and "push" the energy back into the grid 404B, otherwise referred to as "V2G". In bidirectional charging, the electricity flows both ways; to the vehicle and from the vehicle. When a vehicle is charged, alternating current (AC) electricity from the grid 404B is converted to direct current (DC). This may be performed by one or more of the vehicle's own converter or a converter on the charger 406B. The energy stored in the vehicle's batteries may be sent in an opposite direction back to the grid. The energy is converted from DC to AC through a converter usually located in the charger 406B, otherwise referred to as a bidirectional charger. Further, the instant solution as described and depicted with respect to FIG. 3B can be utilized in this and other networks and/or systems.

Figure 4B:
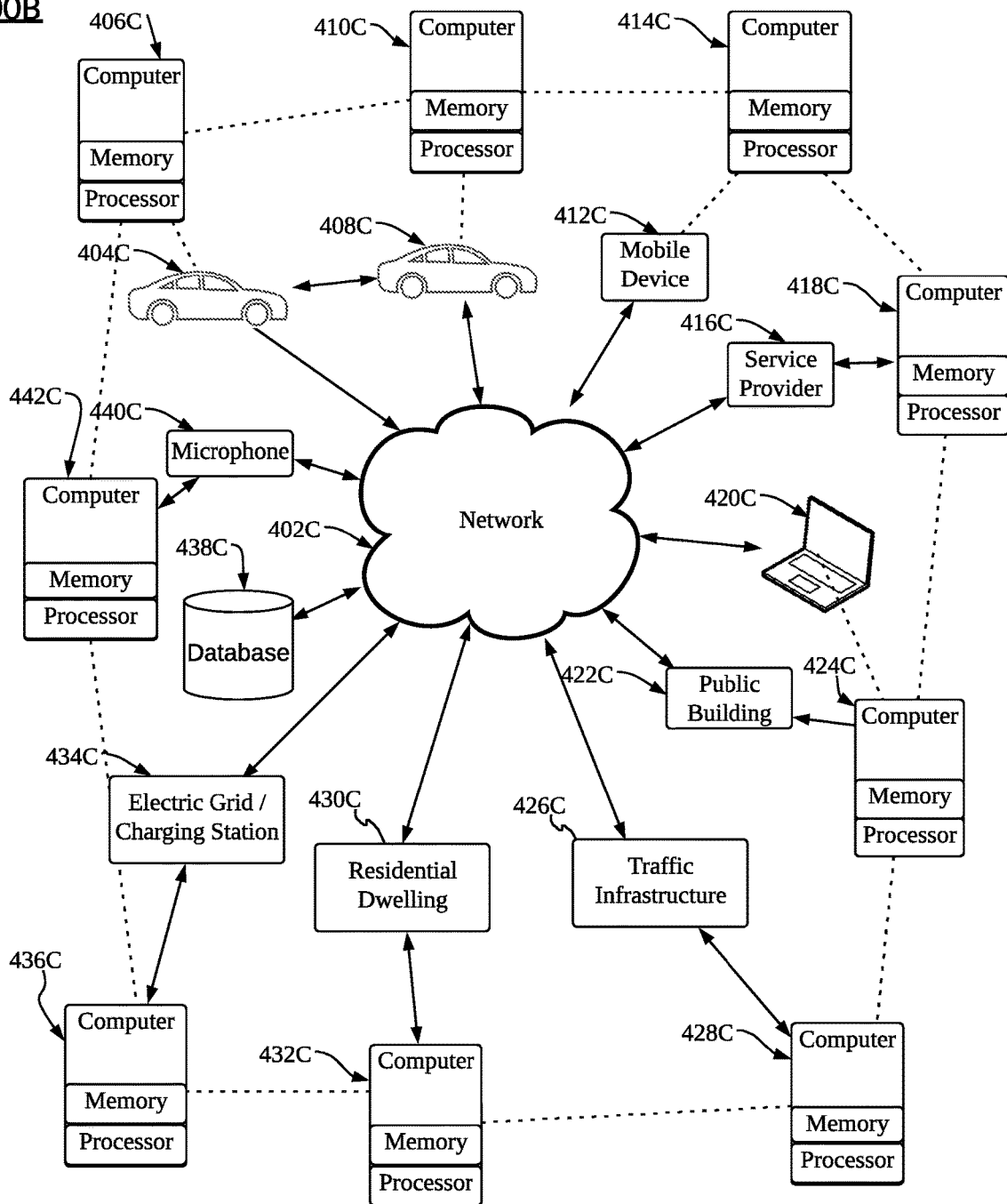
FIG. 4B illustrates a diagram depicting interconnections between different elements, according to example embodiments.

FIG. 4B is a diagram showing interconnections between different elements 400B. The instant solution may be stored and/or executed entirely or partially on and/or by one or more computing devices 414C, 418C, 424C, 428C, 432C, 436C, 406C, 442C, 440C and 410C associated with various entities, all communicably coupled and in communication with a network 402C. A database 440C is communicably coupled to the network and allows for the storage and retrieval of data. In one example, the database is an immutable ledger. One or more of the various entities may be a vehicle 404C, one or more service provider 416C, one or more public buildings 422C, one or more traffic infrastructure 426C, one or more residential dwellings 430C, an electric grid/charging station 434C, a microphone 440C, and/or another vehicle 408C. Other entities and/or devices, such as one or more private users using a smartphone 412C, a laptop 420C, an augmented reality (AR) device, a virtual reality (VR) device, and/or any wearable device may also interwork with the instant solution. The smartphone 412C, laptop 420C, the microphone 440C, and other devices may be connected to one or more of the connected computing devices 414C, 418C, 424C, 428C, 432C, 436C, 406C, 442C, 440C, and 410C. The one or more public buildings 422C may include various agencies. The one or more public buildings 422C may utilize a computing device 424C. The one or more service provider 416C may include a dealership, a tow truck service, a collision center or other repair shop. The one or more service provider 416C may utilize a computing apparatus 418C. These various computer devices may be directly and/or communicably coupled to one another, such as via wired networks, wireless networks, blockchain networks, and the like. The microphone 440C may be utilized as a virtual assistant, in one example. In one example, the one or more traffic infrastructure 426C may include one or more traffic signals, one or more sensors including one or more cameras, vehicle speed sensors or traffic sensors, and/or other traffic infrastructure. The one or more traffic infrastructure 426C may utilize a computing device 428C.

In one embodiment, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a vehicle 408C/404C can transport a person, an object, a permanently or temporarily affixed apparatus, and the like. In one example, the vehicle 408C may communicate with vehicle 404C via V2V communication through the computers associated with each vehicle 406C and 410C and may be referred to as a car, vehicle, automobile, and the like. The vehicle 404C/408C may be a self-propelled wheeled conveyance, such as a car, a sports utility vehicle, a truck, a bus, a van, or other motor or battery-driven or fuel cell-driven vehicle. For example, vehicle 404C/408C may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The vehicle 404C/408C may be semi-autonomous or autonomous. For example, vehicle 404C/408C may be self-maneuvering and navigate without human input. An autonomous vehicle may have and use one or more sensors and/or a navigation unit to drive autonomously. All of the data described or depicted herein can be stored, analyzed, processed and/or forwarded by one or more of the elements in FIG. 4B.

Figure 4C:
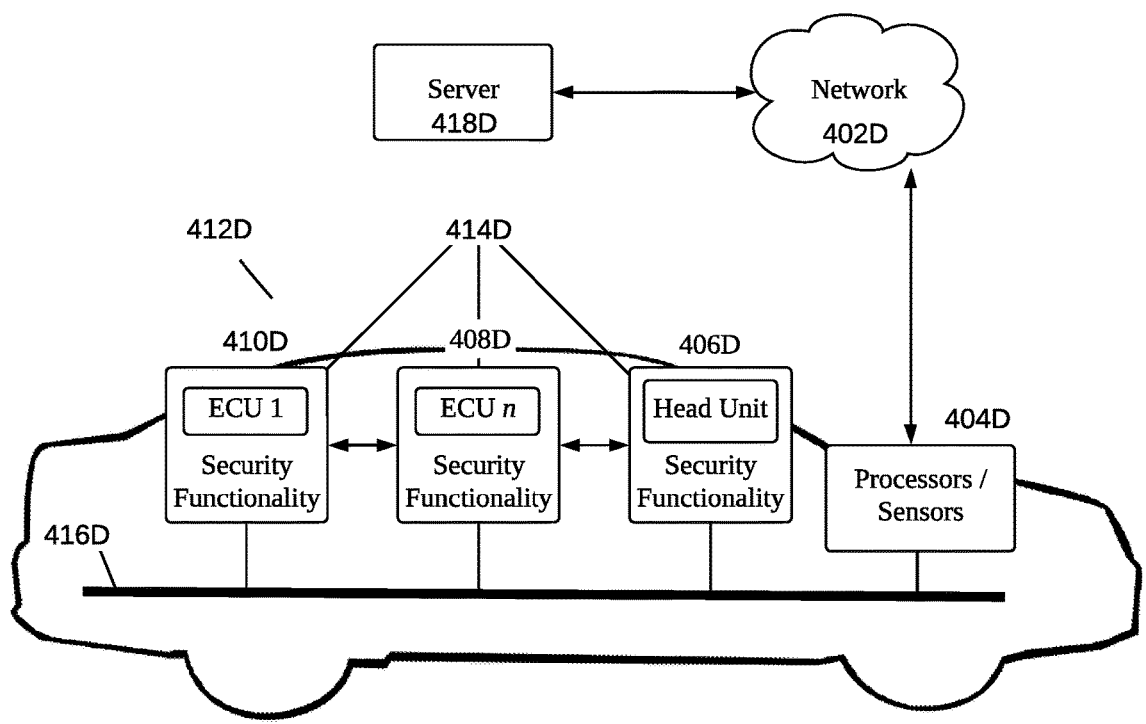
FIG. 4C illustrates a further diagram depicting interconnections between different elements, according to example embodiments.

FIG. 4C is another block diagram showing interconnections between different elements in one example 400C. A vehicle 412D is presented and includes ECUs 410D, 408D, and a Head Unit (otherwise known as an Infotainment System) 406D. An Electrical Control Unit (ECU) is an embedded system in automotive electronics controlling one or more of the electrical systems or subsystems in a vehicle. ECUs may include but are not limited to the management of a vehicle's engine, brake system, gearbox system, door locks, dashboard, airbag system, infotainment system, electronic differential, and active suspension. ECUs are connected to the vehicle's Controller Area Network (CAN) bus 416D. The ECUs may also communicate with a vehicle computer 404D via the CAN bus 416D. The vehicle's processors/sensors (such as the vehicle computer) 404D can communicate with external elements, such as a server 418D via a network 402D (such as the Internet). Each ECU 410D, 408D, and Head Unit 406D may contain its own security policy. The security policy defines permissible processes that can be executed in the proper context. In one example, the security policy may be partially or entirely provided in the vehicle computer 404D.

ECUs 410D, 408D, and Head Unit 406D may each include a custom security functionality element 414D defining authorized processes and contexts within which those processes are permitted to run. Context-based authorization to determine validity if a process can be executed allows ECUs to maintain secure operation and prevent unauthorized access from elements such as the vehicle's Controller Area Network (CAN Bus). When an ECU encounters a process that is unauthorized, that ECU can block the process from operating. Automotive ECUs can use different contexts to determine whether a process is operating within its permitted bounds, such as proximity contexts such as nearby objects, distance to approaching objects, speed, and trajectory relative to other moving objects, and operational contexts such as an indication of whether the vehicle is moving or parked, the vehicle's current speed, the transmission state, user-related contexts such as devices connected to the transport via wireless protocols, use of the infotainment, cruise control, parking assist, driving assist, location-based contexts, and/or other contexts.

Figure 4D:
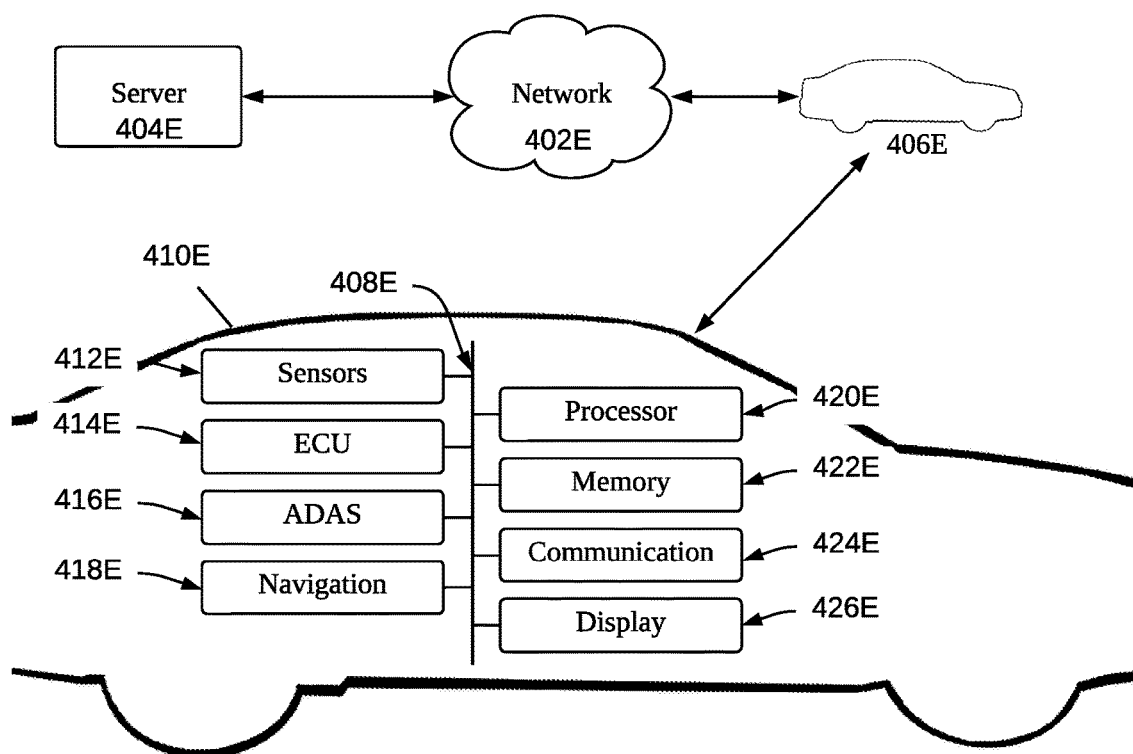
FIG. 4D illustrates yet a further diagram depicting interconnections between elements, according to example embodiments.

Referring to FIG. 4D, an operating environment 400D for a connected vehicle, is illustrated according to some embodiments. As depicted, the vehicle 410E includes a Controller Area Network (CAN) bus 408E connecting elements 412E-426E of the vehicle. Other elements may be connected to the CAN bus and are not depicted herein. The depicted elements connected to the CAN bus include a sensor set 412E, Electronic Control Units 414E, autonomous features or Advanced Driver Assistance Systems (ADAS) 416E, and the navigation system 418E. In some embodiments, the vehicle 410E includes a processor 420E, a memory 422E, a communication unit 424E, and an electronic display 426E.

The processor 420E includes an arithmetic logic unit, a microprocessor, a general-purpose controller, and/or a similar processor array to perform computations and provide electronic display signals to a display unit 426E. The processor 420E processes data signals and may include various computing architectures, including a complex instruction set computer (CISC) architecture, a reduced instruction set computer (RISC) architecture, or an architecture implementing a combination of instruction sets. The vehicle 410E may include one or more processors 420E. Other processors, operating systems, sensors, displays, and physical configurations that are communicably coupled to one another (not depicted) may be used with the instant solution.

Memory 422E is a non-transitory memory storing instructions or data that may be accessed and executed by the processor 420E. The instructions and/or data may include code to perform the techniques described herein. The memory 422E may be a dynamic random-access memory (DRAM) device, a static random-access memory (SRAM) device, flash memory, or another memory device. In some embodiments, the memory 422E also may include non-volatile memory or a similar permanent storage device and media, which may include a hard disk drive, a floppy disk drive, a CD-ROM device, a DVD-ROM device, a DVD-RAM device, a DVD-RW device, a flash memory device, or some other mass storage device for storing information on a permanent basis. A portion of the memory 422E may be reserved for use as a buffer or virtual random-access memory (virtual RAM). The vehicle 410E may include one or more memories 422E without deviating from the current solution.

The memory 422E of the vehicle 410E may store one or more of the following types of data: navigation route data 418E, and autonomous features data 416E. In some embodiments, the memory 422E stores data that may be necessary for the navigation application 418E to provide the functions.

The navigation system 418E may describe at least one navigation route including a start point and an endpoint. In some embodiments, the navigation system 418E of the vehicle 410E receives a request from a user for navigation routes wherein the request includes a starting point and an ending point. The navigation system 418E may query a real-time data server 404E (via a network 402E), such as a server that provides driving directions, for navigation route data corresponding to navigation routes, including the start point and the endpoint. The real-time data server 404E transmits the navigation route data to the vehicle 410E via a wireless network 402E, and the communication system 424E stores the navigation data 418E in the memory 422E of the vehicle 410E.

The ECU 414E controls the operation of many of the systems of the vehicle 410E, including the ADAS systems 416E. The ECU 414E may, responsive to instructions received from the navigation system 418E, deactivate any unsafe and/or unselected autonomous features for the duration of a journey controlled by the ADAS systems 416E. In this way, the navigation system 418E may control whether ADAS systems 416E are activated or enabled so that they may be activated for a given navigation route.

The sensor set 412E may include any sensors in the vehicle 410E generating sensor data. For example, the sensor set 412E may include short-range sensors and long-range sensors. In some embodiments, the sensor set 412E of the vehicle 410E may include one or more of the following vehicle sensors: a camera, a Lidar sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a GPS sensor, a mapping functionality, and any other type of automotive sensor. The navigation system 418E may store the sensor data in the memory 422E.

The communication unit 424E transmits and receives data to and from the network 420E or to another communication channel. In some embodiments, the communication unit 424E may include a DSRC transceiver, a DSRC receiver, and other hardware or software necessary to make the vehicle 410E a DSRC-equipped device.

The vehicle 410E may interact with other vehicles 406E via V2V technology. V2V communication includes sensing radar information corresponding to relative distances to external objects, receiving GPS information of the vehicles, setting areas as areas where the other vehicles 406E are located based on the sensed radar information, calculating probabilities that the GPS information of the object vehicles will be located at the set areas, and identifying vehicles and/or objects corresponding to the radar information and the GPS information of the object vehicles based on the calculated probabilities, in one example.

For a vehicle to be adequately secured, the vehicle must be protected from unauthorized physical access as well as unauthorized remote access (e.g., cyber-threats). To prevent unauthorized physical access, a vehicle is equipped with a secure access system such as a keyless entry in one example. Meanwhile, security protocols are added to a vehicle's computers and computer networks to facilitate secure remote communications to and from the vehicle in one example.

Electronic Control Units (ECUs) are nodes within a vehicle that control tasks such as activating the windshield wipers to tasks such as an anti-lock brake system. ECUs are often connected to one another through the vehicle's central network, which may be referred to as a controller area network (CAN). State-of-the-art features such as autonomous driving are strongly reliant on implementing new, complex ECUs such as advanced driver-assistance systems (ADAS), sensors, and the like. While these new technologies have helped improve the safety and driving experience of a vehicle, they have also increased the number of externally-communicating units inside of the vehicle, making them more vulnerable to attack. Below are some examples of protecting the vehicle from physical intrusion and remote intrusion.

In one embodiment, a CAN includes a CAN bus with a high and low terminal and a plurality of electronic control units (ECUs), which are connected to the CAN bus via wired connections. The CAN bus is designed to allow microcontrollers and devices to communicate with each other in an application without a host computer. The CAN bus implements a message-based protocol (i.e., ISO 11898 standards) that allows ECUs to send commands to one another at a root level. Meanwhile, the ECUs represent controllers for controlling electrical systems or subsystems within the vehicle. Examples of the electrical systems include power steering, anti-lock brakes, air-conditioning, tire pressure monitoring, cruise control, and many other features.

In this example, the ECU includes a transceiver and a microcontroller. The transceiver may be used to transmit and receive messages to and from the CAN bus. For example, the transceiver may convert the data from the microcontroller into a format of the CAN bus and also convert data from the CAN bus into a format for the microcontroller. Meanwhile, the microcontroller interprets the messages and also decide what messages to send using ECU software installed therein in one example.

To protect the CAN from cyber threats, various security protocols may be implemented. For example, sub-networks (e.g., sub-networks A and B, etc.) may be used to divide the CAN into smaller sub-CANs and limit an attacker's capabilities to access the vehicle remotely. In one embodiment, a firewall (or gateway, etc.) may be added to block messages from crossing the CAN bus across sub-networks. If an attacker gains access to one sub-network, the attacker will not have access to the entire network. To make sub-networks even more secure, the most critical ECUs are not placed on the same sub-network, in one example.

In addition to protecting a vehicle's internal network, vehicles may also be protected when communicating with external networks such as the Internet. One of the benefits of having a vehicle connection to a data source such as the Internet is that information from the vehicle can be sent through a network to remote locations for analysis. Examples of vehicle information include GPS, onboard diagnostics, tire pressure, and the like. These communication systems are often referred to as telematics because they involve the combination of telecommunications and informatics. Further, the instant solution as described and depicted can be utilized in this and other networks and/or systems, including those that are described and depicted herein.

Figure 4E:
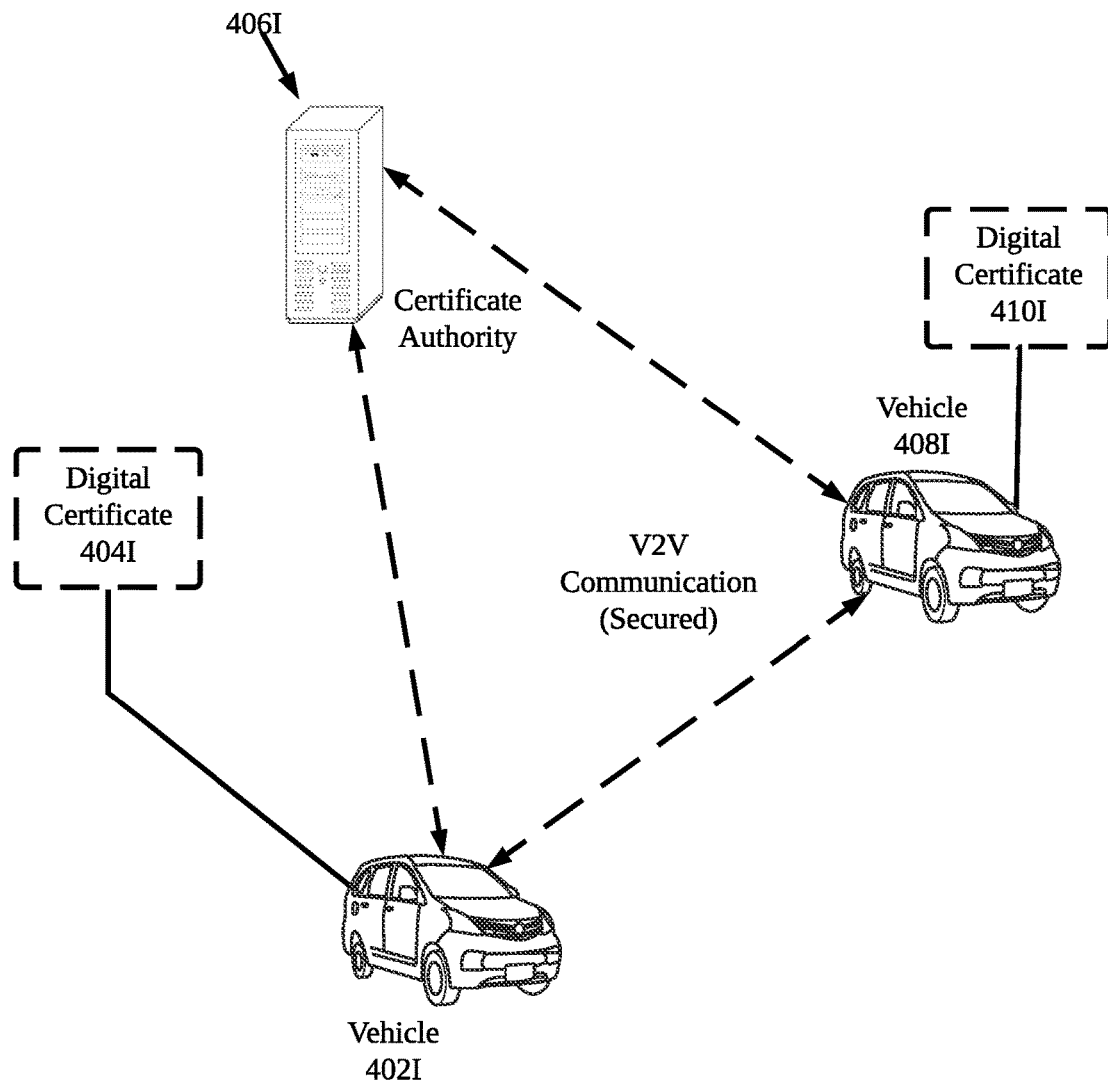
FIG. 4E illustrates yet a further diagram depicting an example of vehicles performing secured V2V communications using security certificates, according to example embodiments.

FIG. 4E illustrates an example 400E of vehicles 402I and 408I performing secured V2V communications using security certificates, according to example embodiments. Referring to FIG. 4E, the vehicles 402I and 408I may communicate via V2V communications over a short-range network, a cellular network, or the like. Before sending messages, the vehicles 402I and 408I may sign the messages using a respective public key certificate. For example, the vehicle 402I may sign a V2V message using a public key certificate 404I. Likewise, the vehicle 408I may sign a V2V message using a public key certificate 410I. The public key certificates 404I and 410I are associated with the vehicles 402I and 408I, respectively, in one example.

Upon receiving the communications from each other, the vehicles may verify the signatures with a certificate authority 406I or the like. For example, the vehicle 408I may verify with the certificate authority 406I that the public key certificate 404I used by vehicle 402I to sign a V2V communication is authentic. If the vehicle 408I successfully verifies the public key certificate 404I, the vehicle knows that the data is from a legitimate source. Likewise, the vehicle 402I may verify with the certificate authority 406I that the public key certificate 410I used by the vehicle 408I to sign a V2V communication is authentic. Further, the instant solution as described and depicted with respect to FIG. 4E can be utilized in this and other networks and/or systems including those that are described and depicted herein.

In some embodiments, a computer may include security processor. In particular, the security processor may perform authorization, authentication, cryptography (e.g., encryption), and the like, for data transmissions that are sent between ECUs and other devices on a CAN bus of a vehicle, and also data messages that are transmitted between different vehicles. The security processor may include an authorization module, an authentication module, and a cryptography module. The security processor may be implemented within the vehicle's computer and may communicate with other vehicle elements, for example, the ECUs/CAN network, wired and wireless devices such as wireless network interfaces, input ports, and the like. The security processor may ensure that data frames (e.g., CAN frames, etc.) that are transmitted internally within a vehicle (e.g., via the ECUs/CAN network) are secure. Likewise, the security processor can ensure that messages transmitted between different vehicles and devices attached or connected via a wire to the vehicle's computer are also secured.

For example, the authorization module may store passwords, usernames, PIN codes, biometric scans, and the like for different vehicle users. The authorization module may determine whether a user (or technician) has permission to access certain settings such as a vehicle's computer. In some embodiments, the authorization module may communicate with a network interface to download any necessary authorization information from an external server. When a user desires to make changes to the vehicle settings or modify technical details of the vehicle via a console or GUI within the vehicle or via an attached/connected device, the authorization module may require the user to verify themselves in some way before such settings are changed. For example, the authorization module may require a username, a password, a PIN code, a biometric scan, a predefined line drawing or gesture, and the like. In response, the authorization module may determine whether the user has the necessary permissions (access, etc.) being requested.

The authentication module may be used to authenticate internal communications between ECUs on the CAN network of the vehicle. As an example, the authentication module 308J may provide information for authenticating communications between the ECUS. As an example, the authentication module may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module may also provide a list of ECUs that are exempt (safe list) and that do not need to use the authentication bits. The authentication module may communicate with a remote server to retrieve updates to the bit signature algorithm and the like.

The encryption module may store asymmetric key pairs to be used by the vehicle to communicate with other external user devices and vehicles. For example, the encryption module may provide a private key to be used by the vehicle to encrypt/decrypt communications, while the corresponding public key may be provided to other user devices and vehicles to enable the other devices to decrypt/encrypt the communications. The encryption module may communicate with a remote server to receive new keys, updates to keys, keys of new vehicles, users, etc., and the like. The encryption module may also transmit any updates to a local private/public key pair to the remote server.

Figure 5A:
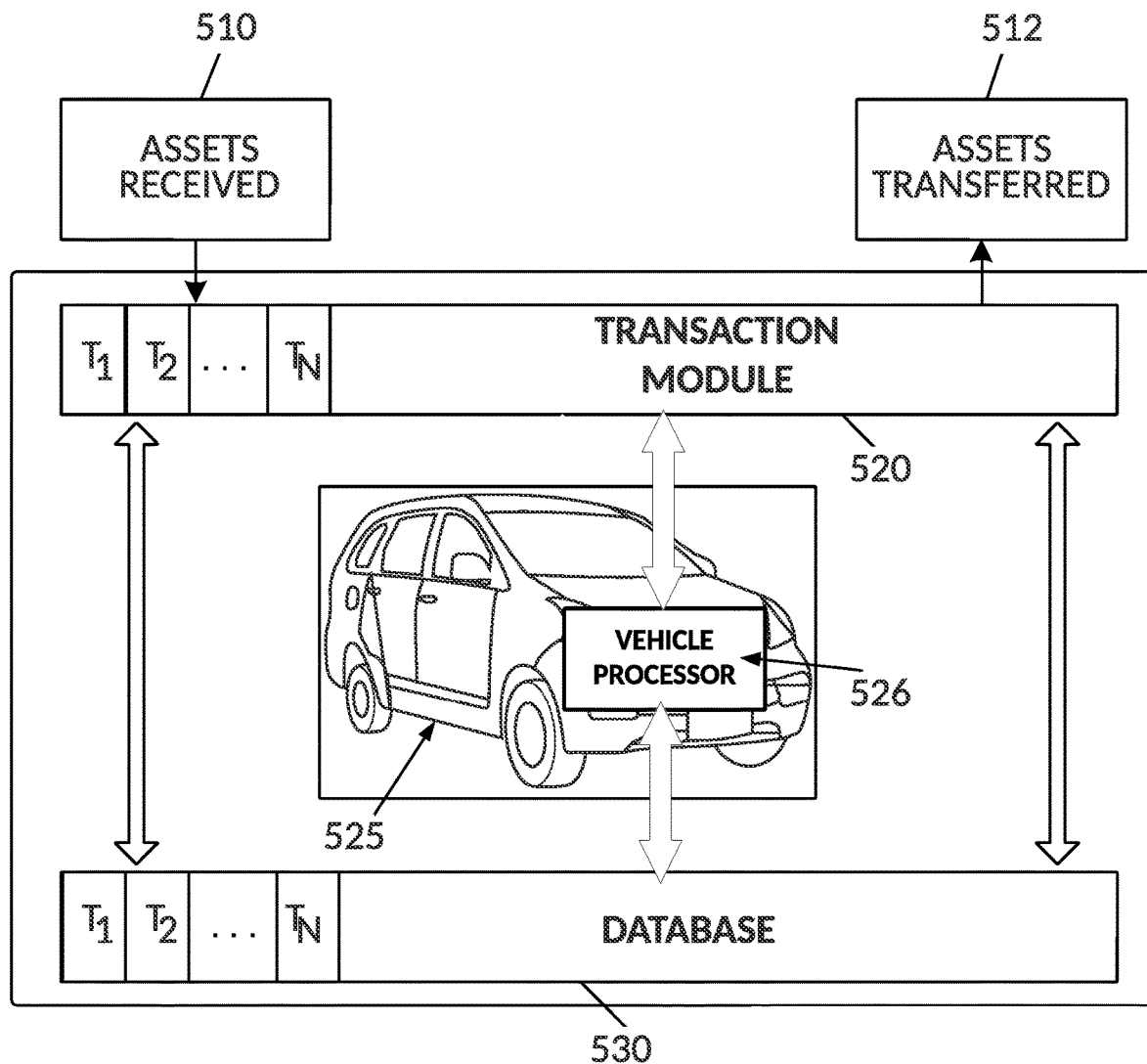
FIG. 5A illustrates an example vehicle configuration for managing database transactions associated with a vehicle, according to example embodiments.

FIG. 5A illustrates an example vehicle configuration 500A for managing database transactions associated with a vehicle, according to example embodiments. Referring to FIG. 5A, as a particular vehicle 525 is engaged in transactions (e.g., vehicle service, dealer transactions, delivery/pickup, transportation services, etc.), the vehicle may receive assets 510 and/or expel/transfer assets 512 according to a transaction(s). A vehicle processor 526 resides in the vehicle 525 and communication exists between the vehicle processor 526, a database 530, a vehicle processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the vehicle, may be off-board the vehicle, may be accessed directly and/or through a network, or be accessible to the vehicle.

In one embodiment, a vehicle may engage with another vehicle to perform various actions such as to share, transfer, acquire service calls, etc. when the vehicle has reached a status where the services need to be shared with another vehicle. For example, the vehicle may be due for a battery charge and/or may have an issue with a tire and may be in route to pick up a package for delivery. A vehicle processor resides in the vehicle and communication exists between the vehicle processor, a first database, and a transaction module. The vehicle may notify another vehicle, which is in its network and which operates on its blockchain member service. A vehicle processor resides in the another vehicle and communication exists between the vehicle processor, a second database, the vehicle processor and a transaction module. The another vehicle may then receive the information via a wireless communication request to perform the package pickup from the vehicle and/or from a server (not shown). The transactions are logged in the transaction modules and of both vehicles. The credits are transferred from vehicle to the another vehicle and the record of the transferred service is logged in the first and databases, assuming that the blockchains are different from one another, or are logged in the same blockchain used by all members. The first database can be one of a SQL database, an RDBMS, a relational database, a non-relational database, a blockchain, a distributed ledger, and may be on board the vehicle, may be off-board the vehicle, may be accessible directly and/or through a network.

Figure 5B:
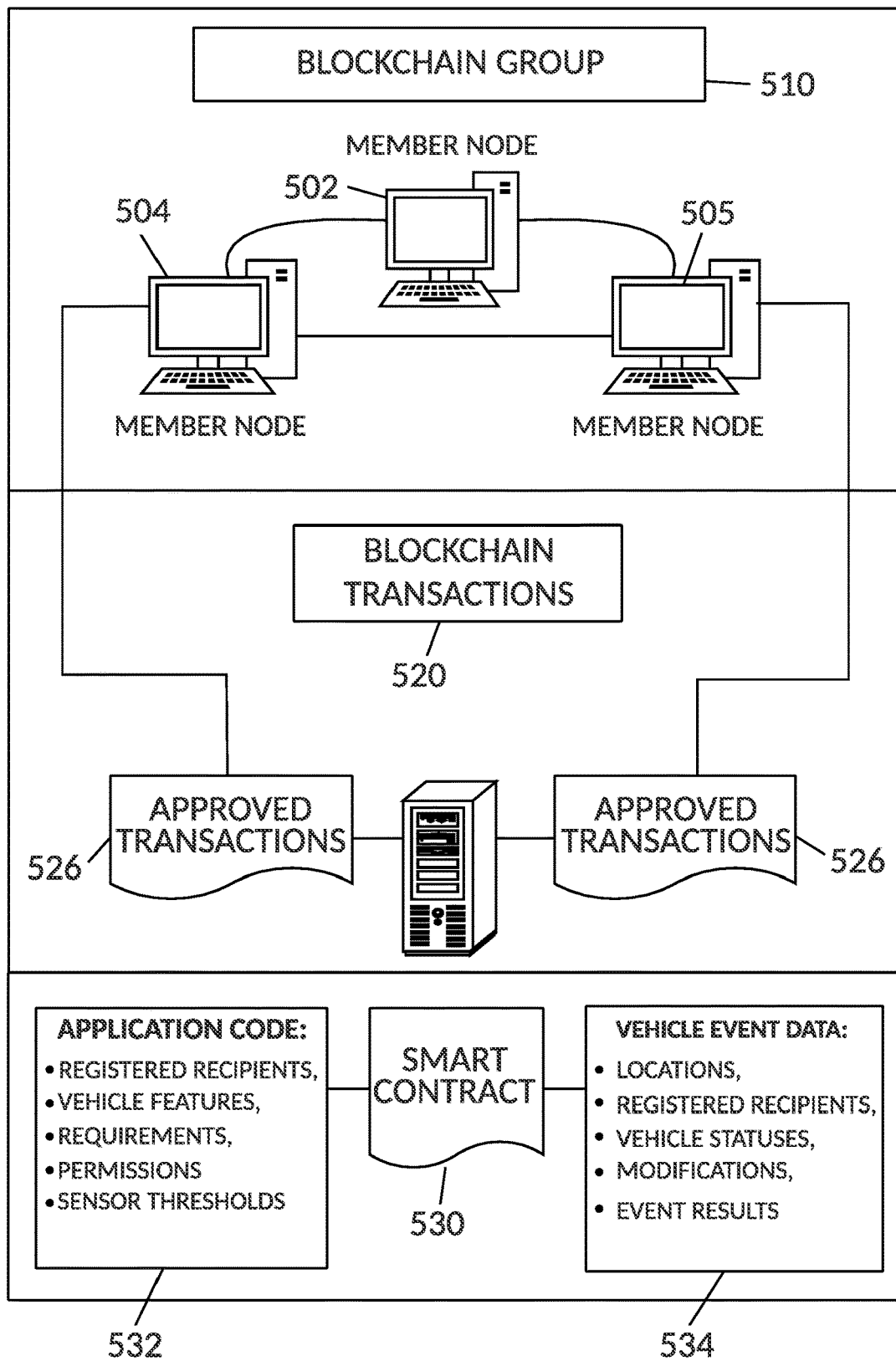
FIG. 5B illustrates an example blockchain group, according to example embodiments.

FIG. 5B illustrates a blockchain architecture configuration 500B, according to example embodiments. Referring to FIG. 5B, the blockchain architecture 500B may include certain blockchain elements, for example, a group of blockchain member nodes 502-506 as part of a blockchain group 510. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 520 are stored in memory of computers as the transactions are received and approved by the consensus model dictated by the members' nodes.

Approved transactions 526 are stored in current blocks of the blockchain and committed to the blockchain via a committal procedure, which includes performing a hash of the data contents of the transactions in a current block and referencing a previous hash of a previous block. Within the blockchain, one or more smart contracts 530 may exist that define the terms of transaction agreements and actions included in smart contract executable application code 532, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 534, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 530, which are then stored in a blockchain. For example, sensor thresholds stored in the smart contract can be used as the basis for whether a detected service is necessary and when and where the service should be performed.

In one embodiment, a blockchain logic example includes a blockchain application interface as an API or plug-in application that links to the computing device and execution platform for a particular transaction. The blockchain configuration may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code, which when executed causes the transaction terms and conditions to become active. The smart contract, when executed, causes certain approved transactions to be generated, which are then forwarded to the blockchain platform. The platform includes a security/authorization, computing devices, which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 5A and 5B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5C:
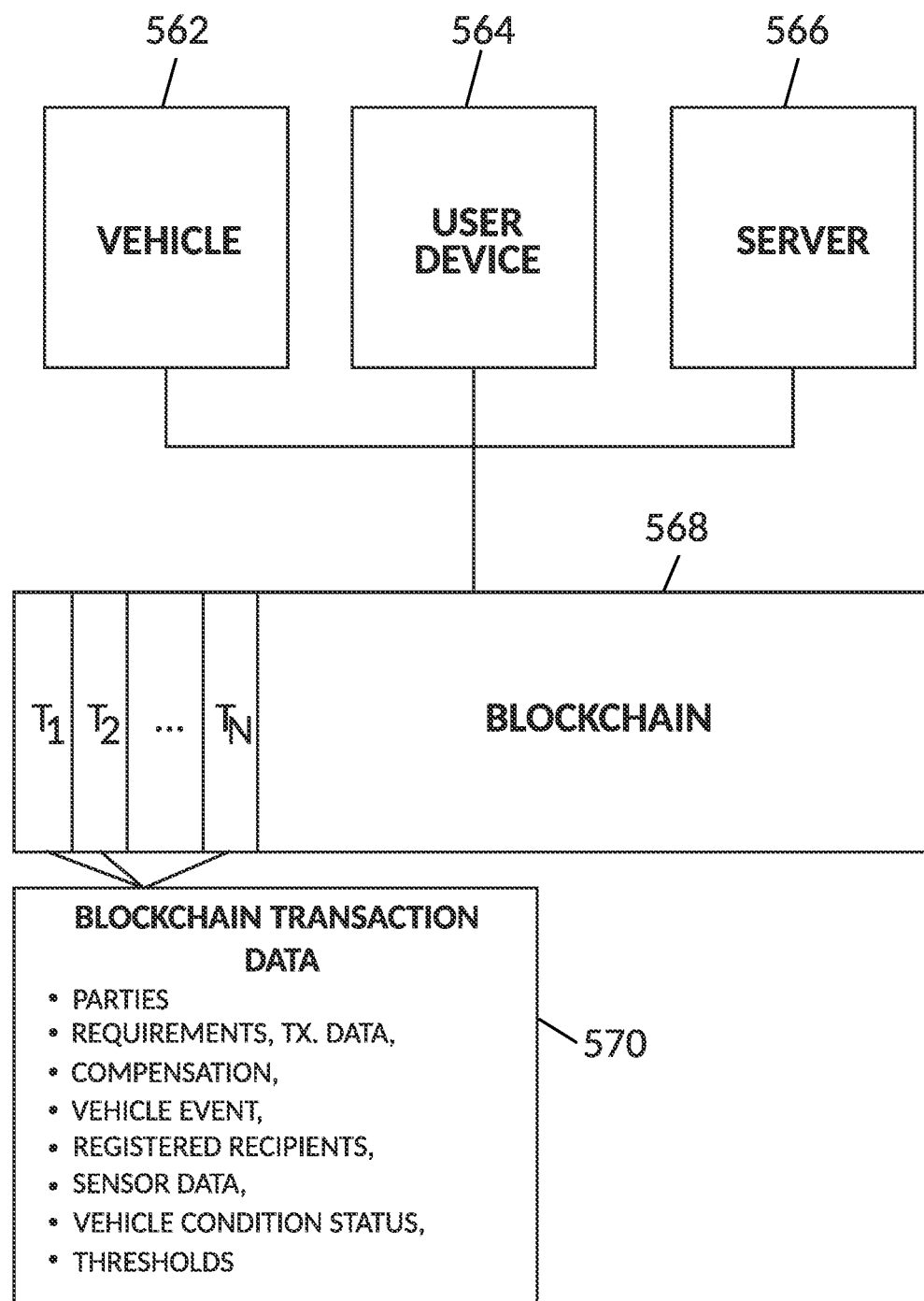
FIG. 5C illustrates an example interaction between elements and a blockchain, according to example embodiments.

FIG. 5C illustrates a blockchain configuration for storing blockchain transaction data, according to example embodiments. Referring to FIG. 5C, the example configuration 500C provides for the vehicle 562, the user device 564 and a server 566 sharing information with a distributed ledger (i.e., blockchain) 568. The server may represent a service provider entity inquiring with a vehicle service provider to share user profile rating information in the event that a known and established user profile is attempting to rent a vehicle with an established rated profile. The server 566 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 570 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 5D:
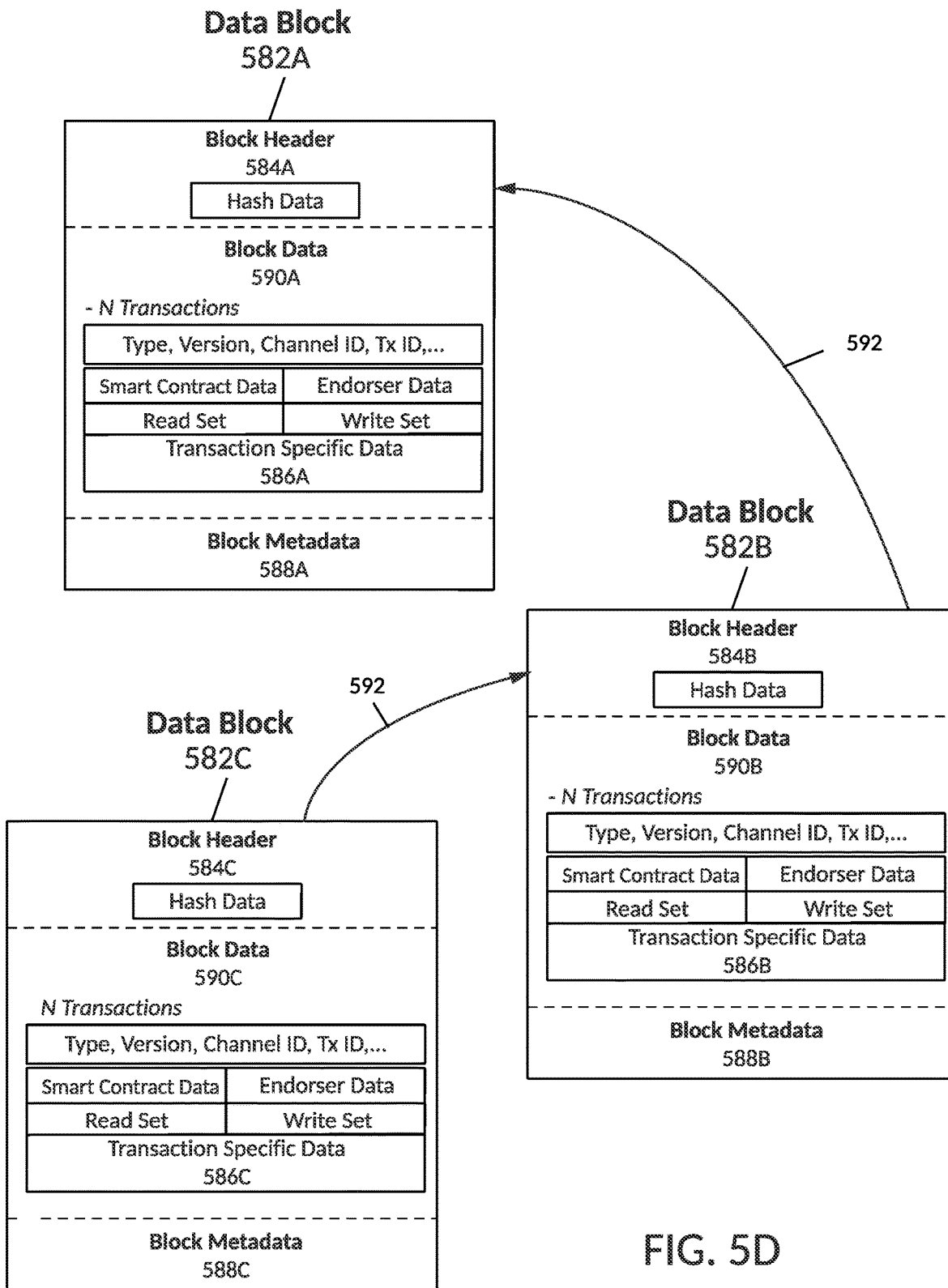
FIG. 5D illustrates an example data block interaction, according to example embodiments.

FIG. 5D illustrates blockchain blocks 580 that can be added to a distributed ledger, according to example embodiments, and contents of block structures 582A to 582n. Referring to FIG. 5D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 582A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 5D, a block 582A (also referred to as a data block) that is stored on the blockchain and/or the distributed ledger may include multiple data segments such as a block header 584A to 584n, transaction-specific data 586A to 586n, and block metadata 588A to 588n. It should be appreciated that the various depicted blocks and their contents, such as block 582A and its contents are merely for purposes of an example and are not meant to limit the scope of the example embodiments. In some cases, both the block header 584A and the block metadata 588A may be smaller than the transaction-specific data 586A, which stores entry data; however, this is not a requirement. The block 582A may store transactional information of N entries (e.g., 100, 500, 1000, 2000, 3000, etc.) within the block data 590A to 590n. The block 582A may also include a link to a previous block (e.g., on the blockchain) within the block header 584A. In particular, the block header 584A may include a hash of a previous block's header. The block header 584A may also include a unique block number, a hash of the block data 590A of the current block 582A, and the like. The block number of the block 582A may be unique and assigned in an incremental/sequential order starting from zero. The first block in the blockchain may be referred to as a genesis block, which includes information about the blockchain, its members, the data stored therein, etc.

The block data 590A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 590A may also store transaction-specific data 586A, which adds additional information to the hash-linked chain of blocks in the blockchain. Accordingly, the data 586A can be stored in an immutable log of blocks on the distributed ledger. Some of the benefits of storing such data 586A are reflected in the various embodiments disclosed and depicted herein. The block metadata 588A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 510A and a validation code identifying whether an entry was valid/invalid.

The other blocks 582B to 582n in the blockchain also have headers, files, and values. However, unlike the first block 582A, each of the headers 584A to 584n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 592, to establish an auditable and immutable chain-of-custody.

The above embodiments may be implemented in hardware, in a computer program executed by a processor, in firmware, or in a combination of the above. A computer program may be embodied on a computer readable media, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
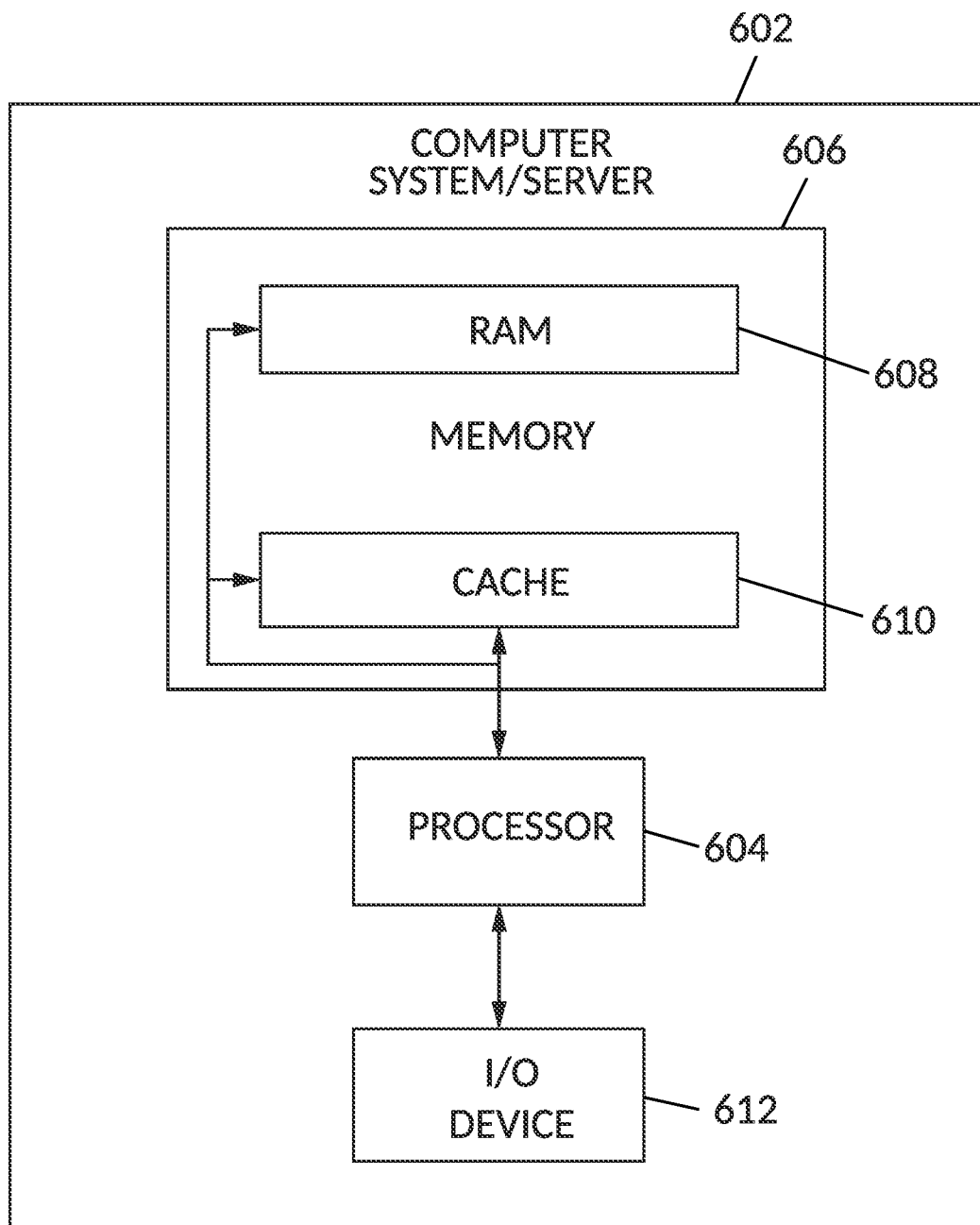
FIG. 6 illustrates an example system that supports one or more of the example embodiments.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 5E:
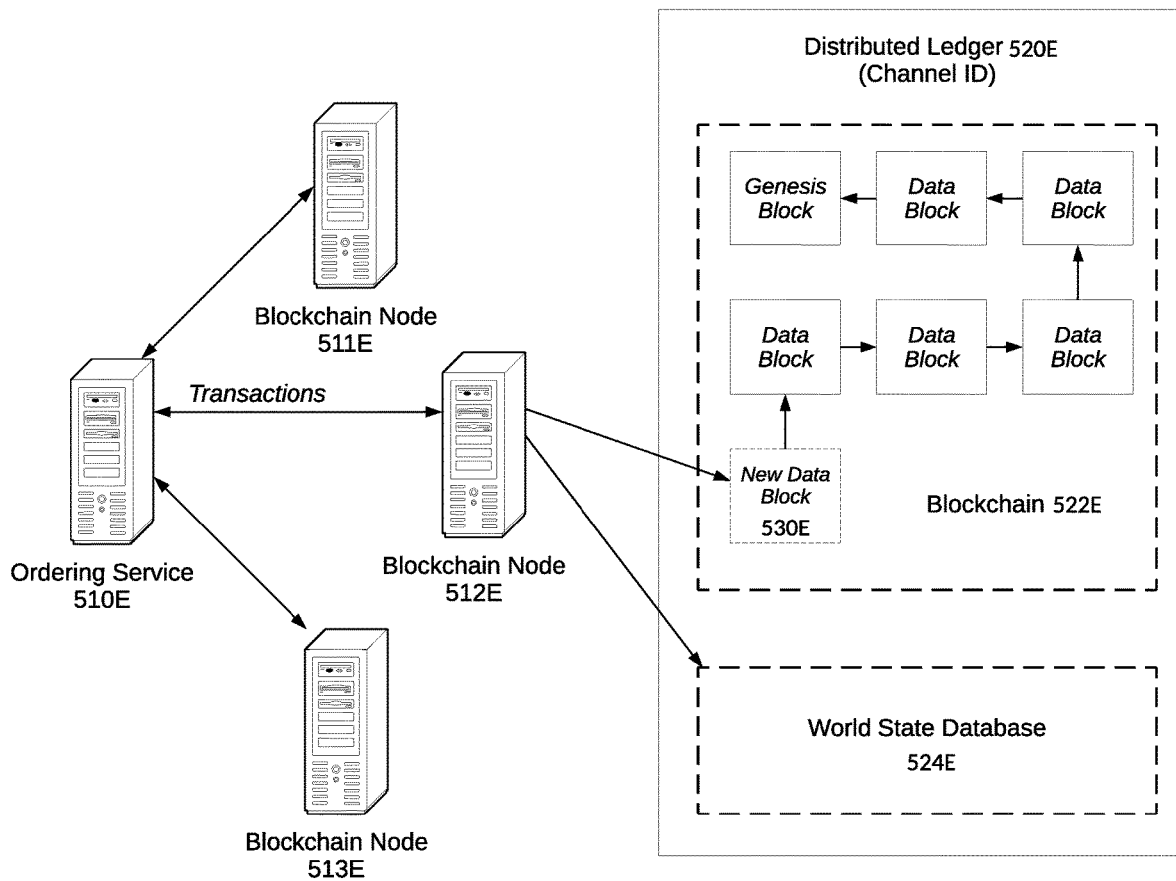
FIG. 5E illustrates a blockchain network diagram, according to example embodiments.

FIG. 5E illustrates a process 500E of a new block being added to a distributed ledger 520E, according to example embodiments, and FIG. 5B illustrates contents of a new data block structure 530E for blockchain, according to example embodiments. Referring to FIG. 5E, clients (not shown) may submit transactions to blockchain nodes 511E, 512E, and/or 513E. Clients may be instructions received from any source to enact activity on the blockchain 520E. As an example, clients may be applications that act on behalf of a requester, such as a device, person or entity to propose transactions for the blockchain. The plurality of blockchain peers (e.g., blockchain nodes 511E, 512E, and 513E) may maintain a state of the blockchain network and a copy of the distributed ledger 520E. Different types of blockchain nodes/peers may be present in the blockchain network including endorsing peers which simulate and endorse transactions proposed by clients and committing peers which verify endorsements, validate transactions, and commit transactions to the distributed ledger 520. In this example, the blockchain nodes 511E, 512E, and 513E may perform the role of endorser node, committer node, or both.

The distributed ledger 520E includes a blockchain which stores immutable, sequenced records in blocks, and a state database 524E (current world state) maintaining a current state of the blockchain 522E. One distributed ledger 520E may exist per channel and each peer maintains its own copy of the distributed ledger 520E for each channel of which they are a member. The blockchain 522E is a transaction log, structured as hash-linked blocks where each block contains a sequence of N transactions. The linking of the blocks (shown by arrows in FIG. 5E) may be generated by adding a hash of a prior block's header within a block header of a current block. In this way, all transactions on the blockchain 522E are sequenced and cryptographically linked together preventing tampering with blockchain data without breaking the hash links. Furthermore, because of the links, the latest block in the blockchain 522E represents every transaction that has come before it. The blockchain 522E may be stored on a peer file system (local or attached storage), which supports an append-only blockchain workload.

The current state of the blockchain 522E and the distributed ledger 522E may be stored in the state database 524E. Here, the current state data represents the latest values for all keys ever included in the chain transaction log of the blockchain 522E. Chaincode invocations execute transactions against the current state in the state database 524E. To make these chaincode interactions extremely efficient, the latest values of all keys are stored in the state database 524E. The state database 524E may include an indexed view into the transaction log of the blockchain 522E, it can therefore be regenerated from the chain at any time. The state database 524E may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 510E.

The ordering service 510E accepts endorsed transactions, orders them into a block, and delivers the blocks to the committing peers. For example, the ordering service 510E may initiate a new block when a threshold of transactions has been reached, a timer times out, or another condition. In the example of FIG. 5E, blockchain node 512E is a committing peer that has received a new data new data block 530E for storage on blockchain 520E. The first block in the blockchain may be referred to as a genesis block which includes information about the blockchain, its members, the data stored therein, etc.

The ordering service 510E may be made up of a cluster of orderers. The ordering service 510E does not process transactions, smart contracts, or maintain the shared ledger. Rather, the ordering service 510E may accept the endorsed transactions and specifies the order in which those transactions are committed to the distributed ledger 520E. The architecture of the blockchain network may be designed such that the specific implementation of 'ordering' (e.g., Solo, Kafka, BFT, etc.) becomes a pluggable component.

Transactions are written to the distributed ledger 520E in a consistent order. The order of transactions is established to ensure that the updates to the state database 524E are valid when they are committed to the network. Unlike a cryptocurrency blockchain system (e.g., Bitcoin, etc.) where ordering occurs through the solving of a cryptographic puzzle, or mining, in this example the parties of the distributed ledger 520E may choose the ordering mechanism that best suits that network.

When the ordering service 510E initializes a new data block 530E, the new data block 530E may be broadcast to committing peers (e.g., blockchain nodes 511E, 512E, and 513E). In response, each committing peer validates the transaction within the new data block 530E by checking to make sure that the read set and the write set still match the current world state in the state database 524E. Specifically, the committing peer can determine whether the read data that existed when the endorsers simulated the transaction is identical to the current world state in the state database 524E. When the committing peer validates the transaction, the transaction is written to the blockchain 522E on the distributed ledger 520E, and the state database 524E is updated with the write data from the read-write set. If a transaction fails, that is, if the committing peer finds that the read-write set does not match the current world state in the state database 524E, the transaction ordered into a block will still be included in that block, but it will be marked as invalid, and the state database 524E will not be updated.

Figure 5F:
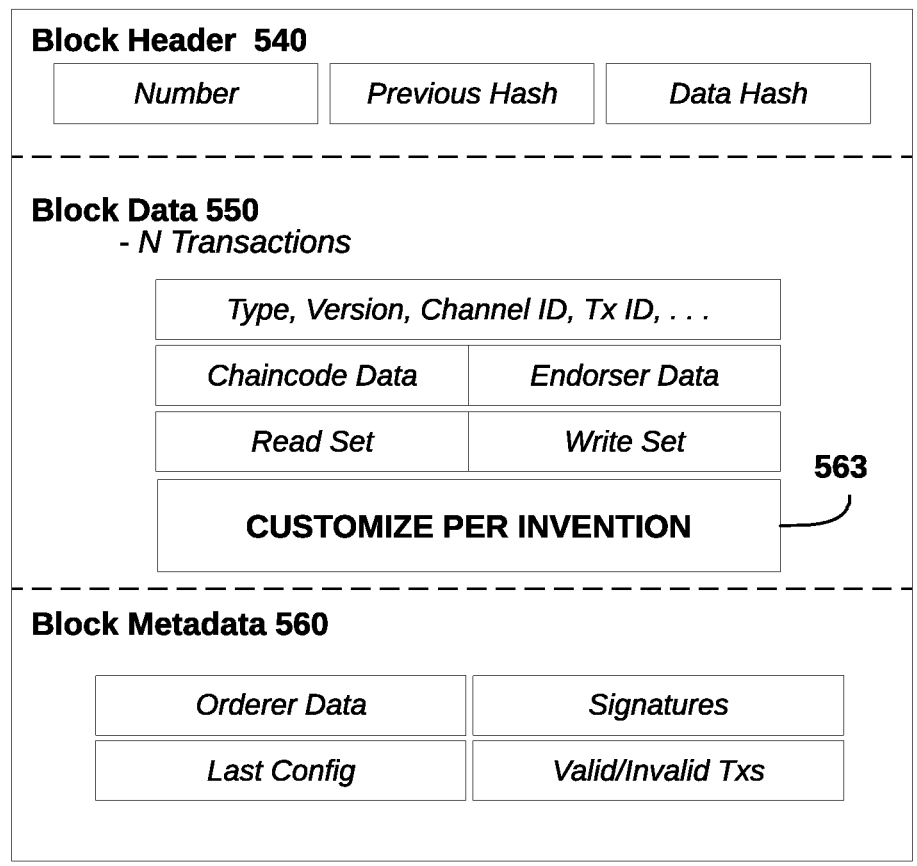
FIG. 5F illustrates an example new data block, according to example embodiments.

Referring to FIG. 5F 500F, a new data block 530 (also referred to as a data block) that is stored on the blockchain 522E of the distributed ledger 520E may include multiple data segments such as a block header 540, block data 550, and block metadata 560. It should be appreciated that the various depicted blocks and their contents, such as new data block 530 and its contents. shown in FIG. 5F are merely examples and are not meant to limit the scope of the example embodiments. The new data block 530 may store transactional information of N transaction(s) (e.g., 1, 10, 100, 500, 1000, 2000, 3000, etc.) within the block data 550. The new data block 530 may also include a link to a previous block (e.g., on the blockchain 522E in FIG. 5E) within the block header 540. In particular, the block header 540 may include a hash of a previous block's header. The block header 540 may also include a unique block number, a hash of the block data 550 of the new data block 530, and the like. The block number of the new data block 530 may be unique and assigned in various orders, such as an incremental/sequential order starting from zero.

The block data 550 may store transactional information of each transaction that is recorded within the new data block 530. For example, the transaction data may include one or more of a type of the transaction, a version, a timestamp, a channel ID of the distributed ledger 520E, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

Although in FIG. 5F the blockchain data 563 is depicted in the block data 550 but could also be located in the block header 540 or the block metadata 560.

The block metadata 560 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 510E. Meanwhile, a committer of the block (such as blockchain node 512E) may add validity/invalidity information based on an endorsement policy, verification of read/write sets, and the like. The transaction filter may include a byte array of a size equal to the number of transactions in the block data 500D and a validation code identifying whether a transaction was valid/invalid.

In one embodiment, the application has a level of intelligence to ascertain what degree of validation should be performed. Before fact-checking, the application gauges the potential implications of the response based on a priority matrix or algorithm. Recognizing that certain categories are more important to be accurate, for example, such as responses that involve health and safety implications, the application determines validation is necessary and then consults relevant knowledgebases.

In one embodiment, upon evaluating the seriousness and potential consequences of the response, the application might decide it is less critical to validate due to the exaggerated nature of the response. For example, celebrity gossip has no immediate safety implications, so the application considers it a lower priority to validate the response, whereas emergency or evacuation procedures are very critical and require validation.

In these embodiments, the solution does not passively accept and fact-check every response. Instead, it actively evaluates the nature, gravity, and potential ramifications of the response before deciding on the necessity or depth of validation. This adds an intelligence layer, allowing the system to prioritize critical validations over less significant or obviously exaggerated statements. Given the seriousness of operating a vehicle, validation is paramount. It is not just about the validity of the response but also about the real-world consequences to which the false response might lead. An unvalidated statement might alter how a driver approaches a situation, so the instant solution must prioritize validation to ensure safe and informed driving. The solution first gauges the importance, relevance, and implications of the response to be validated. Depending on these criteria, it decides the depth of validation.

In one embodiment, the application's response is validated to a level of accuracy. The number of knowledgebases and reputable sources to be consulted can be dynamic and can be based on how repeatable the retrieved information is when compared to the predetermined accuracy threshold. If the instant solution does not reach the desired confidence level after a set number of validation attempts, the response should clearly inform the driver of the level of accuracy of the response.

In one embodiment, the solution also employs a layered approach to validation, escalating from generic to specialized knowledgebases based on a confidence level of the retrieved information. If a predetermined accuracy threshold is not met after querying specialized knowledgebases, the response to the driver should include a cautionary warning about potential ambiguity.

In one embodiment, to validate routing directions through heavy traffic, the application retrieves location data from the vehicle's global positioning system (GPS) and queries known or public event schedules, such as a nearby sports stadium or a concert venue, to verify the traffic conditions and routing directions for the vicinity.

In one embodiment, the application validates driving directions against its in-vehicle mapping system and utilizes the vehicle's GPS and navigation data to quickly check the information.

In one embodiment, the application compares its location data with a real-time traffic monitoring system to validate the routing directions.

In one embodiment, the application uses vehicle-to-vehicle (V2V) communication to validate traffic conditions and driving directions.

In one embodiment, the application might produce interesting data and facts about the location the vehicle is driving. Given the vehicle's onboard GPS and sensors to detect the current geographical location, the application validates its response containing interesting data about the vicinity by checking against knowledgebases related to global historical sites, landmarks, wildlife habitats, biographical facts, and other knowledgebases.

In one embodiment, the application might produce a statement about the location that seems credible, but upon validation, it is identified as a "hallucination" by the application. These hallucinations could stem from flawed data training, misinformation, or machine misinterpretations. By ensuring the responses are validated, any misinformation can be avoided, ensuring that the driver receives accurate and factual details.

In one embodiment, the application's response might be based on creations that are imagined in nature, where there is no standard fact-based knowledgebase that exists to confirm the response's validity. Instead, the application might cross-reference local cultural folklore, legends, or similar databases, and if it finds no mention, it might provide a disclaimer about the response being offered. These types of responses, along with "hallucinations," underscore the challenge of fact-checking when no direct knowledgebases exist. The application, in these cases, relies on proximate or related knowledge bases, like local folklore, myths, or cultural stories. The priority is to ensure that the driver is informed that the response cannot be validated fully.

In one embodiment, the application's response might contain falsehoods and fake news. Given that news reporting should be factual, the importance of producing responses based on verified factual statements requires the application to validate its responses against mainstream, verified news sources in real-time, against the most up-to-date information possible, as current events are always dynamic. If it cannot be validated against reputable channels, respected news outlets, real-time economic and trade databases, health and safety databases, regulatory advisories, etc., then the response should inform the driver that it could not be validated fully.

In one embodiment, the instant solution is constantly analyzing for unsafe conditions before the occupant assist application initiates any conversation with the driver. The instant solution uses the vehicle's internal and external sensors, monitoring applications, and other relevant detection capabilities. If any unsafe driving condition is detected, the occupant assist application refrains from initiating a conversation with the driver, understanding that these unsafe driving conditions demand the driver's full attention. Only when the solution determines that the conditions are favorable and safe will the occupant assist the application and proceed with engaging the driver in conversation.

In one embodiment, before the instant solution detects an unsafe driving condition and engages the driving assist application, the solution may use vehicle-to-vehicle (V2V) communication capabilities equipped in the vehicle and in nearby vehicles for detection of unsafe driving conditions. When the unsafe condition is detected, the V2V capabilities of the surrounding vehicles may be utilized with the driving assist application in making collaborative decisions with nearby vehicles to ensure the safety of all vehicles and occupants involved during the unsafe driving condition. For example, if two vehicles are on a collision course at an intersection, their driving assist applications, in conjunction with their V2V communication, can quickly negotiate which vehicle should slow down or stop to prevent an accident, taking into consideration the overall traffic flow and pedestrian safety.

In one embodiment, the instant solution includes monitoring of the driver's biometric data to assess their stress or attention levels, concurrently tracking the driver's heart rate, eye movement, or other physiological markers using embedded sensors in the vehicle. If the solution detects that the driver's stress level is rising, indicating potential recognition of an unsafe condition even before the vehicle's monitoring application detects it, the occupant assist application preemptively pauses its conversation with the driver. In another embodiment, as a secondary measure, when the vehicle's monitoring application determines an unsafe condition, the instant solution assists the driver by using the driving assist application and providing soothing auditory cues or seat vibrations to calm the driver. Once the unsafe driving condition stabilizes and the driver's biometrics return to a baseline, the occupant assist application re-engages in the conversation with the driver. In another embodiment, the vehicle's monitoring application determines that the unsafe driving condition involves the driver experiencing a medical emergency, losing alertness, or having a record of risky or delayed driving maneuvers, so the instant solution engages the driving assist application with autonomous driving capabilities, if available, to navigate the vehicle to a safe location.

In one embodiment, beyond recognizing that a conversation is taking place, the solution discerns the nature and gravity of the ongoing conversation inside the vehicle. For instance, if the vehicle's interior microphones pick up an argument or an emotional conversation, the occupant assist application refrains from initiating a conversation because it detects an unsafe condition exists and the driver is distracted. Only when the interior ambiance is relaxed and conducive to casual conversation will the occupant assist the application and initiate a conversation with the driver.

In one embodiment, using a multi-sensory approach, the instant solution, while recognizing the occupant assist application's operation, uses an augmented reality (AR) heads-up display (HUD) for the driver to visualize certain parts of the conversation with the occupant assist application, such as important reminders or schedules. If the solution anticipates an unsafe driving condition, the visual aspect of the conversation fades out, leaving only necessary driving visuals on the HUD. Concurrently, the audio of the conversation is muted and replaced with an application that communicates the necessary driving instructions or warnings. Additionally, the solution might engage an application that might vibrate the driver's seat or alter the seat configuration (such as returning the seat to a fully upright position) to alert the driver further. Once the unsafe situation has passed, the AR visuals and audio of the previous conversation gradually return, allowing the driver to resume the conversation.

In one embodiment, the solution is constantly monitoring for voice cues from the driver. If the solution detects the driver vocalizing a clear and firm command, such as "I've got this!" or "Let me handle it!", the solution may prioritize the driver's decision to take control, understanding that the driver is alert and ready to act while having the driving assist application in a standby mode and ready to be engaged. However, in the absence of a vocal cue, or if the driver vocalizes a vocal cue such as "Help!" or "Assist!", the solution will quickly activate the driving assist application.

In one embodiment, the instant solution can be considered a hybrid of navigation and safety protocols, integrating the occupant assist application with real-time traffic data and the vehicle's navigation system. While the driver is engaged in a conversation with the occupant assist application, the solution constantly reviews the upcoming traffic conditions using the vehicle's navigation system. If the solution determines that a traffic jam, sharp turn, or construction zone is imminent, it anticipates this as an unsafe driving condition. Before the vehicle reaches such zones, the occupant assist application proactively ceases the conversation with the driver and activates a driving assist application that may communicate specialized instructions or reminders to ensure safety during that specific stretch of road. Once the driver has safely navigated the challenging zone, the occupant assist application is able to re-engage the driver in conversation.

In one embodiment, the instant solution anticipates the upcoming route to determine when the occupant assist application can initiate a conversation with the driver and when to refrain from conversation. The solution checks the route for sections that might be challenging, such as a mountain pass, a series of tight turns, or an area that is accident-prone, ensuring the occupant assist application does not distract the driver by initiating a conversation immediately prior to and during these unsafe driving sections that were identified.

In one embodiment, when the instant solution detects an unsafe driving condition and engages the driving assist application, the solution may use an ethical decision matrix with the driving assist application, which integrates with the collision avoidance system of the vehicle. The driving assist application performs actions based on the ethical decision matrix to choose the action that best prioritizes safety and minimizes overall harm when faced with multiple outcomes while navigating an unsafe driving situation. The decision matrix includes ethical parameters that have been predefined, and its decisions are refined by continuous machine learning.

In the following embodiments, the instant solution leverages real-time data from the vehicle and the user's device, combined with the user's profile, to offer personalized, dynamic, and location-based services to enhance the user's experience across their integrated devices. The multi-tiered subscription model ensures that users can choose a service level that matches their needs and device capabilities.

In one embodiment, the instant solution offers a personalized entertainment concierge service to a vehicle occupant based on the occupant's preferences or based on observations about the occupant over a period of time. The in-car entertainment concierge service delivers curated content, such as the occupant's favorite music genres, podcasts, and streaming platforms, to the vehicle's integrated device while the occupant is in transit. When the occupant exits the vehicle, the curated content transitions seamlessly from the vehicle to their personal device, and the entertainment concierge service dynamically adapts to the user's location to deliver an enhanced experience. For example, if the solution detects the user has arrived at home, the entertainment concierge service can synchronize with the user's smart home entertainment system, resuming the media content or suggesting additional content suitable for the at-home entertainment equipment. Or if the device's GPS detects the user is walking to a cafe or a park, the entertainment concierge service switches to an audiobook or ambient music suitable for the activity. The instant solution adapts to the user's dynamic situations and continues to cater the user's experience, which may also involve suggesting an upgraded service tier for broader content, exclusive offers, higher resolution media, integration with more home devices, or offline availability of their curated content.

In one embodiment, the instant solution offers an in-car holographic concert experience based on the occupant's music and streaming preferences. The service leverages the vehicle's advanced multimedia equipment to project a miniature holographic concert onto the dashboard or other suitable area within the vehicle. This creates an intimate concert experience with the occupant's favorite artists, allowing for user interaction with the hologram and the ability to adjust viewing angles or "request encores". In addition, the surround sound speakers with acoustic optimization create an immersive listening experience tailored for the interior of the vehicle. The solution might offer subscription tiers, such as a basic level with holographic visuals of older concerts, a mid-tier providing live-streamed concerts in holographic format, and a premium tier granting access to exclusive in-car concert events where artists perform specifically for the platform's subscribers. Additional device integrations could allow users to synchronize wearable devices or augmented reality (AR) glasses for another level of enhanced experience.

In one embodiment, the instant solution offers a virtual drive-in movie theater service to a vehicle occupant based on their profile and interest in movies. When the car is parked at certain locations, such as a hilltop or near a scenic overlook, the service curates a list of movie options suited for the location. The virtual drive-in movie theater service converts the vehicle into a personal theater, using the vehicle's surround sound speakers and high-resolution display on the windshield for the drive-in movie theater experience. The experience is further enhanced with ambient lighting within the vehicle. Subscription levels determine the movie selection range, with basic tiers having older movies or limited genres and premium tiers offering the latest releases, director's cuts, or movie exclusives. The service could even suggest drive-in events based on the occupant's location, as well as integrate with snack delivery services.

In one embodiment, the instant solution offers an augmented reality driving experience service to a vehicle occupant, tailored to the occupant's interests and compatible with the occupant's AR-enabled device or vehicle. The AR driving experience service was identified based on the vehicle occupant's device and profile, and the service provides an AR overlay that can be applied within the AR-enabled vehicle to showcase nearby sites and attractions in real time as the vehicle is being driven. The subscription level could adjust based on the AR-enabled vehicle or device capabilities and location, allowing the vehicle occupant to experience higher resolutions and additional features. In another embodiment, if the vehicle occupant exits the vehicle and takes their AR-enabled device to the site or attraction, the solution could transition from an AR driving overlay to an AR walking tour. As the device moves to different sites or as the user's interests change, the instant solution can suggest different subscription tiers or content packages.

In one embodiment, the instant solution offers a virtual reality (VR) entertainment experience enabled by quantum computing technology, which would be able to support instantaneous data transfer for global real-time collaboration and interaction. Advancements in quantum computing will bring VR experiences within reach for early adopters. The service would be able to offer global VR concerts, collaborative VR adventures, or the ability to attend international seminars without having to travel. Subscription levels might include varying tiers of access and quality. A basic level offers access to standard VR worlds and events; the mid-tier provides higher-resolution, more immersive experiences and early event access; premium levels might provide exclusive events, celebrity interactions, or even educational modules from top global institutions.

In one embodiment, the instant solution uses an application to deliver the suggested actions via a holographic or virtual avatar. The application would use in-car projectors and/or augmented reality (AR) technology to project a hologram or avatar of a coach seated in the passenger seat or on the dashboard. The in-car surround sound speakers would deliver the suggested actions, as well as simulate the voice coming from the relative position of the hologram or avatar. For example, if the driver surpasses an aggression threshold, the coach suggests a first action by demonstrating, in real-time holographic imagery, safer driving techniques or explaining the potential risks of the current driving behavior. If the aggression continues, the coach initiates a second action to deter such behavior further. Consistent good driving could result in the hologram or avatar offering praises and encouragement, as well as offering personality upgrades and customizations that can be applied to the hologram. These upgrades and customizations encourage the driver to improve their driving behavior so that they can further personalize their coach.

In one embodiment, the instant solution uses a windshield-mounted augmented reality display system in the vehicle to overlay real-time information and corrections on the driver's view of the road. If the vehicle's sensors detect the car is traveling too close to the car in front of it, exceeding a safe distance threshold, the AR system can project the ideal following distance on the windshield. For a second corrective action, if the behavior continues, the system might overlay a simulation of potential collision outcomes or stopping distances given the vehicle's current speeds. For drivers who regularly follow the AR coach might be treated to enhanced AR driving experiences, such as scenic route highlights or real-time points of interest.

In one embodiment, the instant solution's stress detection system constantly monitors the physiological parameters of the driver, such as heart rate, breathing rate, and perspiration, as well as monitoring their driving actions, such as aggressive acceleration, braking, or sudden lane changes without signaling. The in-cabin camera system can be used to observe the driver's facial expressions and body language to gauge emotional states. If the monitoring detects expressions or postures indicating stress, anger, or frustration above a certain threshold, the solution might suggest a first action, such as a prompt to the driver to take deep breaths or to pull over for a short break. If the solution detects that the driver is ignoring the suggestion by monitoring their movements or lack thereof, it might suggest a second action, such as playing calming music, reducing the vehicle's speed, or even offering to switch to autonomous driving mode for a short period. If the driver performs the suggested action, the instant solution provides a value to the user, such as points that can be redeemed for discounts or incentives related to relaxation products and services, mood-enhancing in-car experiences, themed ambient settings, etc.

In one embodiment, the instant solution monitors for vocal aggression and aggressive driving behavior. The use of advanced voice recognition software can monitor the driver's vocal tone and volume levels to detect aggression. If a driver's vocal patterns indicate stress or aggression exceeding a predefined threshold, the solution would suggest a first action, such as prompting the user to "Stay calm, drive safe." If the aggression continues or escalates, the solution might activate a second action, such as suggesting a nearby scenic spot for a break or offering guided relaxation techniques. Consistent calm driving sessions could allow the driver to accumulate points, which might be redeemable for wellness tools, stress-relief products and services, relaxation music playlists, etc.

In one embodiment, the instant solution's behavior monitoring encourages fuel-efficient driving behaviors. The monitoring looks for driving behaviors that consume more fuel than necessary, such as rapid acceleration or sustained driving at high speeds. If these behaviors are detected above a certain threshold, the solution might suggest a first action, such as "Use gentle acceleration to save fuel" or "Maintain a steady speed for better fuel efficiency". If the driver continues to exhibit driving behavior that wastes fuel, a second action is suggested, such as "Engage in eco mode." If the driver complies with these suggestions, the driver earns green points or value points, which could be saved to an app on their smartphone. These points could be tallied on an environmental leaderboard or be used to earn carbon offset credits, discounts on electric vehicle chargers, deals at green businesses, or tree plantings.

In one embodiment, the instant solution promotes healthy eating behaviors. For example, this can benefit vehicle occupants who tend to have little time to cook, resulting in overconsumption of unhealthy fast food from drive-through restaurants. The solution monitors the vehicle's location and its real-time proximity to fast-food restaurants to discern if the driver is going to a fast-food restaurant. It suggests a first action, such as a gentle reminder, "A restaurant that offers healthier food options is only one block away". If the driver ignores the suggestion and drives to the fast-food restaurant, a second action is suggested, such as informing the driver about the healthier choices available on the fast-food menu. Using the vehicle's internal weight sensors, the solution also monitors the vehicle occupant's progress and the rate at which they are losing weight or gaining weight over a period while factoring in the occupant's age, height, and other contributing factors. For example, it is normal for a child to gain weight at a healthy rate, but if the weight gain is above average for the child's age and size, that can indicate a greater concern. If the driver or occupant is showing progress, they might earn wellness badges or points in a health-oriented app that offers incentives towards health and fitness products or discounts on insurance premiums.

In one embodiment, the instant solution, as an ever-present health monitoring application, tracks the condition of the user while away from and inside the vehicle. With the use of biometric wearables, health readings (heart rate, sleep quality, body temperature, activity levels, exercising, stress markers, etc.) are collected about the user while the wearables are worn. Once the user is in the vehicle, the biometric wearables communicate with the vehicle to synchronize and share the collected biometric data so that the health monitoring application has the user's recent biometric readings. Then, while the user is inside the vehicle, the application is able to continue monitoring and gauging the user's physical and mental conditions using the vehicle's interior sensors as well. Example biometric wearables might include a smart watch, smart ring, smart clothing, or other advanced personal biometric devices. In one embodiment, the biometric wearable can be eyewear, designed with embedded sensors to track eye movements, pupil dilation, and blink rate. The eyewear also integrates biometric sensors within its temple arms that hold the eyewear to the head, in order to detect pulse and temperature. As a biometric wearable, it is synced with the vehicle's on-board health monitoring application, which possesses more processing power to analyze the biometric data collected over a period of time (day, week, month, etc.). The application can determine an initial condition of the user based on the eyewear's sensor data and the user's personal profile data, which might include age, medical history, and known health conditions, along with any ambient environmental conditions that might directly affect the condition of the user's health, such as air quality, excessive heat, or cold weather, etc. If the initial condition shows stress, fatigue, or other health-related concerns beyond a predetermined threshold, the instant solution then connects to the user's mobile device, which may contain health data from other biometric wearables, to get a more comprehensive view of the user. If a health issue is identified, the vehicle's application sends an alert to the eyewear's display or vehicle's display, as well as automatically adjusts the vehicle's settings, for example, activating a more cautious driving mode, adjusting cabin conditions, or suggesting to the user to take a break.

In one embodiment, the instant solution's ever-present health monitoring application uses in-vehicle sensors, such as sensors built into the seat that can detect heart rate, respiration rate, and levels of perspiration. The collected data from the integrated seat sensors and the other biometric wearables, along with the user's profile data (such as weight, height, historical health metrics), is analyzed by the in-vehicle health monitoring application to determine the user's initial condition. For example, if the initial assessment is concerning, the instant solution retrieves additional health metrics, perhaps including sleep patterns from the previous night or activity levels, to perform a more comprehensive assessment and to suggest actions, such as taking a nap, hydrating, taking frequent breaks, or even seeking medical attention. Furthermore, based on the user's initial condition, the instant solution might aid the user prior to the vehicle starting, or it might engage the autonomous driving mode of the vehicle for the safety of the user.

In one embodiment, the instant solution might integrate smart home sensors and devices that monitor well-being. These sensors and devices might collect environmental data (such as air quality), as well as dietary data (from the smart home refrigerator) or mood data (from smart home lighting or smart home media devices). Before the driver leaves their smart home, the vehicle's health monitoring application connects and synchronizes with the smart home's central hub to pull the data collected at home. For example, if the smart home data shows the driver has been consuming a lot of caffeine, the application might anticipate potential jitteriness when the user performs driving maneuvers, or the application might anticipate a point in time during the route when the caffeine has lost its effectiveness, adjusting vehicle settings and alerts accordingly leading up to that moment. Or, if the smart home lighting indicates the individual stayed up late, the vehicle might proactively recommend a shorter driving route to reduce time on the road.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one example, implements the flow diagrams of the other figures. The system memory 606 can include computer system readable media in the form of volatile memory, such as random-access memory (RAM) 608 and/or cache memory 610. Computer system/server 602 may further include other removable/non-removable, volatile/non-volatile computer system storage media. By way of example only, memory 606 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility, having a set (at least one) of program modules, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable media (s) having computer readable program code embodied thereon.

Computer system/server 602 may also communicate with one or more external devices via an I/O device 612 (such as an I/O adapter), which may include a keyboard, a pointing device, a display, a voice recognition module, etc., one or more devices that enable a user to interact with computer system/server 602, and/or any devices (e.g., network card, modem, etc.) that enable computer system/server 602 to communicate with one or more other computing devices. Such communication can occur via I/O interfaces of the device 612. Still yet, computer system/server 602 can communicate with one or more networks such as a local area network (LAN), a general wide area network (WAN), and/or a public network (e.g., the Internet) via a network adapter. As depicted, device 612 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable media has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
monitoring, by a vehicle, a behavior of an occupant of the vehicle;
responsive to the behavior exceeding a threshold, suggesting a first action for the occupant by the vehicle, based on the behavior and an amount the behavior exceeds the threshold;
in response to determining that the occupant is performing an alternate action, which differs from the first action, suggesting a second action by the vehicle for the occupant, based on the alternate action and the first action; and
providing, by the vehicle, a value to a device associated with the occupant responsive to the vehicle detecting a performance of one or more of the first action or the second action by the occupant.

2. The method of claim 1, wherein the behavior comprises one or more of:
a vehicle operation action or a limited time-related action.

3. The method of claim 1, wherein the first action comprises:
a notification to the occupant to modify one or more of a current or a future vehicle operation action.

4. The method of claim 1, comprising:
identifying whether the occupant has performed the first action based on sensor data generated by a movement of the occupant.

5. The method of claim 1, comprising:
retrieving a profile associated with the occupant from the device; and
determining a type of value to apply to subsequent occupant compliance actions based on the profile.

6. The method of claim 5, comprising:
determining one or more of the first action or the second action have been performed by the occupant; and
providing the value of the type of value to the profile.

7. The method of claim 5, comprising:
determining that only the second action has been performed by the occupant; and
providing a partial value of the type of value to the profile.

8. A vehicle comprising:
a processor that executes instructions stored in a memory to configure the processor to:
monitor a behavior of an occupant of the vehicle;
responsive to the behavior exceeding a threshold, suggest a first action for the occupant, based on the behavior and an amount the behavior exceeds the threshold;
in response to a determination that the occupant is performing an alternate action, which differs from the first action, suggest a second action for the occupant, based on the alternate action and the first action; and
provide a value to a device associated with the occupant responsive to the vehicle detecting a performance of one or more of the first action or the second action by the occupant.

9. The system of claim 8, wherein the behavior comprises one or more of:
a vehicle operation action or a limited time-related action.

10. The system of claim 8, wherein the first action comprises:
a notification to the occupant to modify one or more of a current or a future vehicle operation action.

11. The system of claim 8, wherein the processor is further configured to:
identify whether the occupant has performed the first action based on the sensor data generated by a movement of the occupant.

12. The system of claim 8, wherein the processor is further configured to:
retrieve a profile associated with the occupant from the occupant device; and
determine a type of value to apply to subsequent occupant compliance actions based on the profile.

13. The system of claim 12, wherein the processor is further configured to:
determine one or more of the first action or the second action have been performed by the occupant; and
provide the value of the type of value to the profile.

14. The system of claim 12, wherein the processor is further configured to
determine that only the second action has been performed by the occupant; and
provide a partial value of the type of value to the profile.

15. A non-transitory computer-readable medium comprising instructions that, when executed by a processor, cause a processor to perform:
monitoring, by a vehicle, a behavior of an occupant of the vehicle;
responsive to the behavior exceeding a threshold, suggesting a first action for the occupant by the vehicle, based on the behavior and an amount the behavior exceeds the threshold;
in response to determining that the occupant is performing an alternate action, which differs from the first action, suggesting a second action by the vehicle for the occupant, based on the alternate action and the first action; and providing, by the vehicle, a value to a device associated with the occupant responsive to the vehicle detecting a performance of one or more of the first action or the second action by the occupant.

16. The non-transitory computer-readable medium of claim 15, wherein the behavior comprises one or more of:
a vehicle operation action or a limited time-related action.

17. The non-transitory computer-readable medium of claim 15, wherein the first action comprises:
a notification to the occupant to modify one or more of a current or a future vehicle operation action.

18. The non-transitory computer-readable medium of claim 15, wherein the instructions further cause the processor to perform:
identifying whether the occupant has performed the first action based on sensor data generated by a movement of the occupant.

19. The non-transitory computer-readable medium of claim 15, wherein the instructions further cause the processor to perform:
retrieving a profile associated with the occupant from the occupant device; and
determining a type of value to apply to subsequent occupant compliance actions based on the profile.

20. The non-transitory computer-readable medium of claim 15, wherein the instructions further cause the processor to perform:
determining one or more of the first action or the second action have been performed by the occupant; and
providing the value of the type of value to the profile.

* * * * *